United States Patent
Kokado

(10) Patent No.: US 7,839,807 B2
(45) Date of Patent: Nov. 23, 2010

(54) COMMUNICATION APPARATUS, METHOD EXECUTED BY COMMUNICATION APPARATUS, AND STORAGE MEDIUM STORING SOFTWARE FOR EXECUTING METHOD

(75) Inventor: Takeshi Kokado, Kyoto (JP)

(73) Assignee: Panasonic Corporation, Osaka (JP)

( * ) Notice: Subject to any disclaimer, the term of this patent is extended or adjusted under 35 U.S.C. 154(b) by 121 days.

(21) Appl. No.: 12/294,393

(22) PCT Filed: Mar. 29, 2007

(86) PCT No.: PCT/JP2007/056864
§ 371 (c)(1),
(2), (4) Date: Sep. 24, 2008

(87) PCT Pub. No.: WO2007/114251
PCT Pub. Date: Oct. 11, 2007

(65) Prior Publication Data
US 2009/0116499 A1    May 7, 2009

(30) Foreign Application Priority Data
Mar. 29, 2006    (JP) .............................. 2006-091183

(51) Int. Cl.
H04L 12/56 (2006.01)
H04J 1/16 (2006.01)

(52) U.S. Cl. .................. 370/278; 370/252; 370/386; 370/389; 370/412

(58) Field of Classification Search .................. 370/386, 370/389, 252, 412, 278
See application file for complete search history.

(56) References Cited

U.S. PATENT DOCUMENTS

2005/0041596 A1 * 2/2005 Yokomitsu et al. .......... 370/252
2005/0220076 A1   10/2005 Kokado

FOREIGN PATENT DOCUMENTS

| JP | 2003/169075 | 6/2003 |
|----|-------------|--------|
| JP | 2005-323347 | 11/2005 |
| JP | 2006-121473 | 5/2006 |
| WO | 2006/003874 | 1/2006 |

OTHER PUBLICATIONS

International Search Report issued Jul. 3, 2007 in the International (PCT) Application of which the present application is the U.S. National Stage.

* cited by examiner

Primary Examiner—John Pezzlo
(74) Attorney, Agent, or Firm—Wenderoth, Lind & Ponack, L.L.P.

(57) ABSTRACT

A communication apparatus which is capable of performing bi-directional communication via a router in a local network including one or more routers is provided. An upper segment determination section obtains address range information under an upper router which is connected on an external network side of a router to which the communication apparatus is connected. A terminal communication path holding section connects and holds a communication path to another communication apparatus in the local network. A message relay section relays a communication message from the other communication apparatus. When the terminal communication path holding section receives a first request message requesting to establish a communication path from the other communication apparatus, the terminal communication path holding section stores source address information of the received first request message, and transmit a response message to the stored source address information to establish a communication path to the other communication apparatus.

19 Claims, 29 Drawing Sheets

FIG. 18

| TTL | DESTINATION PORT |
|-----|------------------|
| 1   | 10001            |
| 2   | 10002            |
| 3   | 10003            |
| 4   | 10004            |
| 5   | 10005            |
| :   | :                |

FIG. 20

| TTL | SEQUENCE NUMBER |
|---|---|
| 1 | 1 |
| 2 | 2 |
| 3 | 3 |
| 4 | 4 |
| 5 | 5 |
| : | : |

FIG. 24

```
M-Search * HTTP/1.1
HOST: 239.255.255.250:1900
MAN: "ssdp:discover"
MX: 3
ST: urn:schemas-upnp-org:device:InternetGatewayDevice:1
```

FIG. 25

```
HTTP/1.1 200 OK
CACHE-CONTROL: max-age = seconds until advertisement expires
DATE: when respons was generated
EXT:
LOCATION: URL for UPnP description for root device
SERVER: OS/version UPnP/1.0 product/version
ST: urn:schemas-upnp-org:device:InternetGatewayDevice:1
USN: advertisement UUID
```

FIG. 26

```
POST /upnp/control/WANPPPConn1 HTTP/1.1
HOST: 192.168.1.1:2869
CONTENT-LENGTH: 297
CONTENT-TYPE : text/xml; charset="utf-8"
SOAPACTION: "urn:schemas-upnp-org:service:WANPPPConnection:1#GetExternalIPAddress"

<s:Envelope
  xmlns:s="http://schemas.xmlsoap.org/soap/envelope/"
  s:encodingStyle="http://shemas.xmlsoap.org/soap/encoding/">
  <s:Body>
    <u:GetExternalIPAddress xmlns:u="urn:schemas-upnp-org:service:WANPPPConnection:1">
    </u:GetExternalIPAddress>
  </s:Body>
</s:Envelope>
```

FIG. 27

```
HTTP/1.1 200 OK
CONTENT-LENGTH: 425
CONTENT-TYPE: text/xml; charset="utf-8"
SERVER: IGD-HTTP/1.1 UPnP/1.0 UPnP-Device-Host/1.0
EXT:

<?xml version="1.0"?>
<SOAP-ENV:Envelope xmlns:SOAP-ENV="http://schemas.xmlsoap.org/soap/envelope/"
SOAP-ENV:encodingstyle="http://shemas.xmlsoap.org/soap/encoding/">
 <SOAP-ENV:Body>
  <m:GetExternalIPAddressResponse xmlns:m="urn:schemas-upnp-org:sevice:WANPPPConnection:1">
   <NewExternalIPAddress>192.168.10.3</NewExternalIPAddress>
  </m:GetExternalIPAddressResponse>
 </SOAP-ENV:Body>
</SOAP-ENV:Envelope>
```

FIG. 28

WAN-SIDE ADDRESS OF ROUTER A :192.168.10.3

| DESTINATION ADDRESS OF PRESUMPTION ROUTER PACKET |
| --- |
| 192.168.10.1 |
| 192.168.10.254 |
| 192.168.10.2 |
| 192.168.10.4 |
| 192.168.10.5 |
| : |

COMMUNICATION APPARATUS, METHOD EXECUTED BY COMMUNICATION APPARATUS, AND STORAGE MEDIUM STORING SOFTWARE FOR EXECUTING METHOD

TECHNICAL FIELD

The present invention relates to a communication apparatus, a method executed by the communication apparatus, and a storage medium storing software for executing the method, and more particularly, to a communication apparatus which is capable of performing bi-directional communication via a router in a local network including one or more routers, a method executed by the communication apparatus, and a storage medium storing software for executing the method. Here, as an example of a local network, there is a network in home (so-called home network), an intranet established in a company, or the like.

BACKGROUND ART

Recently, information society has been rapidly developed, and home networking has been rapidly popularized. Under such a situation, a plurality of apparatuses connected to a home network cooperate with each other, and operate while communicating with each other, whereby convenience of services provided by the apparatuses is expected to be improved.

Further, since the apparatuses connected to the home network are used by a home user, work of connecting the apparatuses need to be as simple as possible.

However, the home user does not have enough knowledge about network. Thus, the home user may not tell the difference between a router and a hub, and may connect a router instead of a hub, or connect a wireless router instead of a wireless access point. Further, the home network often includes a plurality of routers, and a failure that communication between the apparatuses is disenabled to be performed may occur due to this network configuration. In order to prevent this, the user needs to understand the configuration of the home network, and needs to connect an apparatus for performing communication at a position in a network at which communication is possible. However, this is not realistic. It is noted that although a home network is described as an example of a local network here, there are a small number of people having special knowledge even in a company, and much the same is true on an intranet.

Impossibility of communication between apparatuses in the case where a home network includes a plurality of routers will be described in detail using a drawing. FIG. 31 shows an example of a configuration of a home network 52 including a plurality of conventional routers. As shown in FIG. 31, a router 53b and a router 53c are connected under a router 53a having a built-in modem. A router for home use has a NAT function and a firewall function. Thus, in the case where the home network 52 includes the plurality of routers, an address translation (NAPT) function and a firewall function are activated in the home network 52. Generally, with a home router, because of a NAPT function and a firewall function, communication cannot be started from an apparatus located on a WAN side to perform communication with an apparatus located on a LAN side. Thus, in the example of FIG. 31, communication cannot be started from a communication apparatus to a communication apparatus 55b.

It is noted that since communication from the communication apparatus 55b to the communication apparatus 55a is communication from a LAN side to a WAN side for the router 53b, address translation (NAPT) setting is automatically performed with respect to the router 53b. Thus, it is possible to perform communication from the communication apparatus 55b to the communication apparatus 55a.

For such a problem that communication is disturbed by the home router, there is known a method in which a connection assistance server is provided outside the home network (e.g. on the Internet), and a communication apparatus on a WAN side of a router connects to the home network to a communication apparatus on a LAN side thereof via the connection assistance server (e.g. the Patent Document 1). In this method, a communication apparatus in the home network establishes a communication path to the connection assistance server. Then, a communication apparatus outside the home network connects to the communication apparatus in the home network via the connection assistance server.

[Patent Document 1] Japanese Laid-Open Patent Publication No. 2003-169075

However, the method using the conventional connection assistance server assumes that the connection assistance server is provided outside the home network, and there is a problem that the method cannot be used unless the home network is connected to an external network (e.g. the Internet).

Here, a case where the conventional connection assistance server is provided in the home network is considered. In such a case, it is assumed that the connection assistance server is installed by a user who does not understand the network. Thus, a desired function needs to be achieved even when the connection assistance server is connected to any position in the home network.

In other words, the method using the conventional connection assistance server is usable for the communication apparatus in the home network only when the connection assistance server is always located in a position on the Internet side (the WAN side). Thus, there is a problem that the conventional method cannot be used in a home network including one or more routers connected in series.

For example, in the case where the connection assistance server is connected to the home network including one or more routers connected in series as shown in FIG. 31, since it is not taken into consideration that the connection assistance server is connected to a network (a multi-segment network) including a plurality of routers for the conventional method, when the connection assistance server is connected to the router 53b and the router 53c, the communication apparatus 55a cannot connect to the connection assistance server. In other words, there is a problem that a communication path between the communication apparatus 55a and the connection assistance server cannot be established depending on a position where the connection assistance server is installed.

SUMMARY OF THE INVENTION

Therefore, an object of the present invention, which has been made in view of the above problems, is to provide a communication apparatus which is connected to a home network in which one or more routers are connected in series and which has a relay function to be capable of performing communication with another communication apparatus connected to the home network by relaying a message of the other communication apparatus, and a communication apparatus which is capable of performing communication via a communication apparatus having a relay function.

Further, another object of the present invention is to provide a method executed by a communication apparatus, and a storage medium storing software for executing the method.

The present invention is directed to a communication apparatus connected to a local network connected to an external network in which local network one or more routers are connected in series between a communication apparatus in the local network and the external network. The communication apparatus connects a communication path to another communication apparatus in the local network, and has a relay function to relay a communication message from the other communication apparatus. For attaining the above object, the communication apparatus having the relay function comprises: an upper segment determination section for obtaining and storing address range information which indicates an address range within which an address, of a communication apparatus under an upper router which is connected in the local network and connected on an external network side of a router to which the communication apparatus is connected, is capable of being set; a terminal communication path holding section for connecting and holding a communication path to another communication apparatus in the local network; and a message relay section for relaying a communication message from the other communication apparatus. When the terminal communication path holding section receives a first request message requesting to establish a communication path from the other communication apparatus, the terminal communication path holding section stores source address information of the received first request message, transmits a response message to the stored source address information, and establishes a communication path to the other communication apparatus. When the terminal communication path holding section does not receive the first request message from the other communication apparatus, the terminal communication path holding section presumes address information of another communication apparatus under the upper router using the address range information stored by the upper segment determination section, transmits a second request message requesting to establish a communication path to the presumed address information, and receives a response message to establish a communication path to the other communication apparatus under the upper router and to store address information of said communication apparatus to which the communication path has been established. The message relay section has a relay function to receive a communication message from the other communication apparatus, to take out destination information which is described in the received communication message and designated by the other communication apparatus, to obtain address information corresponding to the destination information from the address information stored by the terminal communication path holding section, and to transmit the received communication message to the obtained address information.

Thus, when another router exists in the local network and on the upper side of the router to which the communication apparatus is connected (on a side close to the external network), the communication apparatus having the relay function is capable of transmitting a first request message requesting to establish a communication path to another communication apparatus connected to the upper router. Generally, a router is capable of relaying communication which is started from a LAN side to a WAN side. Thus, the other communication apparatus which has received the first request message transmits a response message to a source address (an IP address, a port number) described in a header of a message to establish a communication path, thereby allowing communication to be performed between the communication apparatus having the relay function and the communication apparatus connected to the upper router.

Further, when the communication apparatus having the relay function receives a second request message requesting to establish a communication path from another communication apparatus connected to the router to which the communication apparatus is connected or to a router on a lower side of the router (on a side distant from the external network), the communication apparatus having the relay function transmits a response message to a source address (an IP address, a port number) of the second request message to establish a communication path. As a result, the communication apparatus having the relay function becomes capable of connecting a communication path to the other communication apparatus connected to the lower router, the other communication apparatus becomes capable of causing the communication apparatus having the relay function to relay a message.

Further, the upper segment determination section obtains LAN-side address information or LAN-side address information and WAN-side address information of one or more routers among routers located between the router to which the communication apparatus is connected and the external network, presumes an address range within which an address of another communication apparatus which is connected to a first network to which the obtained address information belongs is capable of being set, and stores the presumed address range as the address range information.

Thus, the communication apparatus having the relay function transmits a message in which a TTL is manipulated like Trace route, or transmits a message based on a UPnP IGD specification, and obtains a response message from the upper router, thereby obtaining address information of the upper router. By the obtained address information, the communication apparatus having the relay function determines whether or not the upper router is a router which belongs to the local network (e.g. if a LAN-side address of the upper router is a private address, it may be determined that the upper router is a router which belongs to the local network). When the upper router is the router which belongs to the local network, the communication apparatus having the relay function presumes and stores an address range within which an address of a communication apparatus in a subnetwork is capable of being set.

Then, the communication apparatus having the relay function transmits a second request message requesting to establish a communication path to an address within the stored address range. If a communication apparatus is connected to the address to which the second request message is transmitted, the communication apparatus having the relay function receives a response message from the communication apparatus to establish a communication path.

As a result, even though the communication apparatus having the relay function does not store in advance configuration information of the local network, address information of another connected communication apparatus, and the like, the communication apparatus having the relay function becomes capable of connecting a communication path to a communication apparatus connected to the upper router.

Preferably, the communication apparatus having the relay function further comprises: a relay function search section for searching for another communication apparatus which exists in the local network and has a relay function; and a search response section for transmitting a response for a search message which is received from another communication apparatus in the local network. The relay function search section obtains an address which can be set to another communication apparatus having a relay function using the address information stored by the terminal communication path holding section, transmits a search message to the address, and receives a response message from the other communication apparatus having the relay function, thereby finding the other communication apparatus having the relay function. Only when the relay function search section does not find the other communication apparatus having the relay function, the relay function search section activates the terminal communication path holding section and the message relay section, and the search response section responds to a search message which is received from another communication apparatus in the local network. When the relay function search section finds the other communication apparatus having the relay function, the relay function search section inactivates the terminal communication path holding section and the message relay section, and the search response section does not respond to a search message which is received from another communication apparatus in the local network.

Thus, only when the communication apparatus having the relay function does not find a communication apparatus which has already provided a relay function in the local network, the communication apparatus having the relay function becomes capable of providing its relay function. As a result, a communication apparatus providing a relay function is prevented from being increased in the local network, and each communication apparatus can be prevented from having to connect many communication paths for performing communication with a plurality of communication apparatuses each having relay function.

Preferably, the communication apparatus having the relay function further comprises a server communication path holding section for connecting and holding a communication path to another communication apparatus having a relay function. When the relay function search section finds another communication apparatus having a relay function, the server communication path holding section transmits a first request message requesting to establish a communication path to the other communication apparatus having the relay function, and receives a response message to establish a communication path to the other communication apparatus having the relay function. When the relay function search section does not find another communication apparatus having a relay function, if the server communication path holding section receives a first request message requesting to establish a communication path from another communication apparatus having a relay function, the server communication path holding section transmits a response message to a source of the received first request message to establish a communication path to the other communication apparatus having the relay function.

Thus, when a communication apparatus which has already provided a message relay function exists in the local network, the communication apparatus having the relay function becomes capable of operating as a communication apparatus which connects a communication path to the already existing communication apparatus having the relay function. When a communication apparatus which has already provided a message relay function does not exist in the local network, the communication apparatus having the relay function becomes capable of operating as a communication apparatus which provides a message relay function. As a result, not in a form of a communication apparatus dedicated to a relay function, a relay function is added to a common communication apparatus. Thus, it is possible to configure the communication apparatus which provides the relay function when needed (when another communication apparatus which has provided a relay function does not exist in the local network) in addition to a specific function as the communication apparatus.

Preferably, when the server communication path holding section detects an abnormality of communication with the other communication apparatus having the relay function, the relay function search section re-executes a search for another communication apparatus having a relay function, and activates the server communication path holding section, the message relay section, and the search response section in accordance with a result of the search.

Thus, when failures occur in a communication apparatus which has a relay function and has already provided a message relay function (e.g. the power is cut off, a network cable is disconnected, and the like) so that the relay function is not provided, the communication apparatus having the relay function becomes capable of automatically providing a message relay function in the local network instead. It is noted that as an example of detecting an abnormality of communication with another communication apparatus having a relay function, a method of detecting interruption of arrival of packets which are periodically transmitted between the communication apparatus having the relay function and the other communication apparatus having the relay function for holding the communication path is considered.

When the relay function search section does not find another communication apparatus having a relay function, the server communication path holding section monitors whether or not the server communication path holding section receives a first request message requesting to establish a communication path from another communication apparatus having a relay function for a predetermined time period. When the server communication path holding section does not receive the first request message, the server communication path holding section activates the terminal communication path holding section and the message relay section, and the search response section responds to a search message which is received from another communication apparatus in the local network.

Thus, when another communication apparatus which has provided a relay function is connected to a router on a lower side of the router to which the communication apparatus is connected, the communication apparatus having the relay function waits for the predetermined time period for monitoring whether or not the communication apparatus receives a first request message requesting to establish a communication path from the other communication apparatus which has provided the relay function, thereby preventing an unneeded relay function from being provided and allowing a communication path to be stably connected to the already existing other communication apparatus which has provided the relay function.

Preferably, when the terminal communication path holding section and the message relay section are activated, the communication apparatus having the relay function selects an address which matches an address within a predetermined range from addresses which are not currently used as a host address in a subnetwork, and sets the address as its own address.

Thus, it is easy for another communication apparatus to presume an address of the communication apparatus having the relay function, and it is easy to connect a communication path from the other communication apparatus to the communication apparatus having the relay function.

Preferably, when the terminal communication path holding section receives address information of another communication apparatus to which a communication path has not been connected yet from the other communication apparatus to which the communication path has been established through the communication path, the terminal communication path holding section transmits a second request message requesting to establish a communication path based on the received address information.

Thus, when the communication apparatus having the relay function receives address information of a communication apparatus which is newly connected to the upper router from a communication apparatus which is connected to the upper router and to which a communication path has been already connected, the communication apparatus having the relay function becomes capable of immediately transmitting a second request message requesting to establish a communication path.

Preferably, the communication apparatus having the relay function comprises input means for a user to input a signal to the communication apparatus. The upper segment determination section determines whether or not to obtain address range information under the upper router in accordance with the signal from the input means. The terminal communication path holding section determines whether or not to transmit a second request message requesting to establish a communication path to another communication apparatus under the upper router in accordance with the signal from the input means.

Thus, the communication apparatus having the relay function becomes capable of not connecting a communication path to a communication apparatus connected to the upper router unless there is an input from the outside, and hence security can be enhanced.

The communication apparatus having the relay function further comprises input means for a user to input a signal to the communication apparatus. The terminal communication path holding section determines, in accordance with the signal from the input means, whether or not to transmit a response message when the terminal communication path holding section receives a first request message requesting to establish a communication path from the other communication apparatus.

Thus, the communication apparatus having the relay function becomes capable of not connecting a communication path to a communication apparatus connected to the upper router unless there is an input from the outside, and hence security can be enhanced.

Further, the present invention is directed to a communication apparatus connected to a local network connected to an external network and in which local network one or more routers are connected in series between a communication apparatus in the local network and the external network. The communication apparatus connects a communication path to another communication apparatus in the local network which has a relay function, and performs message communication with another communication apparatus via the other communication apparatus having the relay function. For attaining the above, the communication apparatus comprises: an upper segment determination section for obtaining and storing address range information which indicates an address range within which an address, of a communication apparatus under an upper router which is connected in the local network and connected on an external network side of a router to which the communication apparatus is connected, is capable of being set; and a server communication path holding section for connecting a communication path to the other communication apparatus having the relay function. The server communication path holding section presumes address information of the other communication apparatus having the relay function based on the address range information stored by the upper segment determination section, transmits a first request message requesting to establish a communication path to the presumed address information, and receives a response message from the other communication apparatus having the relay function to establish the communication path. When the server communication path holding section receives a second request message requesting to establish a communication path from the other communication apparatus having the relay function, the server communication path holding section transmits a response message to a source address of the second request message to establish a communication path to the other communication apparatus having the relay function.

Thus, the communication apparatus becomes capable of establishing a communication path to a communication apparatus which has a relay function and is connected to the local network including one or more routers connected in series.

Preferably, the server communication path holding section transmits address information of another communication apparatus to which the other communication apparatus having the relay function has not connected a communication path yet to the other communication apparatus having the relay function through the communication path which is established to the other communication apparatus having the relay function.

Thus, by transmitting address information of another communication apparatus to another communication apparatus having a relay function, the other communication apparatus having the relay function becomes capable of immediately transmitting a first request message requesting to establish a communication path using the address information.

Preferably, when the server communication path holding section detects an abnormality of communication with the other communication apparatus having the relay function, the upper segment determination section re-executes processing of obtaining and storing the address range information, and the server communication path holding section re-executes processing of establishing a communication path to the other communication apparatus having the relay function.

Thus, when failures occur in a communication apparatus which has a relay function and has already provided the message relay function (e.g. the power is cut off, a network cable is disconnected, and the like) so that the relay function is not provided, the communication apparatus becomes capable of automatically searching for a substitute communication apparatus having a relay function to set a communication path.

Preferably, the communication apparatus further comprises input means for a user to input a signal to the communication apparatus. The upper segment determination section determines whether or not to obtain address range information under the upper router in accordance with the signal from the input means. The server communication path holding section determines whether or not to transmit a first request message requesting to establish a communication path to another communication apparatus under the upper router in accordance with the signal from the input means.

Thus, the communication apparatus is capable of not connecting a communication path to another communication apparatus which is connected to the upper router and has a relay function unless there is an input from the outside, and hence security can be enhanced.

The communication apparatus further comprises input means for a user to input a signal to the communication apparatus. The server communication path holding section determines, in accordance with the signal from the input means, whether or not to transmit a response message when the server communication path holding section receives a second request message requesting to establish a communication path from the other communication apparatus having the relay function.

Thus, the communication apparatus becomes capable of not connecting a communication path to another communication apparatus which is connected to the upper router and has a relay function unless there is an input from the outside, and hence security can be enhanced.

Further, the present invention is directed to a method executed by a communication apparatus connected to a local network connected to an external network in which local network one or more routers are connected in series between a communication apparatus in the local network and the external network. The communication apparatus connects a communication path to another communication apparatus in the local network, and has a relay function to relay a communication message from the other communication apparatus. For attaining the above object, the method comprises: an upper segment determination step of obtaining and storing address range information which indicates an address range within which an address, of a communication apparatus under an upper router which is connected in the local network and connected on an external network side of a router to which the communication apparatus is connected, is capable of being set; a terminal communication path holding step of connecting and holding a communication path to another communication apparatus in the local network; and a message relay step of relaying a communication message from the other communication apparatus. When a first request message requesting to establish a communication path is received from the other communication apparatus, at the terminal communication path holding step, source address information of the received first request message is stored, a response message is transmitted to the stored source address information, and a communication path is established to the other communication apparatus. When the first request message is not received from the other communication apparatus, at the terminal communication path holding step, address information of another communication apparatus under the upper router is presumed using the address range information stored by the upper segment determination step, a second request message requesting to establish a communication path is transmitted to the presumed address information, and a response message is received to establish a communication path to the other communication apparatus under the upper router and to store address information of the other communication apparatus to which the communication path has been established. The message relay step has a relay function to receive a communication message from the other communication apparatus, to take out destination information which is described in the communication message and designated by the other communication apparatus, to obtain address information corresponding to the destination information from the address information stored by the terminal communication path holding step, and to transmit the received communication message to the obtained address information.

By this method, it is possible to connect a communication path between the communication apparatus having the relay function and another communication apparatus in the local area, and the other communication apparatus becomes capable of causing a message to be relayed by the communication apparatus having the relay function.

Further, the present invention is directed to a method executed by a communication apparatus connected to a local network connected to an external network in which local network one or more routers are connected in series between a communication apparatus in the local network and the external network. The communication apparatus connects a communication path to another communication apparatus in the local network which has a relay function, and performs message communication with another communication apparatus via the other communication apparatus having the relay function. For attaining the above object, the method comprises: an upper segment determination step of obtaining and storing address range information which indicates an address range within which an address, of a communication apparatus under an upper router which is connected in the local network and connected on an external network side of a router to which the communication apparatus is connected, is capable of being set; and a server communication path holding step of connecting a communication path to the other communication apparatus having the relay function. At the server communication path holding step, address information of the other communication apparatus having the relay function is presumed based on the address range information stored by the upper segment determination step, a first request message requesting to establish a communication path is transmitted to the presumed address information, a response message is received from the other communication apparatus having the relay function to establish a communication path. When a second request message requesting to establish a communication path is received from the other communication apparatus having the relay function, at the server communication path holding step, a response message is transmitted to a source address of the second request message to establish a communication path to the other communication apparatus having the relay function.

By this method, it is possible to connect a communication path between a communication apparatus and another communication apparatus in the local area which has a relay function, and the other communication apparatus becomes capable of causing a message to be relayed by the communication apparatus having the relay function.

Further, the present invention may be a storage medium storing software for executing the above method.

In this case, the software stored in the storage medium is installed to an apparatus, such as a PC, and the like, which has a function to execute software, thereby allowing a communication path to be connected between a communication apparatus having a relay function and another communication apparatus in the local area. Thus, the other communication apparatus becomes capable of a message to be relayed by the communication apparatus having the relay function.

According to the present invention, a communication apparatus which is connected to a local network including one or more routers connected in series and which has a relay function capable of performing communication with another communication apparatus which is connected to the local network by relaying a message of the other communication apparatus, a communication apparatus capable of performing communication with a communication apparatus having a relay function, and a communication apparatus capable of performing communication via a communication apparatus having a relay function are realized.

BRIEF DESCRIPTION OF THE DRAWINGS

FIG. 18 is a view showing an example of a correspondence relation between the TTL and a destination port number of the TTL packet according to the embodiment of the present invention.

FIG. 20 is a view showing an example of a correspondence relation between the TTL and a sequence number of the TTL packet according to the embodiment of the present invention.

FIG. 24 is a view showing an example of a data section of a presumed router packet according to the embodiment of the present invention.

FIG. 25 is a view showing an example of a data section of a presumed router response packet according to the embodiment of the present invention.

FIG. 26 is a view showing an example of a Get External IP Address action request message according to the embodiment of the present invention.

FIG. 27 is a view showing an example of a Get External IP Address action response message according to the embodiment of the present invention.

FIG. 28 is a view showing an example of a destination address of the presumed router packet according to the embodiment of the present invention.

DESCRIPTION OF THE REFERENCE CHARACTERS

Figure 1:
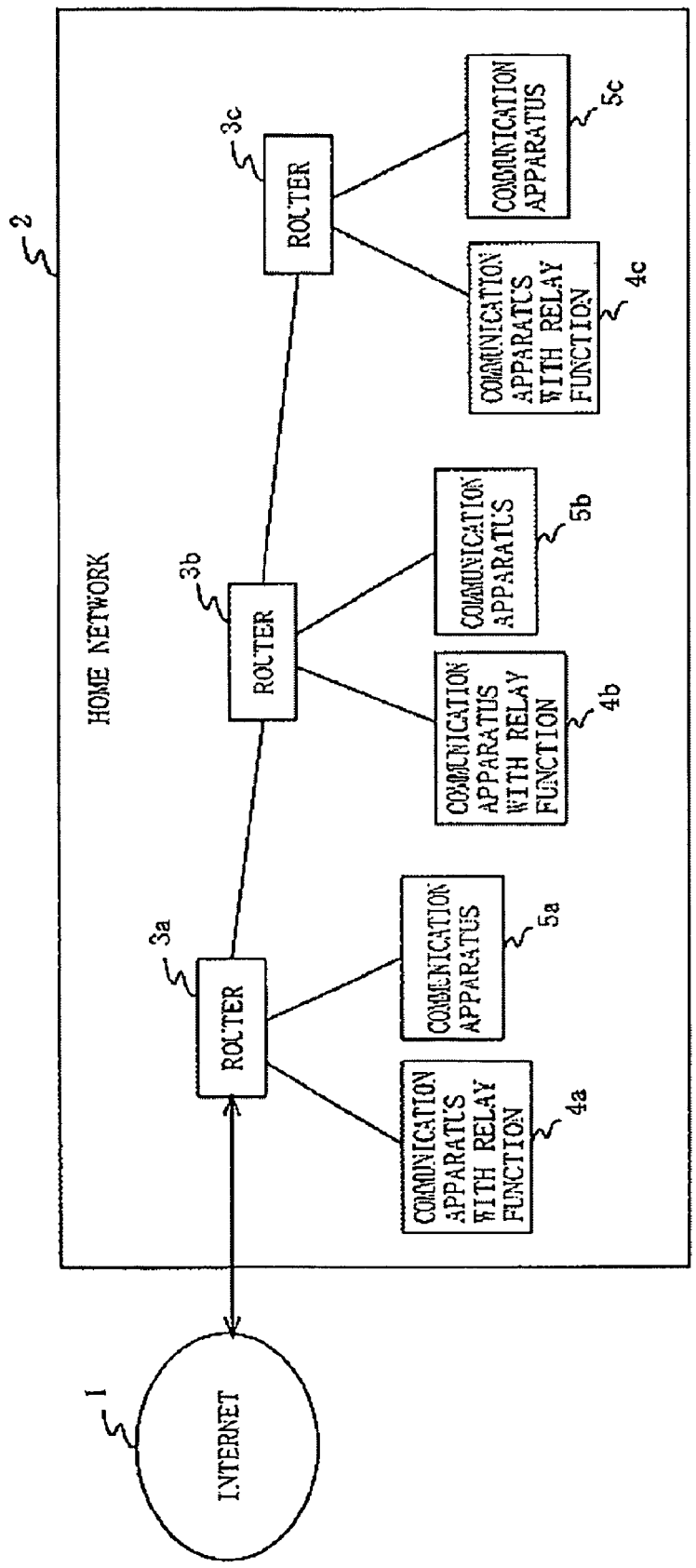
FIG. 1 is a view showing an example of a configuration of a home network 2 according to an embodiment of the present invention.

1 Internet
2 home network
3a to 3c router
4a to 4a communication apparatus with relay function
41 communication I/F section
411 address information section
42 relay communication section
421 upper segment determination section
422 upper segment information section
423 relay function search/response section
424 message relay section
425 terminal communication path holding section
426 communication path information section
427 server communication path holding section
428 relay function information section
43 terminal application section
5a to 5c communication apparatus without relay function
51 communication I/F section
511 address information section 52 relay communication section
521 upper segment determination section
522 upper segment information section
527 server communication path holding section
528 relay function information section
53 terminal application section

DETAILED DESCRIPTION OF THE INVENTION

An embodiment of the present invention will be described based on the drawings.

FIG. 1 is a view showing an example of a configuration of a home network (a local network) 2 according to the embodiment of the present invention. As shown in FIG. 1, the home network 2 includes three routers 3a, 3b, and 3c, and the router 3a is the uppermost router among routers connected to an Internet 1. Further, communication apparatuses 4a to 4c each having a relay function and communication apparatuses 5a to 5c each not having a relay function are connected to the routers 3a, 3b, and 3c, respectively. Each of the communication apparatuses 4a to 4c and 5a to 5c has a network communication function for providing its own service to a user and another apparatus. An example of the services provided by the communication apparatuses 4a to 4c and 5a to 5c is a network-enabled AV recorder, and the communication apparatuses 4a to 4c and 5a to 5c transmit information of contents list according to a request from another apparatus or transmit content of an item requested from the other apparatus. It is noted that the described AV recorder is an example of the communication apparatuses 4a to 4c and 5a to 5c, but the communication apparatuses 4a to 4c and 5a to 5c may be apparatuses which perform communication with another apparatus on a network. Further, the configuration of the home network 2 including the three routers is an example, but the home network may be a home network including not more than two routers, or a home network including three or more routers. Further, the home network 2 is connected by a wire or wirelessly.

Here, the relay functions of the communication apparatuses 4a to 4c are functions to allow message communication to be performed between communication apparatuses by holding a communication path to another communication apparatus, and relaying a message. In the present embodiment, according to a later-described "Procedure until Start of Relay Function", the communication apparatuses 4a to 4c each having the relay function in the home network 2 are controlled such that the relay function of one of the communication apparatuses 4a to 4c is started, and the relay functions of the other communication apparatuses each having the relay function are in an OFF state.

Figure 2:
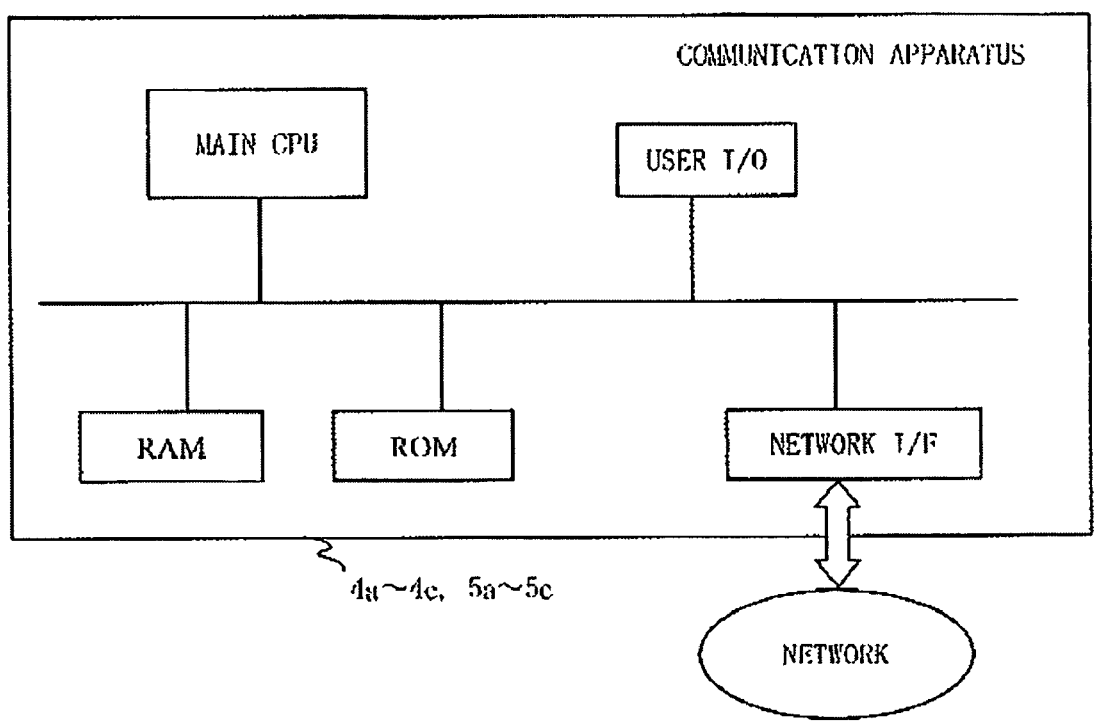
FIG. 2 is a view showing an example of basic hardware configurations of communication apparatuses 4a to 4c and 5a to 5c according to the embodiment of the present invention.

FIG. 2 is a view showing an example of basic hardware configurations of the communication apparatuses 4a to 4c and 5a to 5c according to the embodiment of the present invention. As shown in FIG. 2, the communication apparatuses 4a to 4c and 5a to 5c each include a main CPU, a ROM, a RAM, a user I/O, and a network I/F. The main CPU executes processing regarding a communication service for transmitting data to or receiving data from another apparatus and an application service for providing a service which is specific to the apparatus to a user and another apparatus. Further, the main CPU reads out data and a program from the ROM or the RAM, and writes to the RAM. Further, the main CPU performs a display of information regarding an input acceptance from the user and a service through the user I/O, and performs transmission of data to or reception data from another communication apparatus and a router through the user I/O.

The described application service corresponds to a service such as providing information of a contents list, transmitting contents data, and the like in an example of the aforementioned AV recorder. Further, the communication service corresponds to communication control for exchanging information with an apparatus which is a communication partner, and the like.

(Function Configuration of Communication Apparatus with Relay Function)

Figure 3:
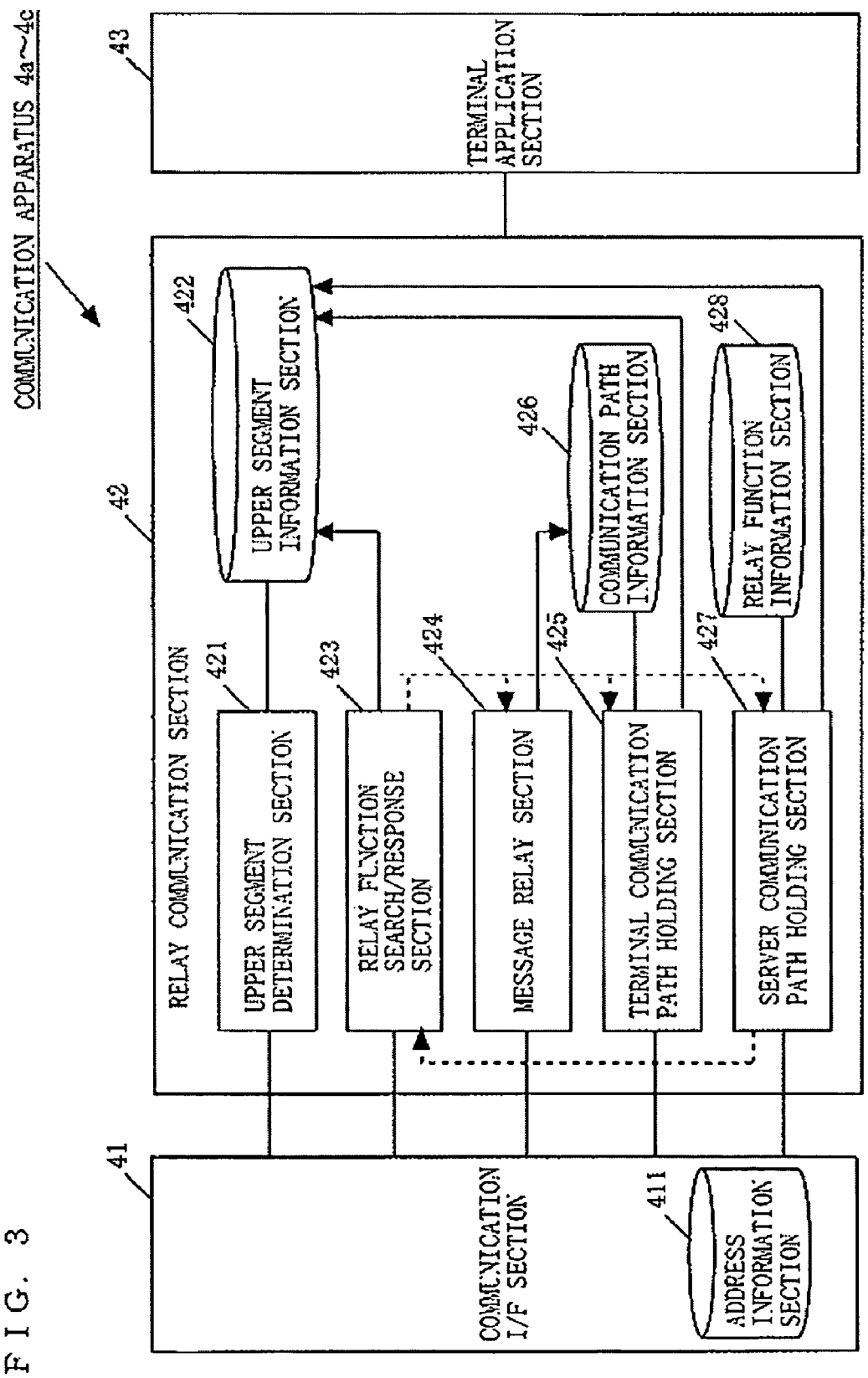
FIG. 3 is a block diagram showing an example of function configurations of the communication apparatuses 4a to 4c each having a relay function according to the embodiment of the present invention.

Using FIG. 3, the following will describe a function configuration for executing the communication service and the application service which are provided by the communication apparatuses 4a to 4c each having the relay function. FIG. 3 is a block diagram showing an example of function configurations of the communication apparatuses 4a to 4c each having the relay function according to the embodiment of the present invention.

As shown in FIG. 3, the communication apparatuses 4a to 4c each having the relay function each include a communication I/F section 41, a relay communication section 42, and a terminal application section 43. The communication I/F section 41 controls the network I/F, and transmits information to or receives information from the network. Further, the communication I/F section 41 manages address information of the communication apparatus in an address information section 411. When the relay communication section 42 turns on the relay function, the communication I/F section 41 executes resetting of the address information in accordance with an instruction from the relay communication section 42. By the resetting of the address information, it becomes easy for a communication apparatus under a lower router to find a communication apparatus whose relay function is turned on.

Here, an example of the address information managed by the address information section 411 includes an IP address, a netmask, a default gateway address, and the like, of the communication apparatus.

It is noted that this "address resetting processing" will be described later.

The relay communication section 42 provides a message relay function to allow communication to be performed between communication apparatuses by holding a communication path to another communication apparatus, and relaying a message, and also provides a message transmission/reception function to allow message communication to be performed with another apparatus via another communication apparatus having a relay function which is turned on by holding a communication path to the other communication apparatus having the relay function. The relay communication section 42 is not controlled such that the message relay function and the message transmission/reception function are concurrently activated. The relay communication section 42 is controlled such that the message transmission/reception function is inactivated when the message relay function is activated (i.e. when the communication apparatus provides the message relay function). On the other hand, the relay communication section 42 is controlled such that the message relay function is inactivated when the message transmission/reception function is activated. Selection of a function provided by the relay communication section 42 will be described later in later-described "Procedure until Start of Relay function". The relay communication section 42 provides a communication service which allows message communication between communication apparatuses to be performed through a relay function. It is noted that when a communication apparatus whose message relay function is turned on transmits a message to another communication apparatus, the communication apparatus performs transmission of the message through its own message relay function.

The terminal application section 43 executes processing regarding an application service for providing a service which is specific to the apparatus to the user and another apparatus via the user I/O and the relay communication section 42.

Further, the relay communication section 42 includes an upper segment determination section 421, an upper segment information section 422, a message relay section 424, a terminal communication path holding section 425, a communication path information section 426, a server communication path holding section 427, and a relay function information section 428. The following will describe each function section of the relay communication section 42.

The upper segment determination section 421 executes later-described upper segment analysis processing, and obtains network information under a router which is connected on an upper side (on an Internet side) of a router to which the communication apparatus is connected. For example, the upper segment determination section 421 of the communication apparatus 4b which has the relay function and is connected to the router 3b as shown in FIG. 1 obtains network information under the router 3a. Describing the upper segment analysis processing briefly, this processing is processing of obtaining a LAN-side address or a WAN-side address of an upper router or the router to which the communication apparatus is connected using a trace route or a UPnP IGD specification, and of presuming an address range of the upper router (i.e. an address range within which an address of a communication apparatus connected to the upper router is capable of being set) as a form of a network address using the obtained address.

The upper segment information section 422 is a function section for storing upper segment information obtained or presumed by the upper segment determination section 421. An example of the upper segment information includes network address information of an upper network. In other words, when a network address under the router 3a is 192.168.1.0/24, 192.168.1.0/24 is stored in the upper segment information section 422 of the communication apparatus 4b which has the relay function and is connected to the router 3b. Here, 192.168.1.0 indicates a network address, /24 indicates a bit number of a netmask.

Similarly, when the network address under the router 3b is 192.168.2.0/24, two network addresses, 192.168.1.0/24 and 192.168.2.0/24, are stored in the upper segment information section 422 of the communication apparatus 4c which has the relay function and is connected to the router 3c. It is noted that if a network address is known, it is easy to presume values which can be set as a host address. Thus, it is easy to presume an address which can be set to a communication apparatus connected to the network.

The relay function search/response section 423 uses the upper segment information stored by the upper segment information section 422, and provides processing of searching for whether or not a "communication apparatus whose relay function is activated" is connected to the upper router, and a function to transmit a response message for a relay function search request message from another communication apparatus when the relay function of the communication apparatus is activated. At this time, when the relay function search/response section 423 finds a relay function of another communication apparatus which is activated, the relay function search/response section 423 notifies the server communication path holding section 427 of address information of the found communication apparatus whose relay function is activated, and inactivates functions of the message relay section 424 and the terminal communication path holding section 425.

When the relay function search/response section 423 has not found any communication apparatus whose relay function is activated in the home network 2, the relay function search/response section 423 waits for a predetermined time period for confirming that the server communication path holding section 427 does not receive a communication path connection notification message from another communication apparatus having a relay function. When the server communication path holding section 427 receives a communication path request message, the server communication path holding section 427 connects a communication path for relay to another communication apparatus whose relay function is activated. Further, the relay function search/response section 423 inactivates the functions of the message relay section 424 and the terminal communication path holding section 425.

When the server communication path holding section 427 has not received a communication path connection request message from any other communication apparatus having a relay function for the predetermined time period, the relay function search/response section 423 activates the functions of the message relay section 424 and the terminal communication path holding section 425. It is noted that a processing sequence for determining activation/inactivation of the relay function will be described in detail again in the later-described "Procedure until Start of Relay Function".

When the relay function is activated, the message relay section 424 relays a message from a communication apparatus to another communication apparatus. The message relay section 424 determines a destination address by referring to destination information in the received message and communication path information managed by the communication path information section 426, and transfers the received message to a destination communication apparatus.

When the relay function is activated, if the terminal communication path holding section 425 receives a communication path connection request message from another communication apparatus, the terminal communication path holding section 425 stores source address information (an IP address, a port number) of the message, and an ID of a source communication apparatus which is included in the message as communication path information in the communication path information section 426. Further, the terminal communication path holding section 425 periodically performs communication with a communication apparatus for holding a communication path. Further, the terminal communication path holding section 425 refers to the upper segment information section 422, periodically presumes an address of a communication apparatus connected under the upper router, and transmits a communication path connection notification message to the presumed address.

The communication path information section 426 stores information of a communication path to a communication apparatus which is held by the terminal communication path holding section 425. An example of the communication path information stored by the communication path information section 426 includes an ID, address information (an IP address, a port number) of the communication apparatus.

The server communication path holding section 427 operates in accordance with an instruction from the message relay section 424, and when the relay function of the communication apparatus (i.e. the message relay section 424 and the terminal communication path holding section 425) is inactivated, the server communication path holding section 427 provides a function to establish and hold a communication path for relay to another communication apparatus whose relay function is activated. The server communication path holding section 427 transmits a communication path connection request message to a "communication apparatus whose relay function is activated" and which is designated by the relay function search/response section 423. Further, the server communication path holding section 427 refers to the upper segment information section 422, presumes an address of a communication apparatus whose relay function is activated and which is connected under the upper router, and transmits a communication path connection request message to the presumed address. Further, when the server communication path holding section 427 receives a communication path connection notification message from a "communication apparatus whose relay function is activated" and which is connected to a lower router, the server communication path holding section 427 transmits a communication path connection request message to the source communication apparatus.

(Function Configuration of Communication Apparatus without Relay Function)

Figure 4:
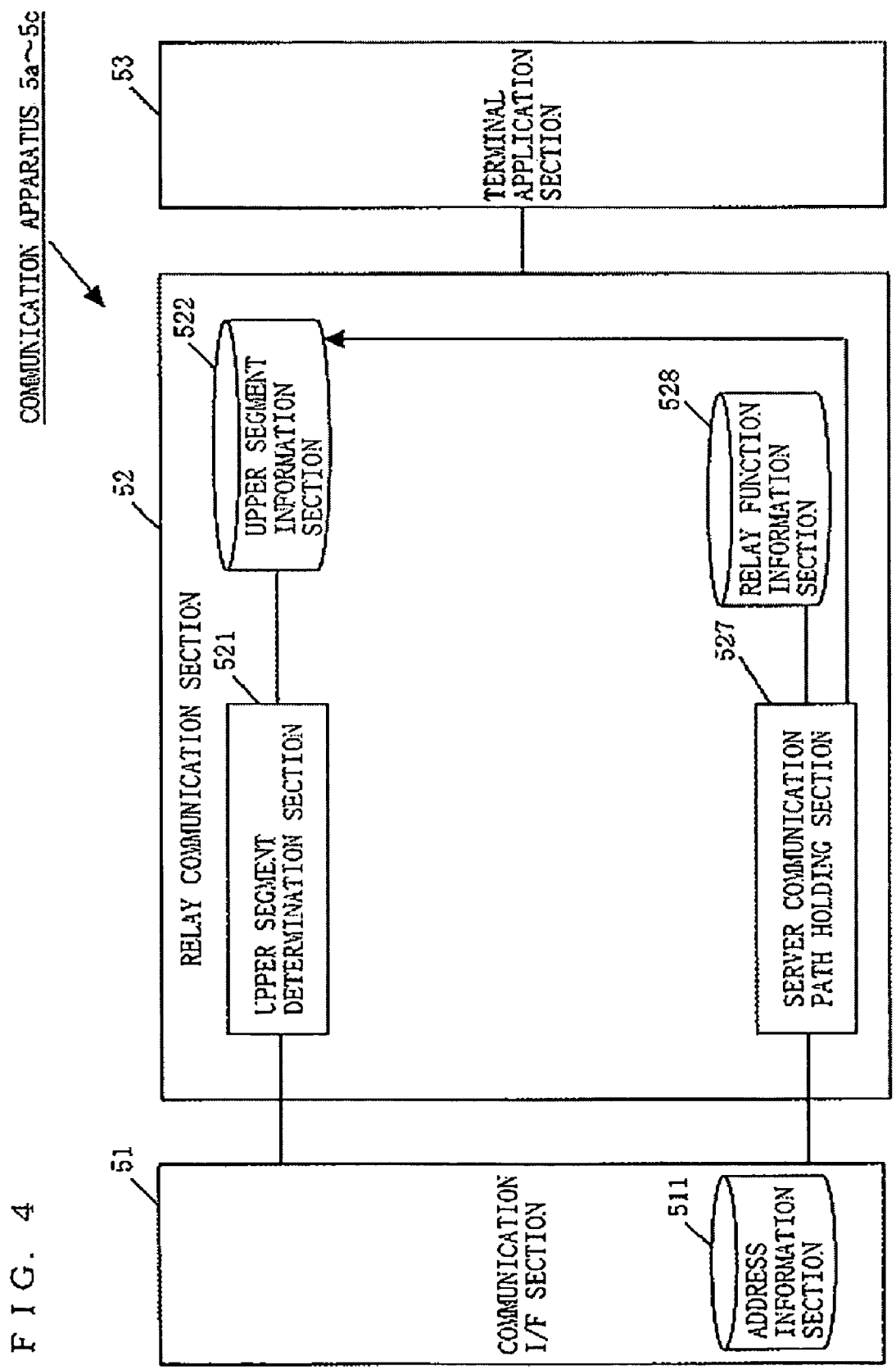
FIG. 4 is a block diagram showing an example of function configurations of the communication apparatuses 5a to 5c each not having a relay function according to the embodiment of the present invention.

Using FIG. 4, function configurations of the communication apparatuses 5*a* to 5*c* each not having the relay function will be described. FIG. 4 is a block diagram showing an example of the function configurations of the communication apparatuses 5*a* to 5*c* each not having the relay function according to the embodiment of the present invention. As shown in FIG. 4, the function configurations of the communication apparatuses 5*a* to 5*c* each not having the relay function are configurations in which function sections regarding the relay function are removed from the communication apparatuses 4*a* to 4*c* each having the relay function. The following will describe the function configurations.

As shown in FIG. 4, the communication apparatuses 5*a* to 5*c* each not having the relay function each include a communication I/F section 51, a relay communication section 52, and a terminal application section 53. The communication I/F section 51 controls the network I/F, and transmits information to and receives information from the network. The communication I/F section 51 differs from the communication I/F sections 41 of the aforementioned communication apparatuses 4*a* to 4*c* each having the relay function in not performing resetting of an address in accordance with an instruction from the relay communication section 52.

The relay communication section 52 provides a message transmission/reception function to hold a communication path to another communication apparatus having a relay function which is turned on to allow message communication with another apparatus to be performed via the other communication apparatus having the relay function. The relay communication section 52 differs from the relay communication sections 42 of the aforementioned communication apparatuses 4*a* to 4*c* each having the relay function in not having a message relay function.

The terminal application section 53 executes processing regarding an application service for providing a service which is specific to the apparatus to the user and another apparatus via the user I/O and the relay communication section 52.

Further, the relay communication section 52 includes an upper segment determination section 521, an upper segment information section 522, a server communication path holding section 527, and a relay function information section 528. The following will describe each function section of the relay communication section 52.

The upper segment determination section 521 executes later-described upper segment analysis processing similarly as the aforementioned upper segment determination section 421, obtains or presumes network address information under a router which is connected on the upper side (on the Internet side) of the router to which the communication apparatus is connected, and stores the obtained network address information in the upper segment information section 522.

The server communication path holding section 527 provides a function to establish and hold a communication path for message relay to another communication apparatus whose relay function is activated. The server communication path holding section 527 refers to the upper segment information section 522, presumes an address of a "communication apparatus whose relay function" and which is connected to an upper router, and transmits a communication path connection request message to the presumed address.

Further, when the server communication path holding section 527 receives a communication path connection notification message from a communication apparatus whose relay function is activated and which is connected to a lower router, the server communication path holding section 527 transmits a communication path connection request message to the source communication apparatus. Further, when the server communication path holding section 527 establishes a communication path to a communication apparatus whose relay function is activated, the server communication path holding section 527 stores address information of the communication apparatus whose relay function is activated in the relay function information section 528, and periodically performs communication with the communication apparatus whose relay function is activated, thereby holding the communication path.

(Procedure Until Start of Relay Function)

Figure 5:
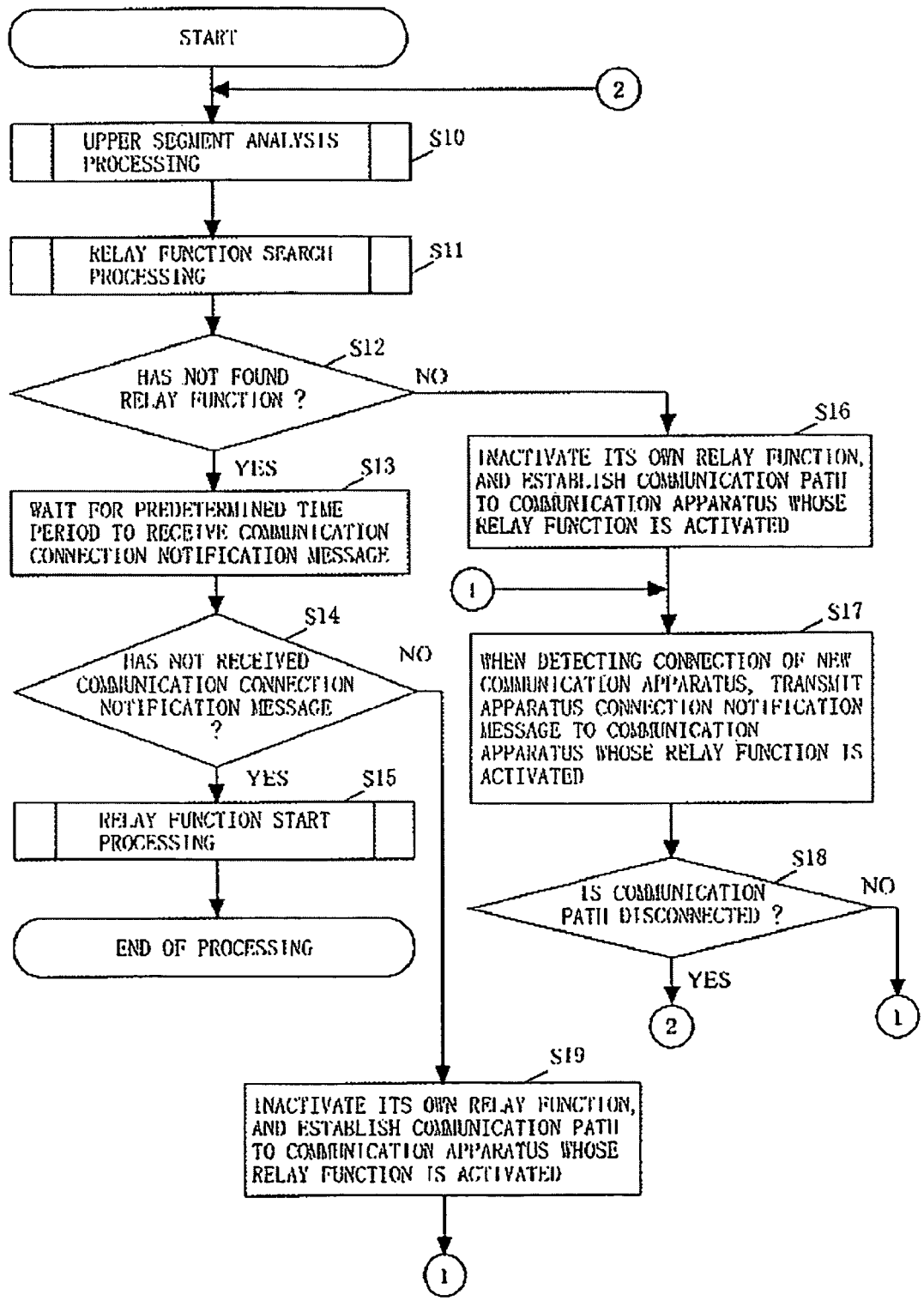
FIG. 5 is a view showing an example of an operation sequence until a relay communication section 42 starts a relay function according to the embodiment of the present invention.
Figure 8:
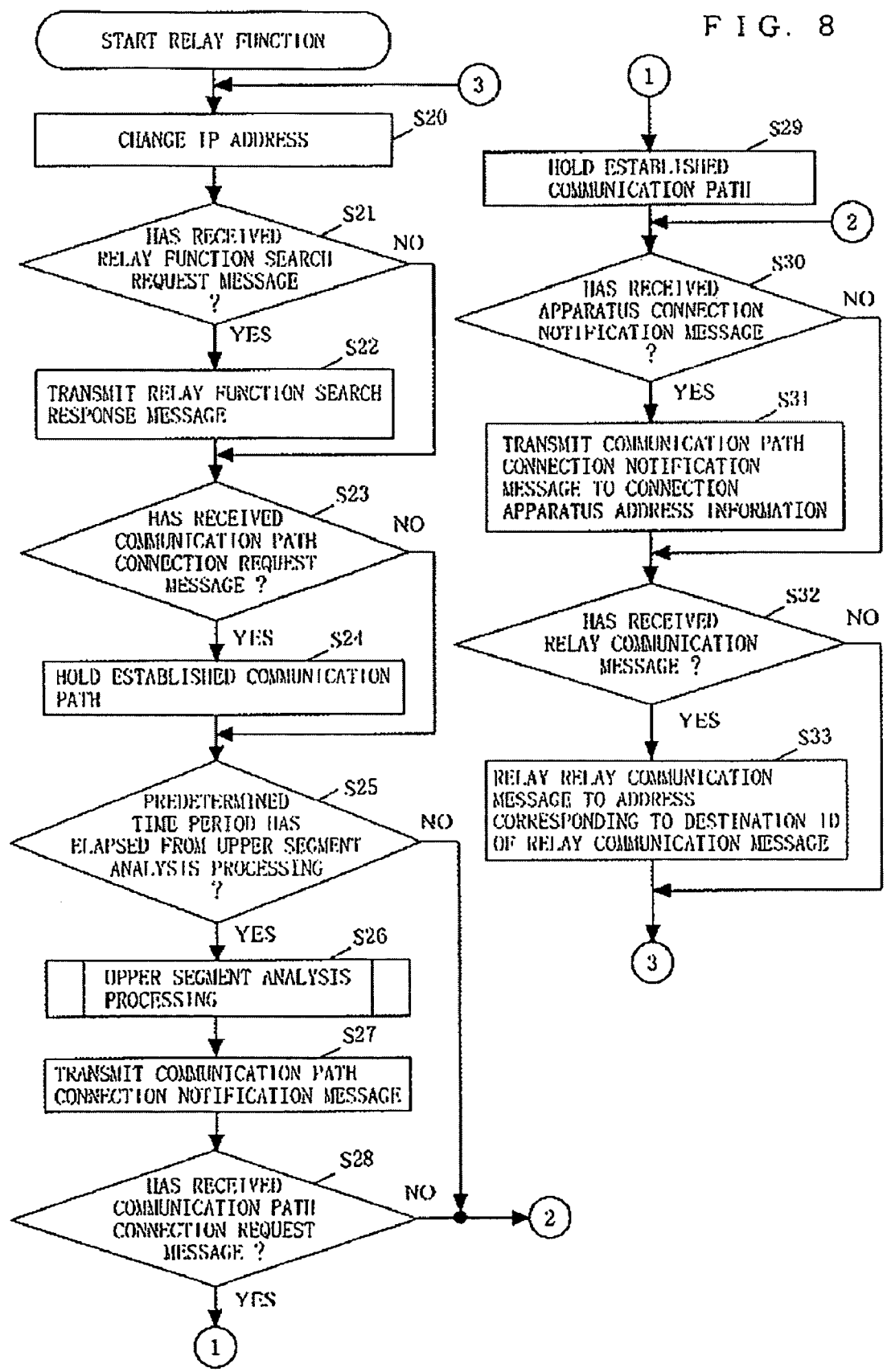
FIG. 8 is a view showing an example of an operation sequence of the relay communication section 42 when the relay function is activated according to the embodiment of the present invention.

The following will describe a procedure for the relay communication sections 42 of the communication apparatuses 4*a* to 4*c* each having the relay function to start the relay functions using FIGS. 5 and 8.

FIG. 5 is a view showing an example of an operation sequence until the relay communication section 42 starts the relay function according to the embodiment of the present invention.

First, the case where any communication apparatus whose relay function is activated does not exist on the network and the relay communication section 42 activates the relay function of the communication apparatus will be described.

(Procedure Until Start of Relay Function: Case of Activating Relay Function)

Referring to FIG. 5, the upper segment determination section 421 executes the later-described upper segment analysis processing, obtains network address information under a router which is connected on the upper side (on the Internet side) of the router to which the communication apparatus is connected, and stores the obtained network address information as upper segment information in the upper segment information section 422 (a step S10).

Then, the relay function search/response section 423 presumes an address of a "communication apparatus whose relay function is activated" and which is connected to each upper router using the upper segment information stored in the upper segment information section 422, and transmits a relay function search request message to the presumed address by unicast. For example, the communication apparatus 4*c* which has the relay function and is connected to the router 3*c* as shown in FIG. 1 presumes addresses of "communication apparatuses whose relay function is activated" and which are respectively connected to the router 3*a* and the router 3*c* based on network address information of the router 3*a* and the router 3*c*, and transmits a relay function search request message to the presumed addresses. However, in the processing of presuming an address of a "communication apparatus whose relay function is activated", when an address of a "communication apparatus whose relay function is activated" is set to have a specific address range, the relay function search/response section 423 may transmit a relay function search request message only to the specific address range. By this processing, the relay function search/response section 423 does not need to transmit a relay function search request message to all valid host addresses of the router 3*a* and the router 3*c* (e.g. 192.168.x.1 to 192.168.x.254 in the case of a private address of class C), and only has to transmit a relay function search request message only to the specific address range. As a result, speeding up of processing and reduction of communication traffic are possible.

Figure 6:
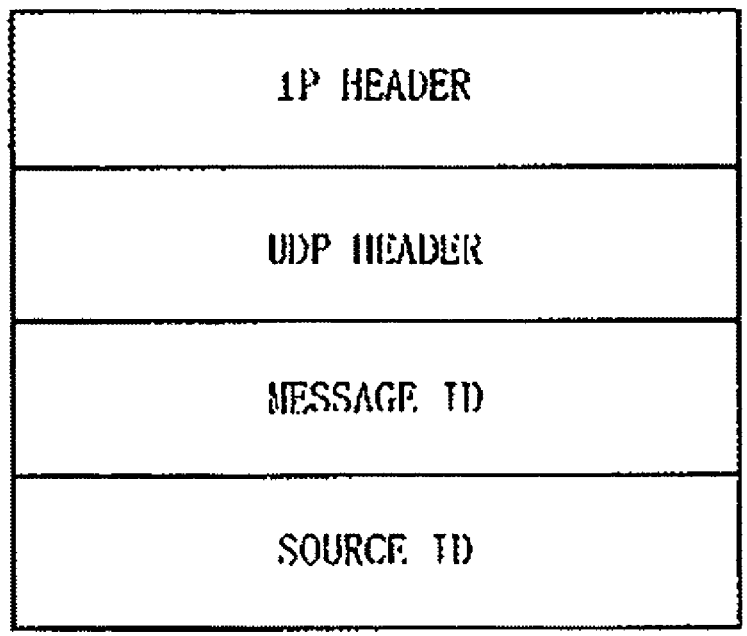
FIG. 6 is a view showing an example of a relay function search request/a response message/a communication path connection notice/a request/a response message according to the embodiment of the present invention.

FIG. 6 shows an example of the relay function search request message. In the relay function search request message as shown in FIG. 6, an ID indicative of the relay function search request message is set to a message ID. As a source ID, an ID which is specific to the communication apparatus is set.

When each of the communication apparatuses 4*a* to 4*c* which have the relay functions and are connected to the upper routers receives the relay function search request message, the relay function search/response section 423 transmits a relay function search response message to a source address (an IP address, a port number) of the relay function search request message only when the relay function of the communication apparatus is activated. An example of a format of the relay function search response message is the same as that of the relay function search request message as shown in FIG. 6. However, an ID value indicative of the relay function search response message is set to a message ID.

Here, in the case where communication is started from a communication apparatus connected to a LAN-side network to a communication apparatus connected to a WAN-side network, a router for relaying a communication message automatically executes address translation setting (NAPT setting), and transmits the communication message to the communication apparatus connected to the WAN-side network. Then, the communication apparatus connected to the WAN-side network transmits a response message to a source address (an IP address, a port number) of the received message, thereby allowing communication to be performed with the communication apparatus connected to the LAN-side network. Thus, the relay function search/response section 423 executes relay function search processing, and transmits a relay function search request message to a relay apparatus connected to the upper router as described above, whereby the relay function search/response section 423 becomes capable of receiving a response from a "communication apparatus whose relay function is activated" and which is connected to the upper router. As a result, the communication apparatus connected to the LAN-side network becomes capable of finding a "communication apparatus whose relay function is activated" (a step S11).

Next, the relay function search/response section 423 determines whether or not the relay function search/response section 423 has received a relay function search response message (i.e. whether or not the relay function search/response section 423 has found a relay function) (a step S12).

When the relay function search/response section 423 has not received a relay function search response message, the relay function search/response section 423 instructs the server communication path holding section 427 to wait for a predetermined time period to receive a communication path connection notification message from a "communication apparatus whose relay function is activated" and which is connected to the lower router. Here, an example of a format of the communication path connection notification message is the same as that of the relay function search request message as shown in FIG. 6, and an ID value indicative of the communication path connection notification message is set to a message ID (a step S13).

As described above, generally, when a router starts to transmit a message from a communication apparatus connected to a LAN-side network to a communication apparatus connected to a WAN-side network, the router becomes capable of relaying messages transmitted and received between the communication apparatuses. Thus, by the server communication path holding section 427 waiting for the predetermined time period to receive a communication path connection notification message, it becomes possible to find a "communication apparatus whose relay function is activated" and which is connected to the lower router. Further, by the server communication path holding section 427 transmitting a message to a source address (an IP address, a port number) of the received communication path connection notification message, it becomes possible to perform communication with the "communication apparatus whose relay function is activated" and which is connected to the lower router.

Subsequently, the relay function search/response section 423 confirms whether or not the server communication path holding section 427 has received a communication path connection notification message (a step S14).

When the server communication path holding section 427 has not received a communication path connection notification message, the relay function search/response section 423 notifies the message relay section 424, the terminal communication path holding section 425, and the server communication path holding section 427 of activation of the relay function, and executes relay function start processing (a step S15).

Next, also using FIG. 5, a sequence until the relay function is inactivated will be described. It is noted that an operation (a relay operation) after the relay function is activated will be described after the description of the sequence until the relay function is inactivated.

(Procedure Until Start of Relay Function: Case of Inactivating Relay Function)

Referring to FIG. 5, similarly as when the relay function is activated, the upper segment determination section 421 executes the later-described upper segment analysis processing, obtains network address information under a router which is connected on the upper side (on the Internet side) of the router to which the communication apparatus is connected, and stores the obtained network address information as upper segment information in the upper segment information section 422 (the step S10)

Next, the relay function search/response section 423 executes the relay function search processing. More specifically, the relay function search/response section 423 presumes an address of a "communication apparatus whose relay function is activated" and which is connected to each upper router using the upper segment information stored in the upper segment information section 422, and transmits a relay function search request message to the presumed address by unicast (the step S11).

When a "communication apparatus whose relay function is activated" and which is connected to the upper router exists, the "communication apparatus whose relay function is activated" transmits a relay function search response message to a source address (an IP address, a port number) of the relay function search request message.

The relay function search response message is transmitted to the source address of the relay function search request message by which communication is started form the communication apparatus connected to the LAN-side network to the communication apparatus connected to the WAN-side network, and thus transmitted over the router as described above.

Next, the relay function search/response section 423 determines whether or not the relay function search/response section 423 has received a relay function search response message (i.e. whether the relay function search/response section 423 has found a relay function) (the step S12).

When the relay function search/response section 423 has received a relay function search response message, the relay function search/response section 423 notifies the message relay section 424, the terminal communication path holding section 425, and the server communication path holding section 427 of inactivation of the relay function. Further, the relay function search/response section 423 notifies the server communication path holding section 427 of address information of a "communication apparatus whose relay function is activated".

The server communication path holding section 427 stores the address information of the "communication apparatus whose relay function is activated" in the relay function information section 428. Then, the server communication path holding section 427 transmits a communication path connection request message to the "communication apparatus whose relay function is activated", and receives a communication path connection response message from the "communication apparatus whose relay function is activated" to establish a communication path for message relay. Further, for holding the established communication path for message relay, the server communication path holding section 427 periodically performs transmission and reception of messages. This is for, for example, in the case where the server communication path holding section 427 performs communication with the "communication apparatus whose relay function is activated" by a UDP, preventing the address translation setting (NAPT setting) which is automatically set to the router when communication is started from the LAN-side network to the WAN-side network from being automatically deleted due to a fact that communication is not performed for a certain time period. Similarly, in order to prevent the address translation setting (NAPT setting) which is set to the router from being automatically deleted due to disconnection of a TCP session even in the case where the server communication path holding section 427 performs communication with the "communication apparatus whose relay function is activated" by a TCP, the server communication path holding section 427 periodically executes transmission and reception of packets for holding a session (a step S16).

An example of a format of the communication path connection request message is the same as that of the relay function search request message as shown in FIG. 6, and an ID value indicative of the communication path connection request message is set to a message ID. The "communication apparatus whose relay function is activated" and which has received the communication path connection request message transmits a response message, takes out a source ID and source address information (an IP address, a port number) from the communication path connection request message, and stores the source ID and the source address information in the communication path information section 426.

After establishing the communication path to the "communication apparatus whose relay function is activated", the relay communication section 42 executes the following processing.

Figure 7:
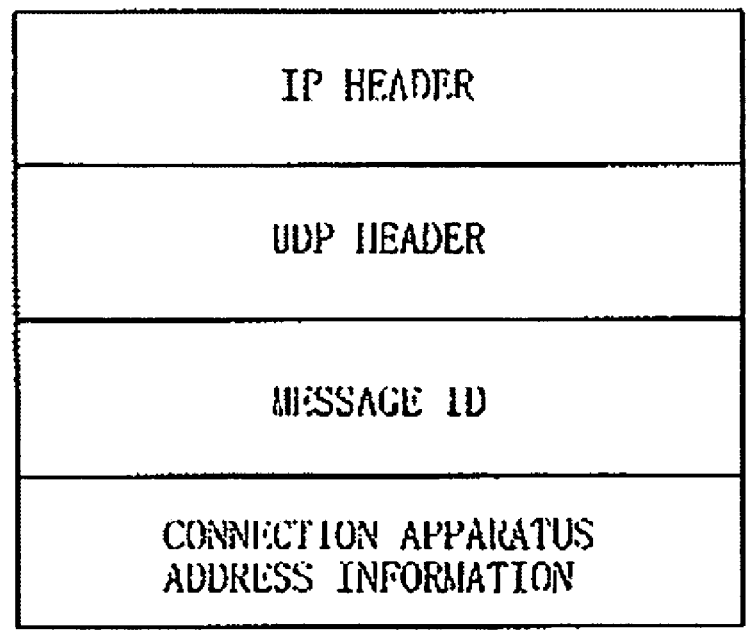
FIG. 7 is a view showing an example of an apparatus connection notification message according to the embodiment of the present invention.

In the case where the relay communication section 42 establishes the communication path to the "communication apparatus whose relay function is activated" and which is connected to the lower router (i.e. in the case where a communication path connection notification message is received at a step S14 and the communication path to the "communication apparatus whose relay function is activated" is established), when the relay communication section 42 detects that a new communication apparatus is connected to the network to which the communication apparatus is connected, the relay communication section 42 transmits an apparatus connection notification message to the "communication apparatus whose relay function is activated". Address information of the new communication apparatus is set in the apparatus connection notification message, and transmitted through the established communication path. FIG. 7 shows an example of the apparatus connection notification message, an ID indicative of the apparatus connection notification message is set to a message ID, and the address information of the new communication apparatus is set to connection apparatus address information (a step S17).

Then, the server communication path holding section 427 monitors whether or not communication with the "communication apparatus whose relay function is activated" is successful by messages and packets periodically transmitted and received. For example, when a situation, such as a situation where a power of the "communication apparatus whose relay function is activated" is turned off, and the like, arises, transmission of messages and packets from the "communication apparatus whose relay function is activated" is interrupted, whereby the server communication path holding section 427 detects disconnection of the communication path. When the server communication path holding section 427 detects the disconnection of the communication path, the relay communication section 42 executes the processing sequentially from the upper segment analysis processing again (a step S18).

The following will describe the case where a relay function search response message has not been received in the processing of determining whether or not a relay function search response message has been received (i.e. whether or not a relay function has been found) at the step S12, In this case, as described in the "Procedure until Start of Relay Function: Case of Activating Relay Function", the server communication path holding section 427 executes processing of waiting for the predetermined time period to receive a communication path connection notification message (the step S13).

Then, the server communication path holding section 427 determines whether or not the server communication path holding section 427 has received a communication path connection notification message (the step S14).

When the communication path connection notification message is received from the "communication apparatus whose relay function is activated", the relay function search/response section 423 notifies the message relay section 424, the terminal communication path holding section 425, and the server communication path holding section 427 of inactivation of the relay function. Then, the server communication path holding section 427 transmits a communication path connection request message to a source address (an IP address, a port number) of the communication path connection notification message, and receives a communication path connection response message from the "communication apparatus whose relay function is activated" to establish a communication path for message relay. Further, for holding the established communication path for message relay, the server communication path holding section 427 periodically performs transmission and reception of messages (a step S19).

Then, as described above, the server communication path holding section 427 transmits an apparatus connection notification message according to need (the step S17).

Further, the server communication path holding section 427 monitors whether or not the communication path to the "communication apparatus whose relay function is activated" is held. When the server communication path holding section 427 detects disconnection of the communication path, the relay communication section 42 executes the processing sequentially from the upper segment analysis processing again (the step S18).

The above is a procedure until the relay function is activated/inactivated. Using FIG. 8, the following will describe an operation when the relay function is activated. FIG. 8 is a view showing an example of an operation sequence of the relay communication section 42 when the relay function is activated.

(Operation when Relay Function is Activated)

Referring to FIG. 8, when the relay function of the relay communication section 42 is activated, the relay function search/response section 423 instructs the communication I/F section 41 to change an IP address (i.e. address resetting processing). The communication I/F section 41 which has received this instruction changes an IP address of the communication apparatus (a step S20).

(Address Resetting Processing)

A procedure of the address resetting processing is executed as exemplified below.

The communication I/F section 41 takes out network address information which is currently set to the communication apparatus from the address information section 411. It is noted that the network address information is set to the address information section 411 by a DHCP, and the like, which is executed on start-up.

Next, the communication I/F section 41 grasps a valid range of a host address, and selects an address within the valid range of the host address among predetermined address candidates during the activation of the relay function.

The communication I/F section 41 confirms whether or not the selected address candidate during the activation of the relay function is used by another communication apparatus in the network by an ARP, a ping, and the like.

When the communication I/F section 41 detects that the selected address candidate is used by another communication apparatus, the communication I/F section 41 selects another address candidate, and confirms whether or not the other selected address candidate is used by another communication apparatus again.

The communication I/F section 41 executes the above procedure until the communication I/F section 41 finds an address which is not used by the other communication apparatuses.

The communication I/F section 41 changes the IP address of the communication apparatus to an IP address which is confirmed not to be used, and stores the changed IP address in the address information section 411.

As described above, when the relay function is activated, the communication apparatuses 4a to 4c presume an address of a communication apparatus whose relay function is activated and which is connected to a lower router by changing the IP address to an IP address among the predetermined address candidates. Thus, when the communication apparatuses 4a to 4c transmit a message by unicast, the communication apparatuses 4a to 4c become capable of narrowing down an IP address candidate, and hence speeding up of processing and reduction of communication traffic are possible.

When the change of the address is completed, message processing of the relay function and periodical upper segment analysis processing are started. First, the message processing of the relay function will be described.

When the relay function search/response section 423 receives a relay function search request message, the relay function search/response section 423 transmits a relay function search response message to a source address (an IP address, a port number) of the relay function search request message (steps S21 and S22).

When the terminal communication path holding section 425 receives a communication path connection request message, the terminal communication path holding section 425 transmits a communication path connection response message to a source address (an IP address, a port number) of the communication path connection request message, takes out a source ID and source address information (an IP address, a port number) from the communication path connection request message, and stores the source ID and the source address information in the communication path information section 426. It is noted that the terminal communication path holding section 425 may assign a corresponding apparatus ID to the source address information taken out from the communication path connection request message, and may store the apparatus ID as a source ID in the communication path information section 426. Then, the server communication path holding section 427 holds the established communication path by periodically performing transmission and reception of messages and packets (steps S23 and S24).

When the terminal communication path holding section 425 receives an apparatus connection notification message, the terminal communication path holding section 425 takes out connection apparatus address information from the received apparatus connection notification message, and transmits a communication path connection notification message to the taken connection apparatus address information. It is noted that when transmitting a communication path connection notification message, the terminal communication path holding section 425 may check whether or not the terminal communication path holding section 425 has already transmitted a message to the connection apparatus address information. When a message has been already transmitted to the connection apparatus address information, the terminal communication path holding section 425 may not transmit a message.

Here, as described above, the apparatus connection notification message is a message for, in the case where a new communication apparatus is connected to a network on an upper side of a network to which a "communication apparatus whose relay function is activated", notifying the "communication apparatus whose relay function is activated" of connection of the new communication apparatus. The apparatus connection notification message is transmitted by a communication apparatus in the network to which the new communication apparatus is connected, which communication apparatus has already established a communication path to the "communication apparatus whose relay function is activated".

When the terminal communication path holding section 425 receives the apparatus connection notification message, the terminal communication path holding section 425 transmits a communication path connection notification message, thereby obtaining an effect that in the case where a new communication apparatus is connected to an upper network, a communication path can be quickly connected between the new communication apparatus and the "communication apparatus whose relay function is activated" (steps S30 and S31).

Figure 9:
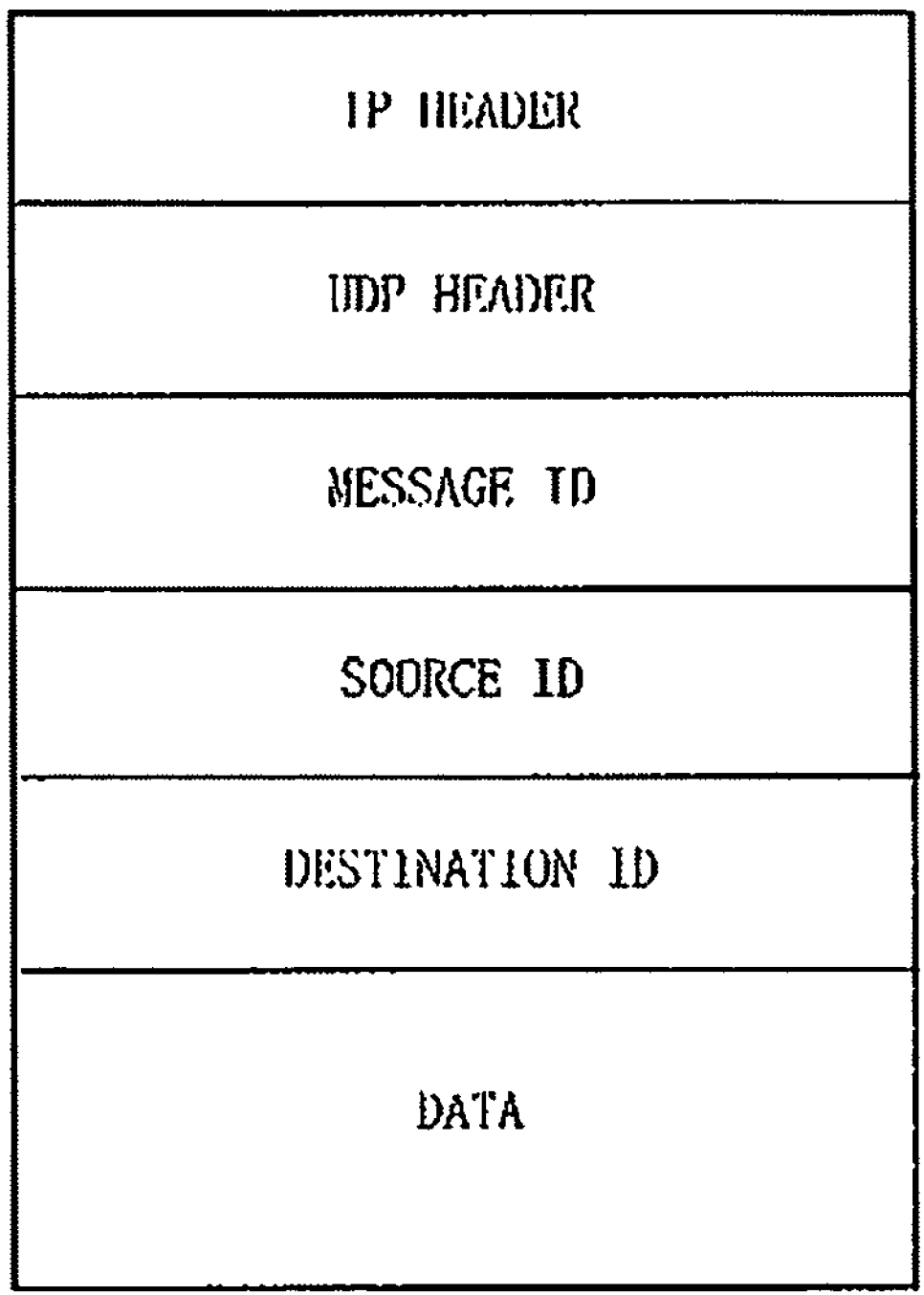
FIG. 9 is a view showing an example of a relay communication message according to the embodiment of the present invention.

It is noted that in the case where a new communication apparatus is connected to a network on a lower side of the network to which the "communication apparatus whose relay function is activated" is connected, unlike the case where the new communication apparatus is connected to the network on the upper side, it is possible to start communication from the new communication apparatus to the "communication apparatus whose relay function is activated", thereby presuming an address of the "communication apparatus whose relay function is activated". Thus, it is possible to quickly connect a communication path by transmitting a communication path connection request message to the "communication apparatus whose relay function is activated" immediately after the connection of the new communication apparatus. FIG. 9 shows an example of a relay communication message.

When the message relay section 424 receives a relay communication message, the message relay section 424 takes out a destination ID from the relay communication message, refers to the communication path information section 426, and obtains address information (an IP address, a port number) of the communication path for transmitting data to a destination communication apparatus corresponding to the taken destination ID. Then, the message relay section 424 rewrites a destination of the received relay communication message with the address information (the IP address, the port number) obtained from the communication path information section 426, and transmits the received relay communication message (steps S32 and S33).

The above is an operation of the message processing of the relay function. The following will describe the periodical upper segment analysis processing and a series of following processing.

The terminal communication path holding section 425 instructs the upper segment determination section 421 to re-execute the upper segment analysis processing when a predetermined time period has elapsed after execution of the later-described upper segment analysis processing (steps S25 and S26). When re-execution of the upper segment analysis processing is completed, the terminal communication path holding section 425 refers to the upper segment information section 422, and transmits a communication path connection notification message by unicast to each of addresses which can be set to communication apparatuses in a network under each upper router.

Each communication apparatus which has received the communication path connection notification message transmits a communication path connection request message to a source address of the communication path connection notification message (a step S27).

The terminal communication path holding section 425 which has received the communication path connection request message transmits a response message, takes out a source ID and source address information of the message from the communication path connection request message, refers to information in the communication path information section 426, and executes new record or update of recorded information according to need. Then, the terminal communication path holding section 425 holds a communication path by periodically transmitting messages and packets (steps S28 and S29).

The above is an operation of the relay communication section 42 when the relay function is activated.

In the operation until the relay function is activated, at the relay function search processing (the step S11), the relay communication section 42 presumes an address of a "communication apparatus whose relay function is activated", transmits a relay function search request message to the presumed address, and transmits a communication path connection request message after receiving a response message. However, the relay communication section 42 may not transmit a relay function search request message, and may transmit a communication path connection request message to an address of the "communication apparatus whose relay function is activated". In this case, by receiving a response message, the relay communication section 42 detects existence of the "communication apparatus whose relay function is activated", and at the same time, establishes a communication path for relay communication. As a result, steps of transmitting a relay function search request message and receiving a response are not needed, thereby obtaining an effect that processing is sped up.

Further, the sequence in which, in the operation until the relay function, the relay communication section 42 does not turn on the relay function of the communication apparatus when having found a "communication apparatus whose relay function is activated" is activated has been described. However, even when another "communication apparatus whose relay function is activated exists, the relay communication section 42 may turn on the relay function of the communication apparatus. In this case, each communication apparatus establishes communication paths to a plurality of "communication apparatuses whose relay functions are activated". By doing so, even when one "communication apparatus whose relay function is activated" is suddenly turned off to be unusable, it is possible to perform communication without interruption by relaying a message using another "communication apparatus whose relay function is activated".

(Operation Sequence of Communication Apparatus without Relay Function)

Figure 10:
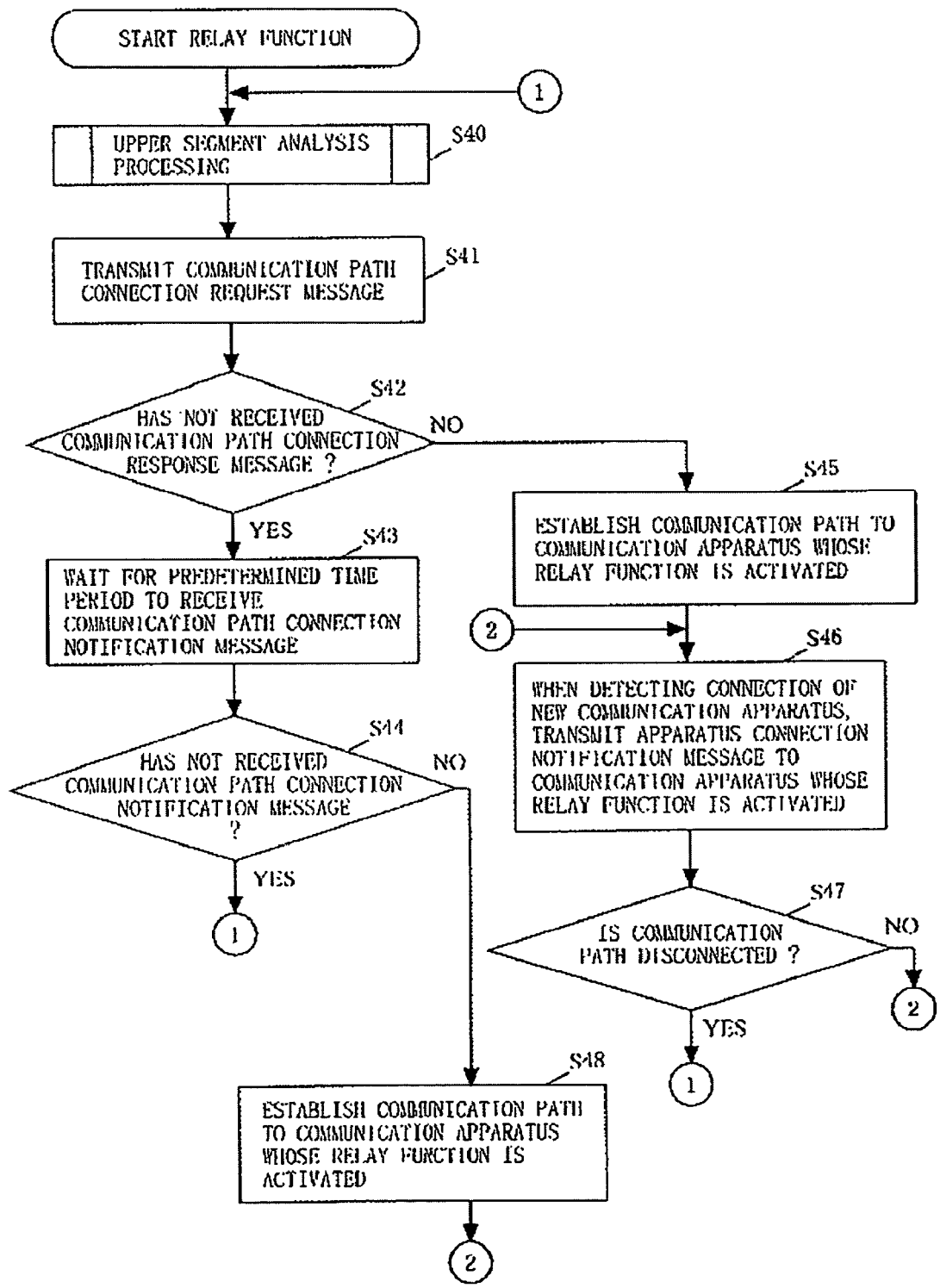
FIG. 10 is a view showing an example of operation sequences of the communication apparatuses 5a to 5c each not having the relay function according to the embodiment of the present invention.

The following will describe operation sequences of the communication apparatuses 5a to 5c each not having the relay function using FIG. 10.

The operation sequences of the communication apparatuses 5a to 5c each not having the relay function are similar to an operation of the communication apparatus which has the relay function and has found a "communication apparatus whose relay function is activated". The difference therebetween is that in the case of the operation sequence of the communication apparatus not having the relay function, the communication apparatus once presumes an address of a "communication apparatus whose relay function is activated" without searching for a "communication apparatus whose relay function is activated", and transmits a message to the presumed address for communication path connection.

Referring to FIG. 10, the upper segment determination section 521 executes the later-described upper segment analysis processing, obtains network address information under a router which is connected on the upper side (on the Internet side) of the router to which the communication apparatus is connected (or information of an address range within which an address of a communication apparatus connected to each upper router is capable of being set), and stores the network address information in the upper segment information section 522 (a step S40).

Then, the server communication path holding section 527 presumes an address of a "communication apparatus whose relay function is activated" and which is connected to each upper router using the upper segment information section 522, and transmits a communication path connection request message to the presumed address by unicast (a step S41).

When the "communication apparatus whose relay function is activated" and which is connected to the upper router exists, the "communication apparatus whose relay function is activated" transmits a communication path connection response message to a source address (an IP address, a port number) of the communication path connection request message.

The communication path connection response message is transmitted to the source address of the communication path connection request message by which communication is started from the communication apparatus connected to the LAN-side network to the communication apparatus connected to the WAN-side network, and hence transmitted via the router to the destination as described above.

Next, the server communication path holding section 527 determines whether or not the server communication path holding section 527 has received a communication path connection response message (a step S42).

When the server communication path holding section 527 has received a communication path connection response message, the server communication path holding section 527 stores address information of the "communication apparatus whose relay function is activated" in the relay function information section 528, and establishes a communication path for message relay. Further, for holding the established communication path for message relay, the server communication path holding section 527 periodically performs transmission and reception of messages. This is for, for example, in the case where the server communication path holding section 527 performs communication with the "communication apparatus whose relay function is activated" by a UDP, preventing the address translation setting (NAPT setting) which is automatically set to the router when communication is started from the LAN-side network to the WAN-side network from being automatically deleted due to a fact that communication is not performed for a certain time period. Similarly, in order to prevent the address translation setting (NAPT setting) which is set to the router from being automatically deleted due to disconnection of a TCP session even in the case where the server communication path holding section 527 performs communication with the "communication apparatus whose relay function is activated" by a TCP, the server communication path holding section 527 periodically executes transmission and reception of packets for holding a session (a step S45).

After establishing the communication path to the "communication apparatus whose relay function is activated", the relay communication section 52 executes the following processing.

In the case where the relay communication section 52 establishes a communication path to a "communication apparatus whose relay function is activated" and which is connected to a lower router (i.e. in the case where the relay communication section 52 receives the communication path connection notification message at the step S44 and establishes the communication path to the "communication apparatus whose relay function is activated"), when the relay communication section 52 detects that a new communication apparatus is connected to a network to which the communication apparatus is connected, the relay communication section 52 transmits an apparatus connection notification message to the "communication apparatus whose relay function is activated". Address information of the new communication apparatus is set in the apparatus connection notification message, and transmitted through the established communication path. FIG. 7 is an example of the apparatus connection notification message, an ID indicative of the apparatus connection notification message is set to a message ID, and the address information of the new communication apparatus is set to the connection apparatus address information (a step S46).

Then, the server communication path holding section 527 monitors whether or not communication with the "communication apparatus whose relay function is activated" is successful by messages and packets periodically transmitted and received. For example, when a situation, such as a situation where a power of the "communication apparatus whose relay function is activated" is turned off, and the like, arises, transmission of messages and packets from "the communication apparatus whose relay function is activated" is interrupted, whereby the server communication path holding section 527 detects disconnection of the communication path. When the server communication path holding section 527 detects the disconnection of the communication path, the relay communication section 52 executes the processing sequentially from the upper segment analysis processing again (a step S47).

The following will describe the case where, in the processing of determining whether or not a communication path connection response message has been received (i.e. whether or not a relay function has been found) at the step S42, a communication path connection response message has not been received.

In this case, the server communication path holding section 527 executes processing of waiting for a predetermined time period to receive a communication path connection notification message (a step S43).

Then, the server communication path holding section 527 determines whether or not server communication path holding section 527 has received a communication path connection notification message (a step S44).

When the server communication path holding section 527 has received a communication path connection notification message from the "communication apparatus whose relay function is activated", the server communication path holding section 527 transmits a communication path connection request message to a source address (an IP address, a port number) of the communication path connection notification message. Then, the server communication path holding section 527 receives a communication path connection response message from the "communication apparatus whose relay function is activated" to establish a communication path for message relay. Further, for holding the established communication path for message relay, the server communication path holding section 527 periodically performs transmission and reception of messages (a step S48).

Then, as described above, the server communication path holding section 527 transmits an apparatus connection notification message according to need (the step S46). Further, the server communication path holding section 527 monitors whether or not the communication path to the "communication apparatus whose relay function is activated" is held. When the server communication path holding section 527 detects disconnection of the communication path, the relay communication section 52 executes the processing sequentially from the upper segment analysis processing again (the step S47).

The above is the operation sequences of the communication apparatuses 5*a* to 5*c* each not having the relay function.

It is noted that the described operation sequences of the communication apparatuses 5*a* to 5*c* are an example. Alternatively, similarly as the sequences of the communication apparatuses 4*a* to 4*c* each having the relay function, the communication apparatus not having the relay function may search for a "communication apparatus whose relay function is activated", and may transmit a message for communication path connection after finding.

Further, when each of the terminal application sections 43 of the communication apparatuses 4a to 4c each having the relay function desire to transmit data to another communication apparatus, the terminal application section 43 delivers data to be desired to transmit and an ID of the destination communication apparatus to the relay communication section 42 to request data transmission. The relay communication section 42 which has received the request refers to the communication path information section 426 when the relay function of the communication apparatus is activated, and obtains address information corresponding to the ID. Then, the relay communication section 42 creates a relay communication message, and transmits the message to the obtained address information.

The relay communication section 42 creates a relay communication message when the relay function of the communication apparatus is inactivated, and transmits the message to a "communication apparatus whose relay function is activated" through an established communication path.

In the case of the communication apparatuses 5a to 5c each not having the relay function, similarly, when the terminal application section 53 of the communication apparatus 5 desires to transmit data to another communication apparatus, the terminal application section 53 delivers data to be desired to transmit and an ID of the destination communication apparatus to the relay communication section 52 to request data transmission. Then, the relay communication section 52 which has received the request creates a relay communication message, and transmits the message to a "communication apparatus whose relay function is activated" through an established communication path.

As described in the relay operation, a destination ID in the relay communication message which has been transmitted to the "communication apparatus whose relay function is activated" is referred to by the "communication apparatus whose relay function is activated". Then, the "communication apparatus whose relay function is activated" obtains address information of a communication path corresponding to the destination ID from the communication path information section 426, and transmits the received relay communication message to the obtained address information of the communication path. As a result, the message transmitted by the communication apparatus is transmitted to the destination communication apparatus via the "communication apparatus whose relay function is activated" over the router. As described above, the "communication apparatus whose relay function is activated" is capable of connecting a communication path to communication apparatuses in the same network as well as to all communication apparatuses connected to upper networks and all communication apparatuses connected to lower networks. Thus, each communication apparatus is capable of performing communication with any communication apparatus in the home network 2 in FIG. 1 using a relay communication message.

Further, in the case where it is possible to perform direct communication without relay by a "communication apparatus whose relay function is activated" as in the case where a communication partner exists in the same network or in an upper network, the terminal application sections 43 and 53 may not perform communication with a communication apparatus via the relay communication sections 42 and 52 and a "communication apparatus whose relay function is activated", but may perform communication with a communication apparatus via the communication I/F sections 41 and 51.

(Relay Function and Message Sequence of Communication Apparatus)

Figure 11:
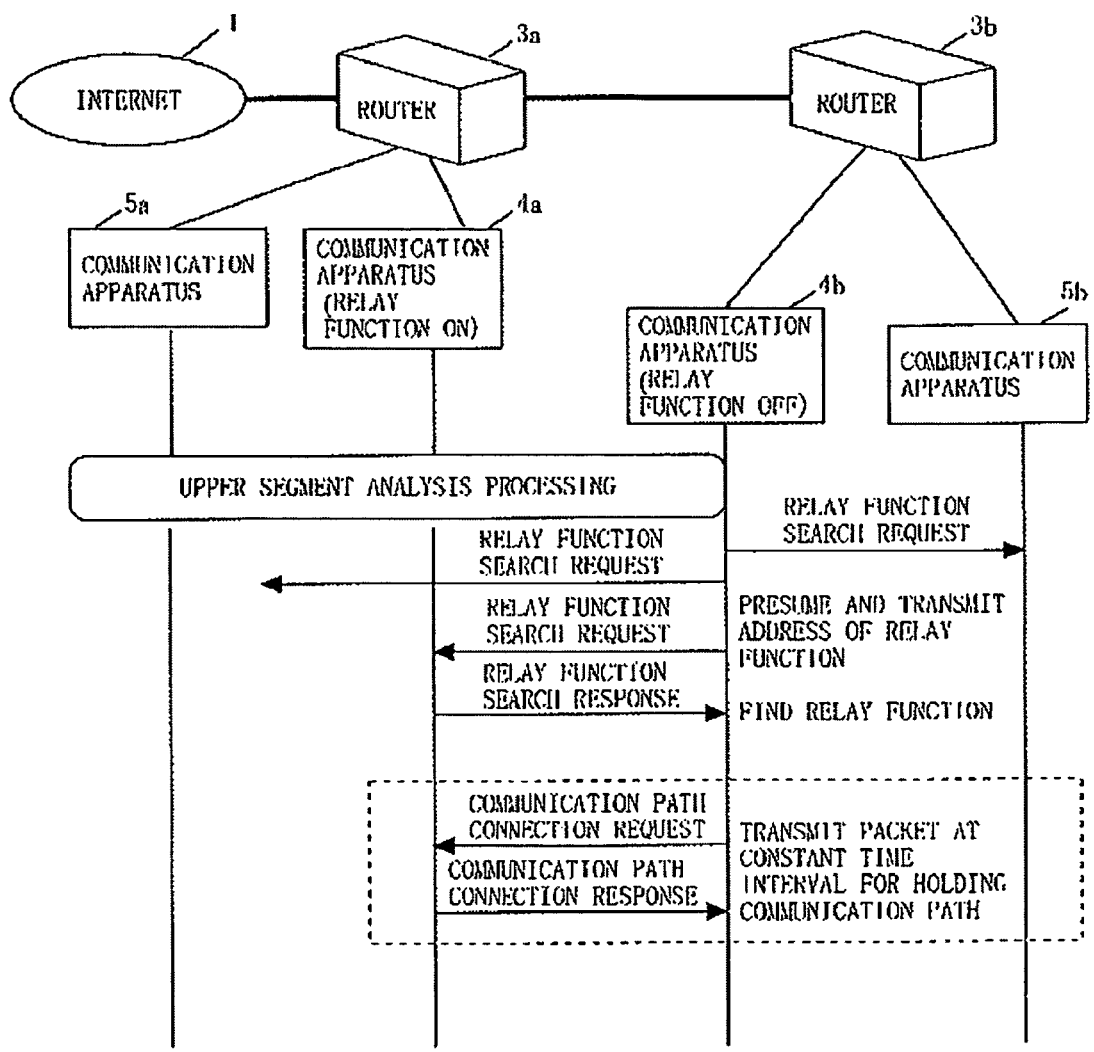
FIG. 11 is a view showing an example of a message sequence until a communication path for relay communication is connected between the communication apparatus 4b and the communication apparatus 4a whose relay function is activated according to the embodiment of the present invention.
Figure 12:
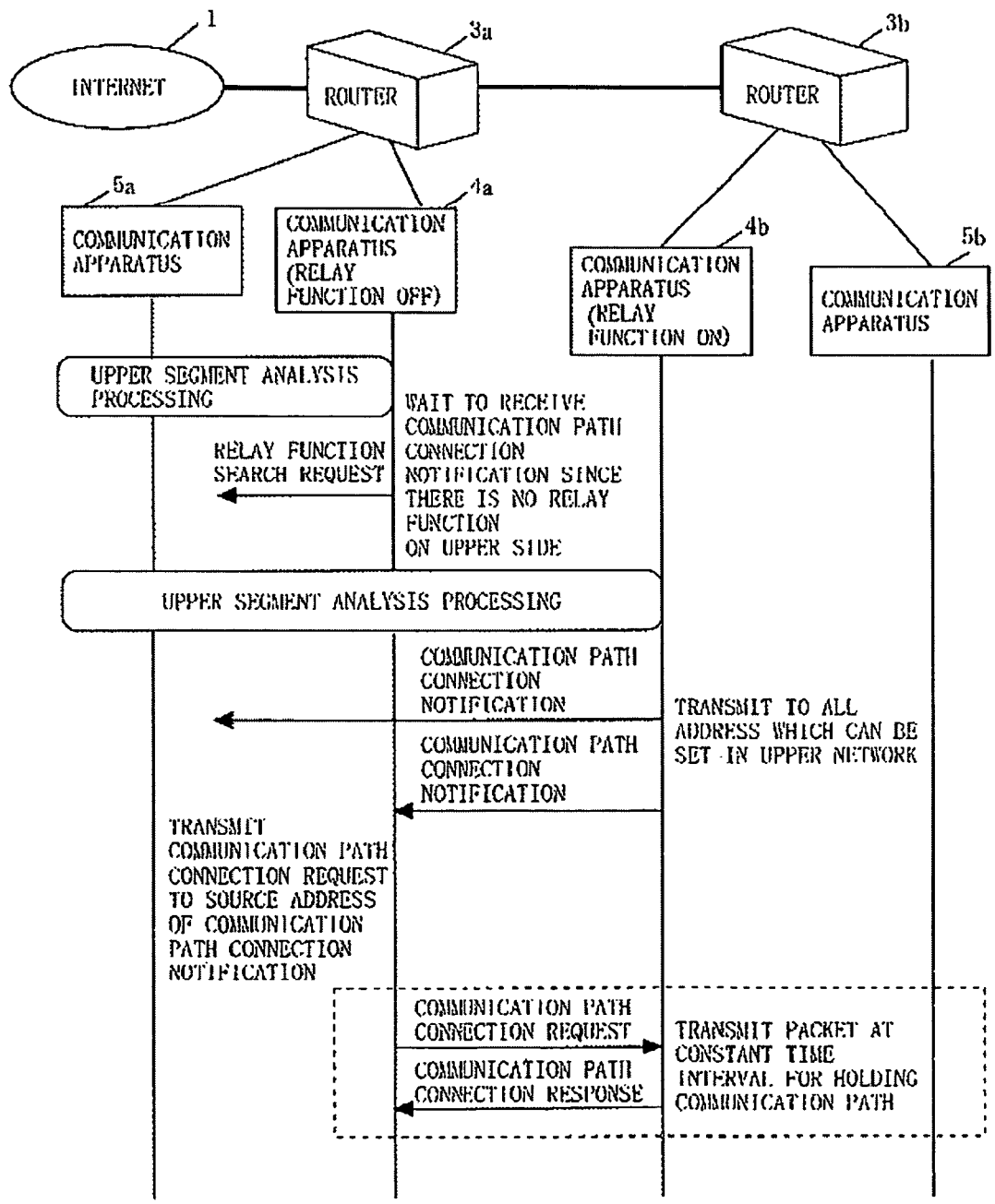
FIG. 12 is a view showing an example of a message sequence until a communication path for relay communication is connected between the communication apparatus 4a and the communication apparatus 4b whose relay function is activated according to the embodiment of the present invention.
Figure 13:
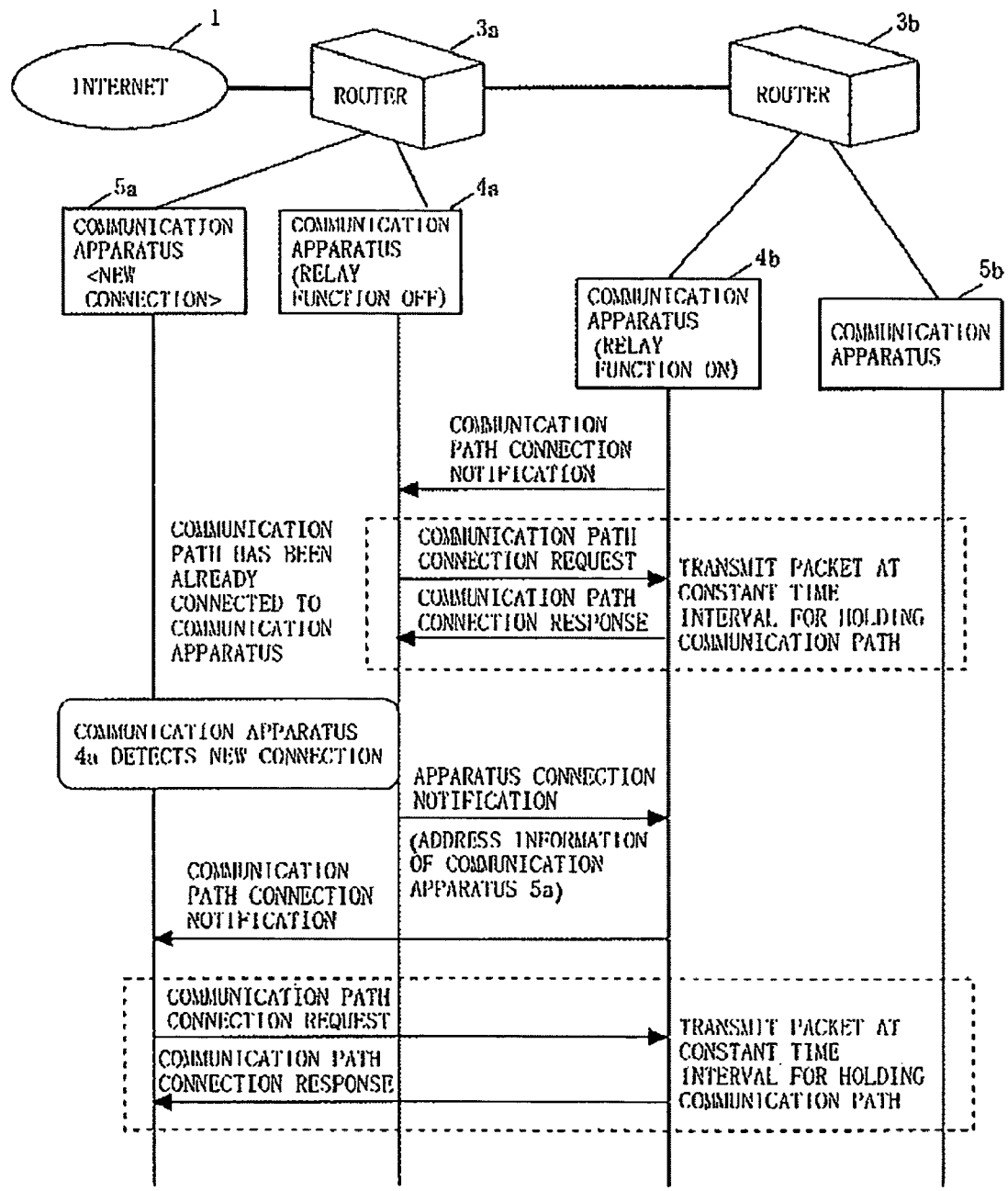
FIG. 13 is a view showing an example of a message sequence until a communication path for relay communication is connected between a new communication apparatus 5a and the communication apparatus 4b whose relay function is activated according to the embodiment of the present invention.

The following will describe a message sequence executed by the aforementioned operation of the communication apparatus using FIGS. 11 to 13.

(Message Sequence: Case where Relay Function is Connected to Upper Network)

FIG. 11 shows an example of a message sequence until a communication path for relay communication is connected between the communication apparatus 4b and the "communication apparatus 4a whose relay function is activated" and which is connected to the upper router 3a when the communication apparatus 4b is connected to the network under the router 3b.

Referring to FIG. 11, the communication apparatus 4b executes the later-described upper segment analysis processing, and obtains or presumes network address information of the router 3a when only the router 3a exists as an upper router in the home network 2. Then, the communication apparatus 4b refers to the obtained network address information, presumes an address of a "communication apparatus whose relay function is activated", and transmits a relay function search request message to the presumed address. Further, the communication apparatus 4b transmits the relay function search request message to the network to which the communication apparatus 4b is connected.

Transmission of the relay function search request message to another network is communication from a LAN-side network to a WAN-side network for the router 3b. Thus, address translation setting (NAPT setting) is automatically executed, and the relay function search request message is transmitted to a destination address of an upper network.

When the transmitted relay function search request message is received by the "communication apparatus 4a whose relay function is activated", the communication apparatus 4a transmits a relay function search response message to a source address (an IP address, a port number) of the received message. When transmitting the relay function search response message to the source address of the received message, the communication apparatus 4a uses the address translation setting (the NAPT setting) which is created when the relay function search request message is transmitted, and the response message transmitted from a WAN-side network of the router 3b is delivered to the communication apparatus 4b connected to a LAN-side network of the router 3b.

The communication apparatus 4b which has received the relay function search response message recognizes that a source address of the response message is address information of the "communication apparatus whose relay function is activated", and transmits a communication path connection request message to the address information. Then, the communication apparatus 4b receives a communication path connection response message from the "communication apparatus 4a whose relay function is activated" to establish a communication path between the communication apparatus 4b and the "communication apparatus 4a whose relay function is activated".

As described above, each communication apparatus has a function to execute the upper segment analysis processing, to presume an address of a "communication apparatus whose relay function is activated" and which is can be connected to an upper network, and to transmit a relay function search request message to the presumed address. Thus, even when the "communication apparatus whose relay function is activated" is connected to an upper network, an effect that a communication path is allowed to be connected between a communication apparatus and the "communication apparatus whose relay function is activated" is obtained.

The present embodiment has described that even when a "communication apparatus whose relay function is activated" in the same network is searched for, an address is presumed and a relay function search request message is transmitted. However, this is an example, and it is obvious that a "communication apparatus whose relay function is activated" may be searched for using multicast or broadcast.

(Message Sequence: Case where Relay Function is Connected to Lower Network)

FIG. 12 shows an example of a message sequence until a communication path for relay communication is connected between the communication apparatus 4a and the "communication apparatus 4b whose relay function is activated" and which is connected to the lower router 3b when the communication apparatus 4a is connected to the network under the router 3a.

Referring to FIG. 12, the communication apparatus 4a executes the later-described upper segment analysis processing, and obtains only network address information of the network to which the communication apparatus 4a is connected when there is no router on an upper side in the home network 2. The communication apparatus 4a refers to the network address, presumes an address of a "communication apparatus whose relay function is activated", and transmits a relay function search request message to the presumed address. However, the communication apparatus 4a cannot find a "communication apparatus whose relay function is activated", and hence waits for a specified time (T1) for arrival of a communication path connection notification message from a lower network.

The "communication apparatus 4b whose relay function is activated" executes upper segment analysis processing at a certain time interval (T2), refers to obtained network address information of an upper network, and transmits a communication path connection notification message to all addresses which can be set in the upper network.

Here, where T1 and T2 are set so as to satisfy T1>T2, when there is the "communication apparatus 4b whose relay function is activated" in the home network 2, the communication apparatus 4a receives a communication path connection notification message within T1. The relay apparatus 4a which has received the communication path connection notification message transmits a communication path connection request message to a source address of the communication path connection notification message.

Similarly as in the "Sequence: Case Where Relay Function is Connected to Upper Network", transmission of the communication path connection notification message is communication from a LAN-side network to a WAN-side network for the router 3b. Thus, address translation setting (NAPT setting) is automatically executed by the router 3b, and the communication path connection notification message is transmitted to the communication apparatus 4a. When transmitting a communication path connection request message to a source address of the received message, the communication apparatus 4a uses the address translation setting (the NAPT setting) which is automatically set in the communication path connection notification message, and the communication path connection request message transmitted from the WAN-side network of the router 3b is delivered to the communication apparatus 4b connected to the LAN-side network of the router 3b. The "communication apparatus 4b whose relay function is activated" transmits a communication path connection response message, and the communication apparatus 4a receives the communication path connection response message to establish a communication path between the communication apparatus 4a and the "communication apparatus 4b whose relay function is activated".

As described above, when each communication apparatus has not found a "communication apparatus whose relay function is activated" in the upper network, each communication apparatus waits for the specified time (T1) to receive a communication path connection notification message. In addition, the "communication apparatus whose relay function is activated" executes the upper segment analysis processing at the certain time interval (T2), refers to obtained network address information of the upper network, and transmits a communication path connection notification message to all addresses which can be set in the upper network. Thus, even when a communication apparatus is connected to a network on a upper side of the "communication apparatus whose relay function is activated", or even when a router is connected to the upper network to add a network which in turn an apparatus is connected to, an effect that a communication path is allowed to be connected between the communication apparatus and the "communication apparatus whose relay function is activated" is obtained.

In the present embodiment, the "communication apparatus whose relay function is activated" transmits a communication path connection notification message to all upper networks obtained by the upper segment analysis processing. However, the "communication apparatus whose relay function is activated" may not transmit a communication path connection notification message at the certain time interval (T2) to an upper network to which a communication apparatus which a communication path has been established to is connected, and as will be described next, only when finding a communication apparatus which is newly connected by the apparatus connection notification message, the "communication apparatus whose relay function is activated" may transmit a communication path connection notification message to the found communication apparatus. By so using the apparatus connection notification message, it becomes possible to reduce a number of times of transmission of the communication path connection notification message, and it becomes possible to reduce processing load of the "communication apparatus whose relay function is activated" and network traffic.

(Message Sequence: Communication Path Connection Using Apparatus Connection Notification Message)

FIG. 13 shows a message sequence until a communication path for relay communication is connected between a new communication apparatus 5a and the "communication apparatus 4b whose relay function is activated" and which is connected to the lower router 3b when the new communication apparatus 5a is connected to the network under the router 3a. Here, a configuration of the network in FIG. 13 is similar to that in FIG. 12, but the difference therebetween is that in FIG. 13, the communication apparatus 4a in the same network as the new communication apparatus 5a has already established a communication path to the "communication apparatus whose relay function is activated".

Referring to FIG. 13, when the new communication apparatus 5a is connected to the network, the communication apparatus 4a connected to the same network detects connection of the new communication apparatus 5a, and obtains address information of the communication apparatus 5a. As an example of a method for the communication apparatus 4a to detect the new communication apparatus 5a, if the communication apparatus 5a is a UPnP (Universal Plug and Play)—compliant apparatus, a method of detecting the communication apparatus 5a using an Alive packet transmitted by multicast is considered. Further, a method of detecting the communication apparatus 5a using a message transmitted for the new communication apparatus 5a to search for whether or not there is a "communication apparatus whose relay function is activated in the same network, and the like are considered.

When, the communication apparatus 4a detects the new communication apparatus 5a, the communication apparatus 4a transmits an apparatus connection notification message using the established communication path to the "communication apparatus 4b whose relay function is activated". At this time, the communication apparatus 4a sets address information of the communication apparatus 5a in the apparatus connection notification message, and transmits the apparatus connection notification message.

The "communication apparatus 4b whose relay function is activated" and which has received the apparatus connection notification message takes out the address information of the communication apparatus 5a from the message, and determines whether or not the communication apparatus 4b has already transmitted a communication path connection notification message to the taken address information. Then, when the communication path connection notification message has not been transmitted yet, the communication apparatus 4b transmits the communication path connection notification message to the taken address information of the communication apparatus 5a.

The communication apparatus 5a which has received the communication path connection notification message transmits a communication path connection request message to a source address of the communication path connection notification message. Then, the "communication apparatus 4b whose relay function is activated" transmits a communication path connection response message, and the communication apparatus 5a receives the message to establish a communication path between the communication apparatus 5a and the "communication apparatus 4b whose relay function is activated".

Here, the above-described apparatus connection notification message from the communication apparatus 4a is transmitted only when the communication apparatus 4a is connected to the network on the upper side of the "communication apparatus 4b whose relay function is activated". By so controlling, it becomes possible to prevent an apparatus connection notification message from coming from a lower network to which a communication path connection notification message cannot be delivered from the "communication apparatus 4b whose relay function is activated", and useless communication traffic is not generated. It is noted that when a new communication apparatus is connected to the lower network, the above new communication apparatus executes the upper segment analysis processing, presumes an address of a "communication apparatus whose relay function is activated", and transmits a communication path connection request message, thereby setting a communication path to the "communication apparatus whose relay function is activated". At this time, when the address of the "communication apparatus whose relay function is activated" is reset so as to be in a predetermined address range, it is possible to connect the communication path without transmitting many communication path connection request messages. Further, since it is possible to start a sequence for connecting a communication path from the new communication apparatus, it is possible to connect a communication path immediately after new connection.

As described above, each communication apparatus has a function to execute the upper segment analysis processing, to presume an address of a "communication apparatus whose relay function is activated" and which can be connected to the upper network, and to transmit a message. Each communication apparatus also has a function to, when not having found a "communication apparatus whose relay function is activated" in the upper network, wait for a specified time to receive a message from a "communication apparatus whose relay function is activated" and which is connected to a network on the lower side of the communication apparatus. The "communication apparatus whose relay function is activated" executes the upper segment analysis processing at a certain time interval, refers to obtained network address information of the upper network, and transmits a message to addresses which can be set in the upper network. Thus, it is seen that it is possible to establish a communication path even when the "communication apparatus whose relay function is activated" and the communication apparatus are arranged in any manner in the network as shown in FIG. 1.

The case where the home network 2 includes two routers as shown in FIGS. 11 to 13 has been described. However, it is obvious that even when two or more routers exist between a "communication apparatus whose relay function is activated" and a communication apparatus, it is possible to connect a communication path by the same method.

(Upper Segment Analysis Processing)

The following will describe the upper segment analysis processing executed by the communication apparatuses 4a to 4c and 5a to 5c.

The upper segment analysis processing is processing executed by each of the communication apparatuses 4a to 4c and 5a to 5c including a "communication apparatus whose relay function is activated". The upper segment analysis processing is processing of obtaining or storing network addresses of a network under a router to which the communication apparatus is connected and network addresses of a network under a router on the upper side (i.e. on the Internet side) of the router. Network address information of a network under the router to which the communication apparatus is connected is obtained from the communication I/F sections 41 and 51.

As an example of processing of obtaining a network address of an upper router, a method which is the same as that in Japanese Laid-Open Patent Publication No. 2005-103059 can be used. Here, its outline will be described.

The upper segment analysis processing includes two steps. The first step is a step of obtaining an address of an upper router in the home network 2 for obtaining the network address information of the upper router. The next step is a step of presuming the network address of the router (or, a range of an address which is valid in the network) using the obtained address of the router. Here, the network address of the router (or, the range of the address which is valid in the network) is referred to as an address space of the network. Further, the processing of presuming the address space of the network using the address information of the router is referred to as address space presumption processing.

As a method of obtaining the address of the upper router in the home network 2, a method of obtaining the address using a packet in which a TTL (Time To Live) is changed (a method which is the same as trace route), and a method of obtaining the address using a UPnP (Universal Plug and Play) IGD (Internet Gateway Device) specification can be used.

(Method Using Packet in which TTL is Changed)

Figure 14:
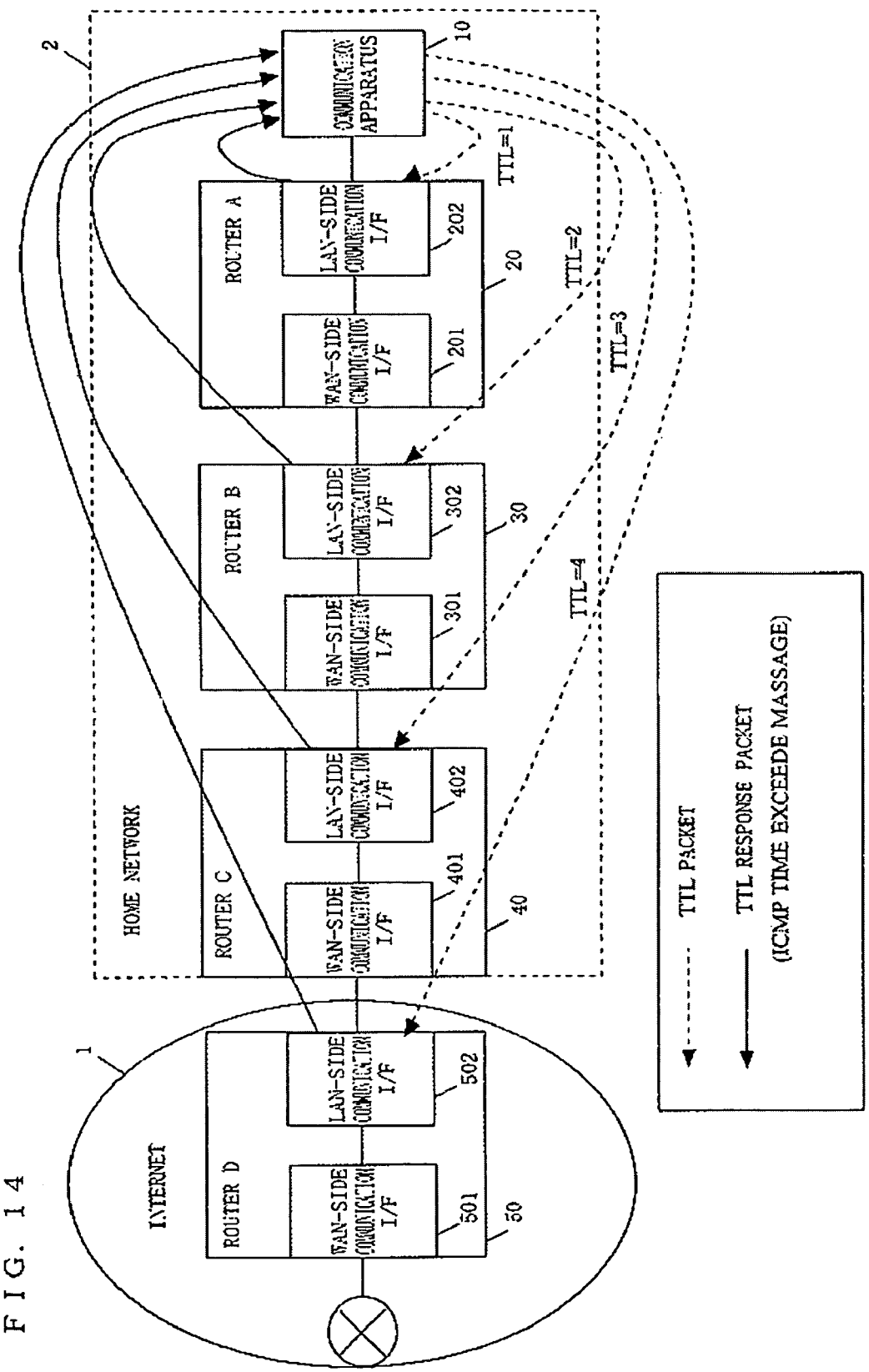
FIG. 14 is a view explaining a relation between a configuration of the home network 2 and a TTL packet in upper segment analysis processing according to the embodiment of the present invention.

A method of obtaining an address of a router using a packet in which a TTL is changed will be described. FIG. 14 is a view for explaining a relation between the configuration of the home network 2 and a TTL packet. As shown in FIG. 14, two different networks, the home network 2 and the Internet 1, are connected to each other. It is noted that the home network 2 may not a network at home as long as it is a local network. As shown in FIG. 14, the home network 2 includes a communication apparatus 10, a router A 20, a router B 30, and router C 40. The communication apparatus 10 corresponds to the communication apparatuses 4a to 4c and 5a to 5c which execute the upper segment analysis processing. The router A 20 includes a WAN-side communication I/F 201 and a LAN-side communication I/F 202. The router B 30 includes a WAN-side communication I/F 301 and a LAN-side communication I/F 302. The router C 40 includes a WAN-side communication I/F 401 and a LAN-side communication I/F 402. It is noted that regarding the router A 20, the router B 30, and the router C 40, description of components other than the WAN-side communication I/F and the LAN-side communication I/F is omitted.

The router C 40 is a gateway for connecting the home network 2 to the Internet 1 by connecting to a router D 50 in the Internet 1. In the router C 40, a global address is assigned to the WAN-side communication I/F 401, and a private address is assigned to the LAN-side communication I/F 402. Private addresses are assigned to the WAN-side communication I/F 201 and the LAN-side communication I/F 202 of the router A 20, and the WAN-side communication I/F 301 and the LAN-side communication I/F 302 of the router B 30, respectively.

Figure 15:
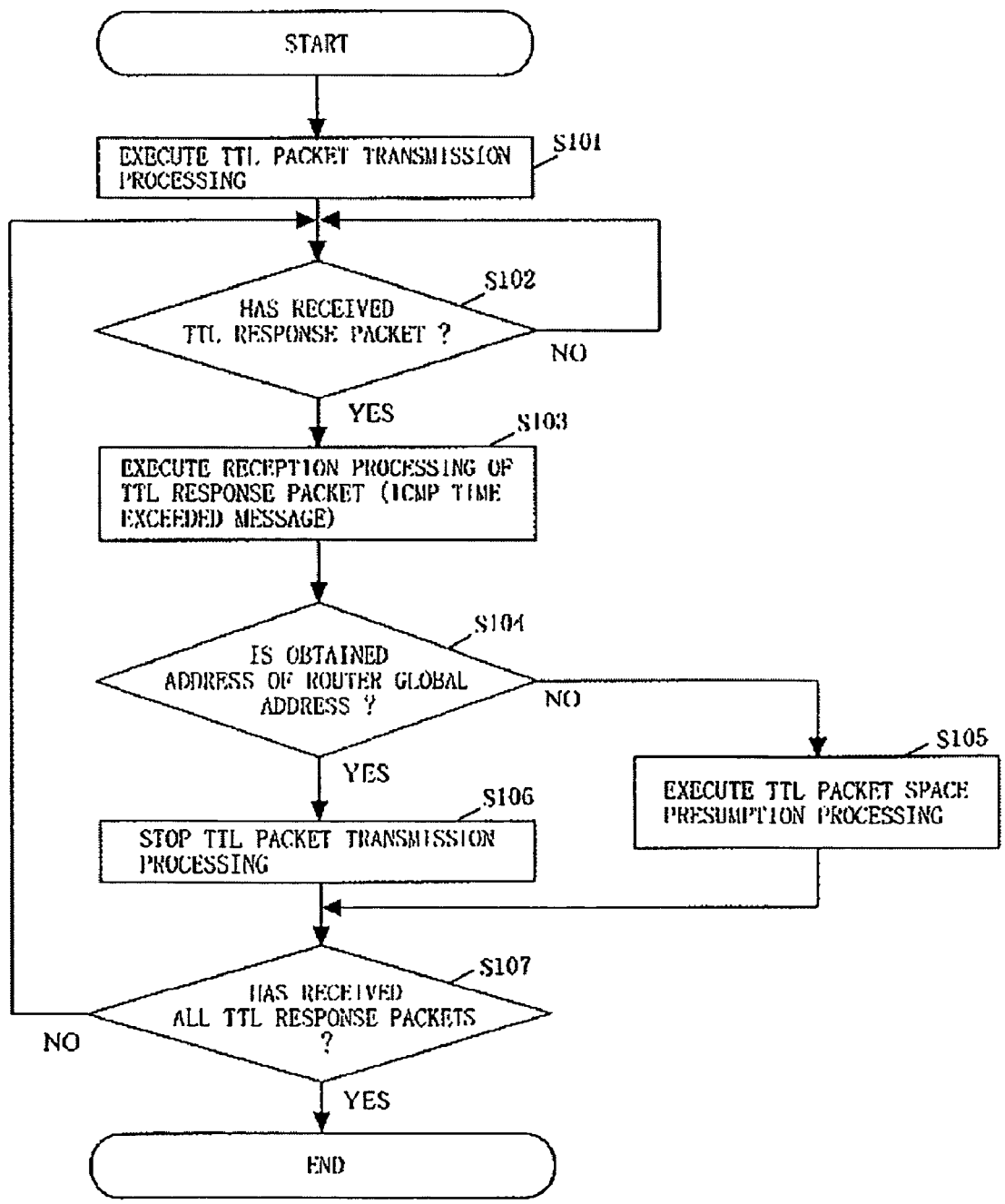
FIG. 15 is a flow chart of the upper segment analysis processing executed using a packet in which a TTL is changed according to the embodiment of the present invention.

FIG. 15 is a flow chart showing processing, executed by the communication apparatus 10, of obtaining a network address of a router (or a range of an address which is valid and can be set to a terminal under the router) using a packet in which a TTL is changed. With reference to FIG. 15, an operation will be described. When starting the upper segment analysis processing, the communication apparatus 10 starts TTL packet transmission processing (a step S101). Here, the started TTL packet transmission processing is executed in parallel with TTL response packet reception processing (a step S102), and the like. After starting the TTL packet transmission processing, the communication apparatus 10 determines whether or not the communication apparatus 10 has received a TTL response packet (the step S102). When the communication apparatus 10 has received the TTL response packet, the communication apparatus 10 determines that the communication apparatus 10 detects a router, and executes reception processing of the TTL response packet (a step S103). Specifically, the TTL response packet is an ICMP (Internet Control Message Protocol) TIME EXCEEDED MESSAGE. The ICMP TIME EXCEEDED MESSAGE is a message for notifying a source of the TTL packet of disposal of a packet due to elapse of a valid time period (TTL: Time To Live) of the packet to be relayed.

The communication apparatus 10 determines whether or not a source address of the TTL response packet is a global address (a step S104). When the source address of the TTL response packet is not a global address, the communication apparatus 10 executes the address space presumption processing (a step S105). When the source address of the TTL response packet is a global address, the communication apparatus 10 stops the TTL packet transmission processing (a step S106).

The communication apparatus 10 determines whether or not the communication apparatus 10 has received all TTL response packets for the transmitted TTL packets (a step S107). When the communication apparatus 10 has received all of the TTL response packets, the communication apparatus 10 terminates the address space presumption processing as shown in FIG. 15. When the communication apparatus 10 has not received all of the TTL response packets, the communication apparatus 10 returns to the step S102 to be in a state of waiting to receive TTL response packets. The reason why the reception processing is continued until all of the TTL response packets for the transmitted TTL packets are received is that TTL response packets are not always received in order of times at which TTL packets are transmitted. It is noted that where a set TTL value is TTLg in a TTL packet corresponding to a TTL response packet whose source address is a global address, when all TTL response packets for TTL packets having TTL values equal to or smaller than TTLg are received, it may be determined that all TTL response packets are received.

Figure 16:
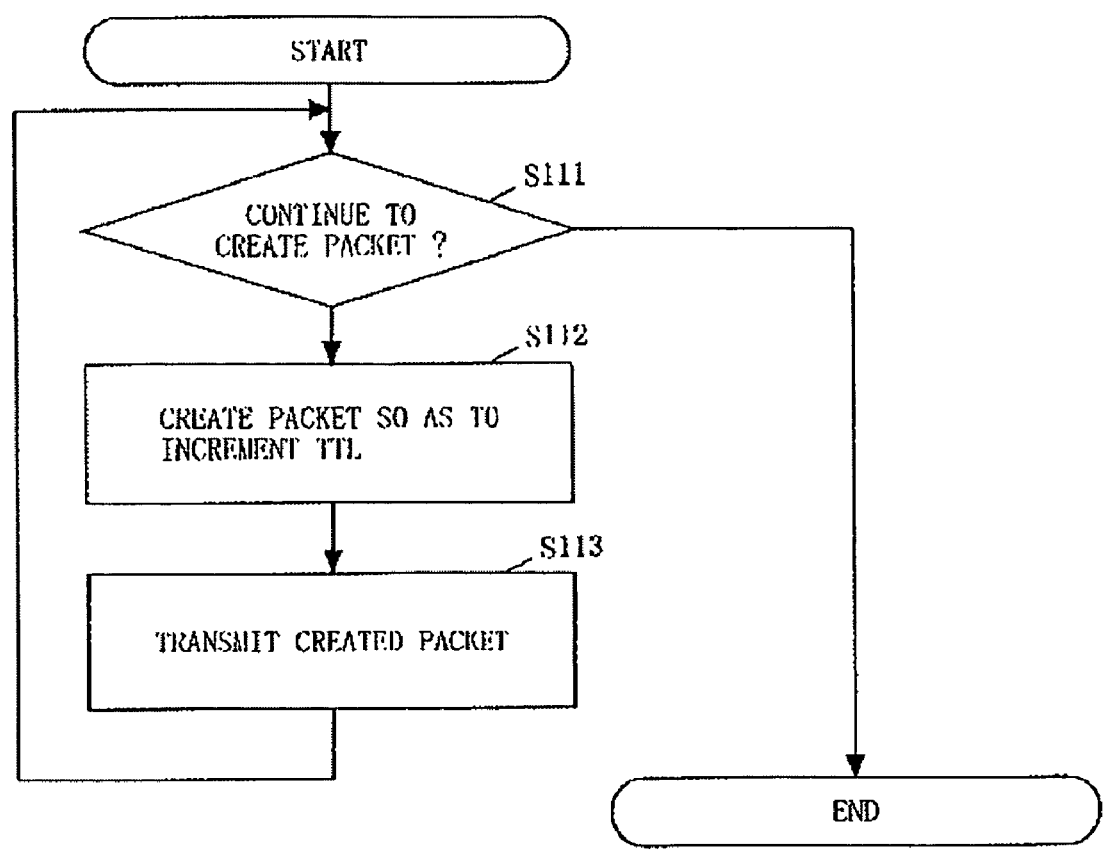
FIG. 16 is a flow chart of TTL packet transmission processing in the upper segment analysis processing according to the embodiment of the present invention.
Figure 17:
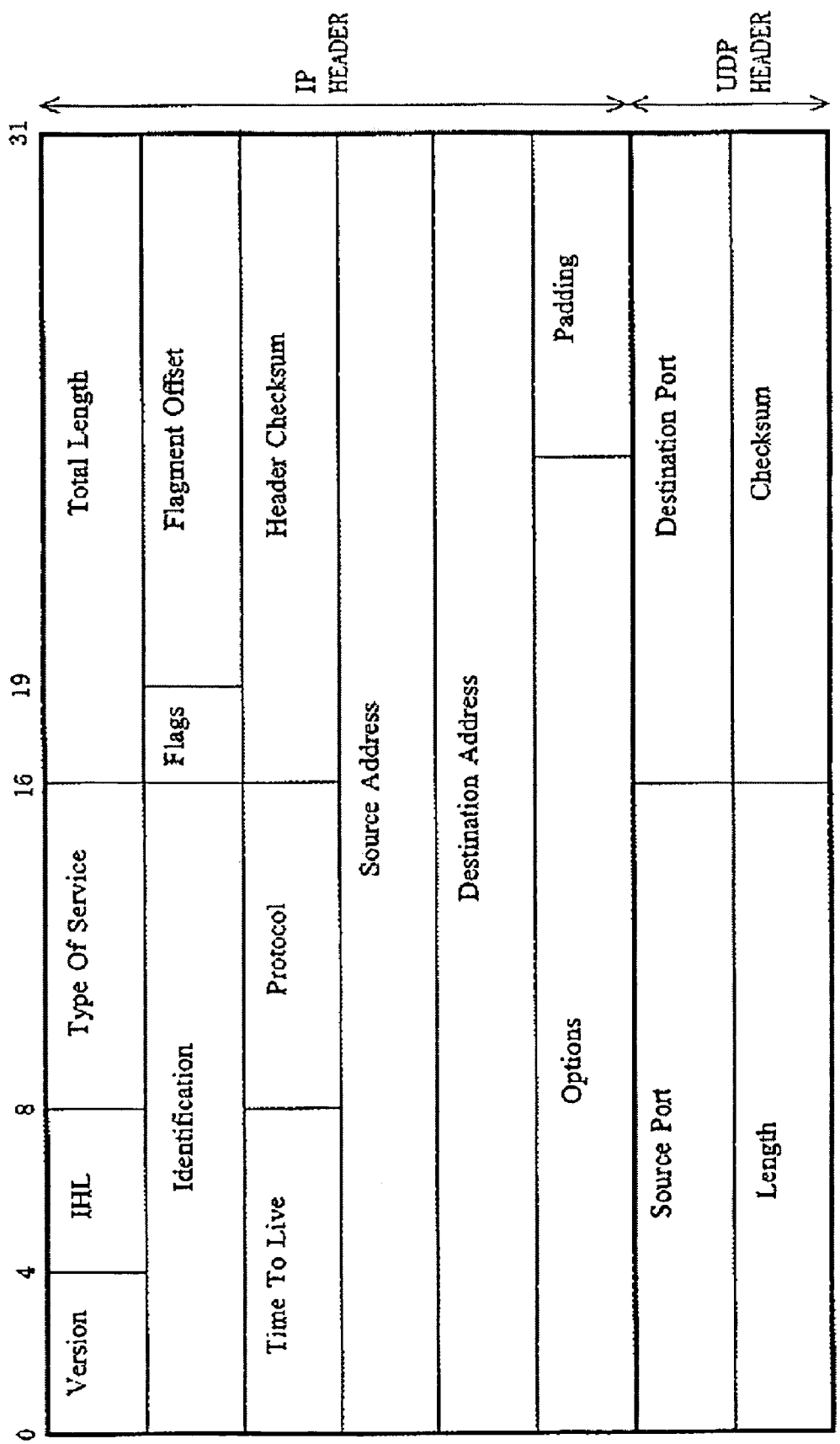
FIG. 17 is a view showing an example of a configuration of a TTL packet using a UDP according to the embodiment of the present invention.

Using FIGS. 16 to 18, the TTL packet transmission processing will be described in detail. FIG. 16 is a flow chart of the TTL packet transmission processing. FIG. 17 is a view showing a configuration of a TTL packet when a UDP (User Datagram Protocol) is used for transmitting the TTL packet. FIG. 18 is a view showing a correspondence relation between a TTL and a destination port number in the TTL packet.

Using FIG. 16, the TTL packet transmission processing will be described. The communication apparatus 10 determines whether or not to continue to create a TTL packet (a step S111). The determination as to whether or not to continue to create a TTL packet is made by determining whether or not a source of the TTL packet has received a response packet having a global address in later-described TTL packet response reception. When the communication apparatus 10 has received a response having a global address, the communication apparatus 10 determines to stop continuing to create a packet. When the communication apparatus 10 has not received a response having a global address yet, the communication apparatus 10 determines to continue to create a packet.

When the communication apparatus 10 determines to stop creating a TTL packet, the communication apparatus 10 terminates the TTL packet transmission processing. When the communication apparatus 10 determines to continue to create a TTL packet, the communication apparatus 10 creates a TTL packet in which a TTL and a destination port number are incremented by 1, respectively (a step S112). The communication apparatus 10 transmits the created TTL packet (a step S113). It is noted that the communication apparatus 10 may transmit a next TTL packet in which a TTL is incremented without waiting for receiving a TTL response packet for the transmitted TTL packet. In this case, the communication apparatus 10 is capable of concurrently transmitting a plurality of TTL packets, and hence is capable of detecting a router fast. Alternatively, the TTL packet may be transmitted to a certain global address on the Internet (e.g. an address of a LAN-side I/F 501 of the router D 50, or an address of a certain server on the Internet (e.g. panasonic.com, and the like)).

As shown in FIG. 18, the communication apparatus 10 creates a TTL packet so as to increment a value of a TTL field of an IP header from 1 and so as to increment a destination port number field of a UDP header from 10001. It is noted that the destination port number is not limited to the example as shown in FIG. 18, and it should be understood that another port number may be used. The destination port number may be any number as long as a TTL is uniquely identified by the destination port number.

Figure 19:
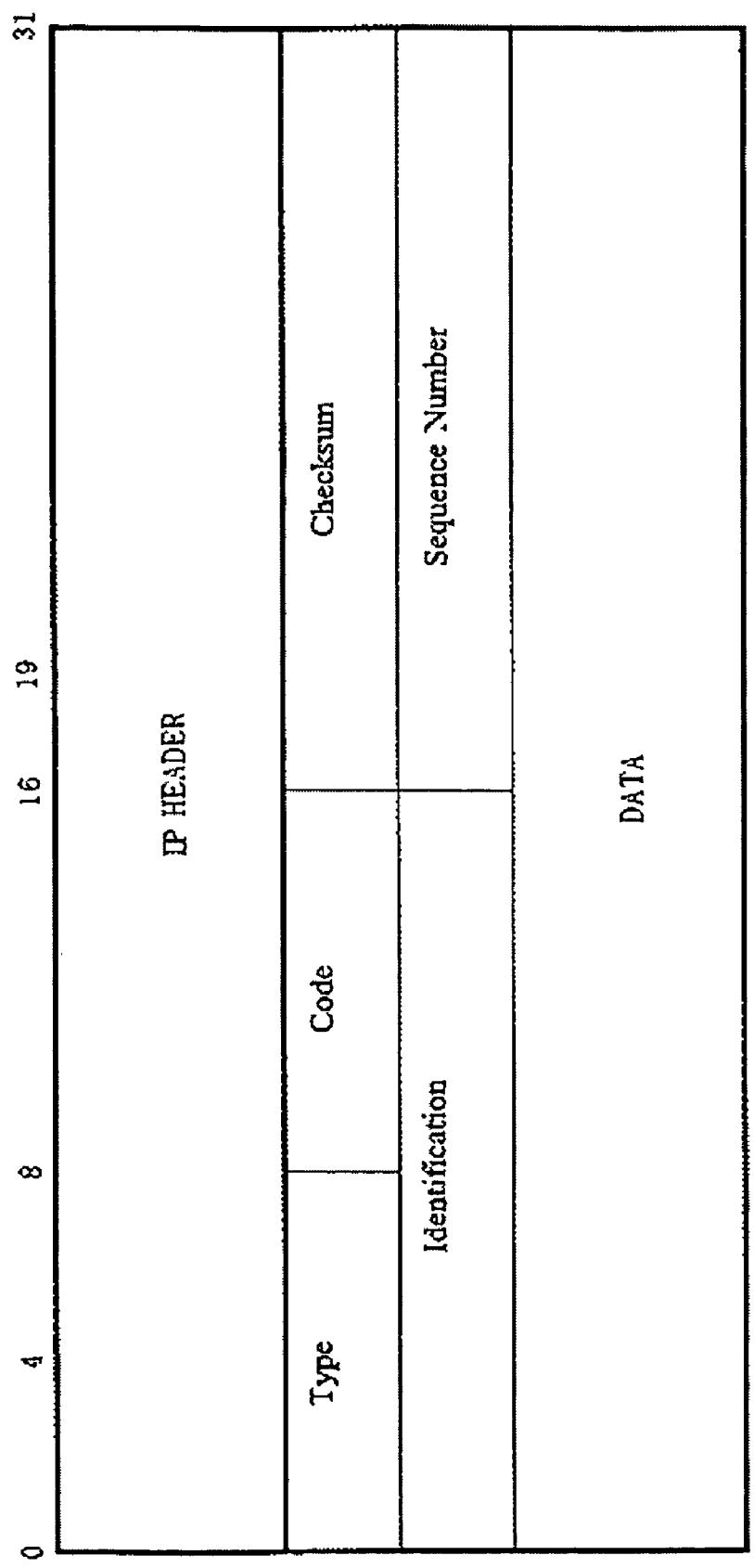
FIG. 19 is a view showing an example of a configuration of a TTL packet using an ICMP according to the embodiment of the present invention.
Figure 20:
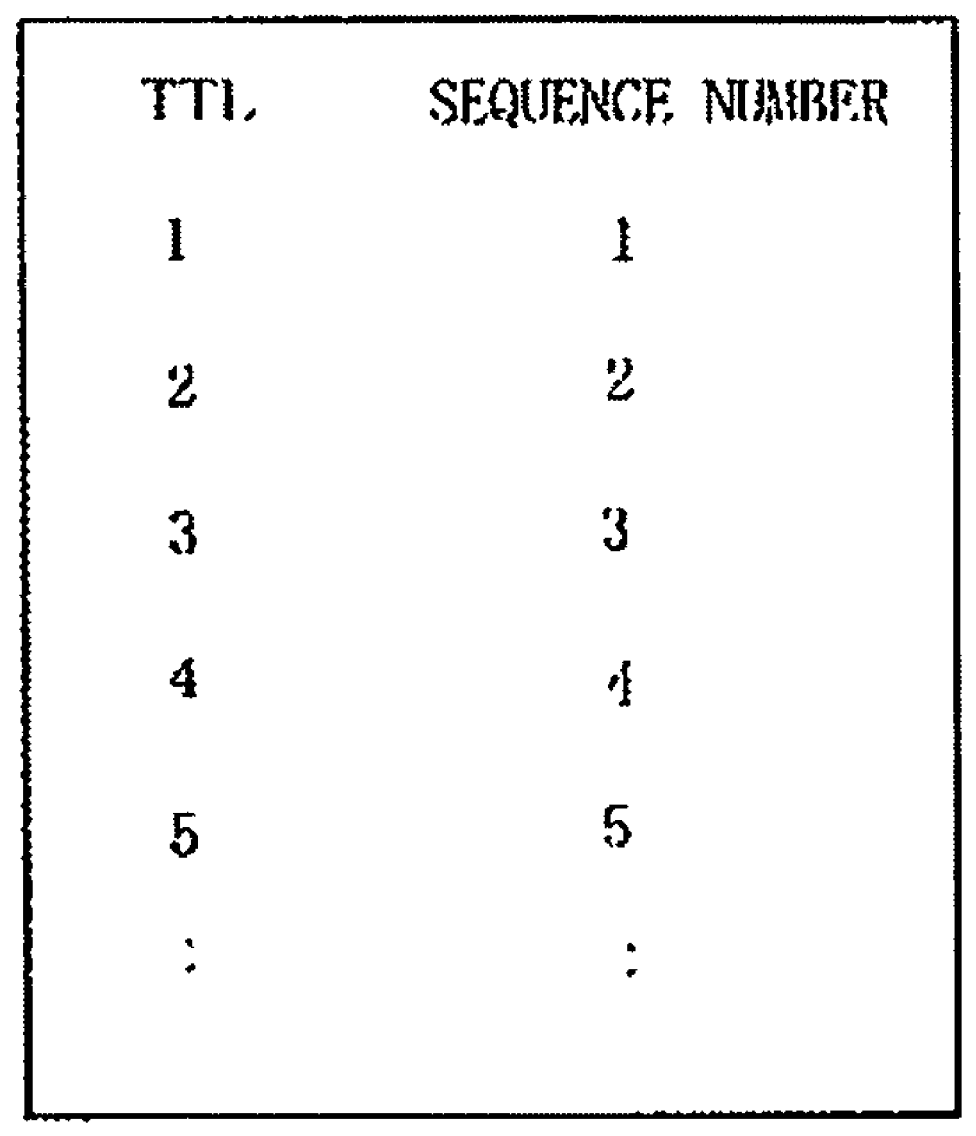

Further, the TTL packet is not limited to the example using the UDP as shown in FIG. 17, and, for example, an ICMP as shown in FIG. 19 may be used. In this case, as shown in FIG. 20, a method associating a TTL of an IP header with a sequence number can be used.

Figure 21:
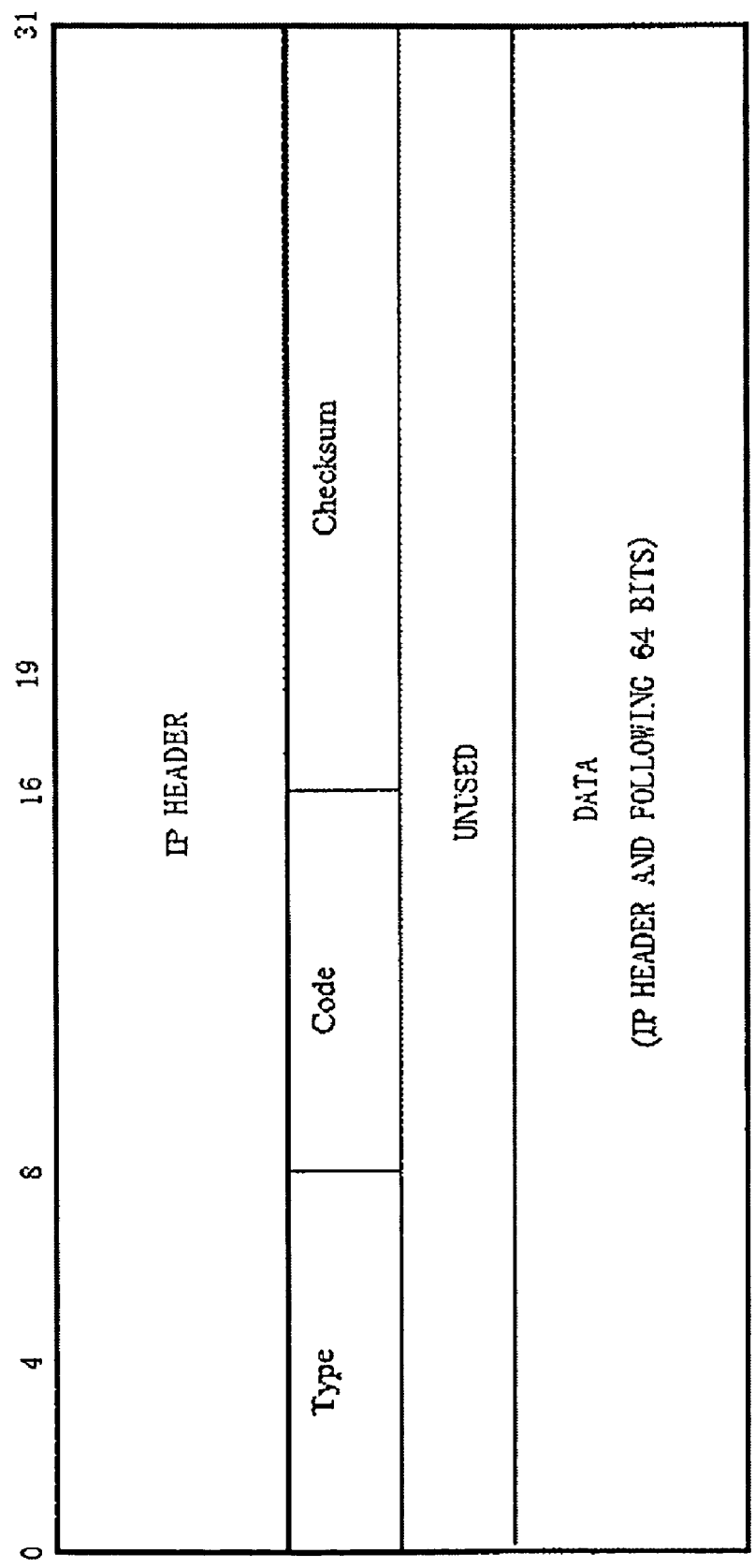
FIG. 21 is a view showing an example of a configuration of a TTL response packet according to the embodiment of the present invention.

Using FIGS. 14 and 21, the TTL response packet reception processing will be described. FIG. 14 shows a correspondence relation between a TTL packet and a TTL response packet. FIG. 21 is a view showing an example of a configuration of the TTL response packet.

As shown in FIG. 14, the router A 20, the router B 30, the router C 40, and the router D 50 each decrement a TTL value of a TTL packet received by the LAN-side communication I/F by 1, and transmits the TTL packet to the WAN-side router. When each router decrements the TTL value by 1 to be 0, each router does not transmit the TTL packet to the WAN-side router, and disposes of the TTL packet. Then, each router transmits a TTL response packet to a source of the TTL packet for indicating that disposal of a packet occurs due to the TTL value. In a data section of the TTL response packet shown in FIG. 21, 64-bit data including an IP header of the disposed packet for router discovery and the following UDP header are added.

The case where the communication apparatus 10 transmits a TTL packet in which a TTL is set to 1 to a certain IP address on the Internet 1 is considered. The TTL packet in which the TTL is set to 1 is received by the LAN-side communication I/F 202 of the router A 20. Before transmitted from the WAN-side communication I/F 201, the TTL packet in which the TTL is set to 1 is set such that the TTL is changed to 0. Thus, the router A 20 disposes of the TTL packet in which the TTL is set to 1. The router A 20 transmits a TTL response packet to the communication apparatus 10 for notifying the communication apparatus 10 of the disposal of the TTL packet in which the TTL is set to 1. At this time, a source IP address (hereinafter, referred to as a source address) of the TTL response packet becomes an IP address of the LAN-side communication I/F 202 of the router A 20 (hereinafter, an IP address of the LAN-side communication I/F of each router is referred to as a LAN-side address of each router). It becomes possible for the communication apparatus 10 to know the LAN-side address of the router A 20 by confirming the source address of the TTL response packet.

Similarly, when the communication apparatus 10 transmits a TTL packet in which a TTL is set to 2 to a certain IP address on the Internet, the router B 30 transmits a TTL response packet whose source address is a LAN-side address of the router B 30 to the communication apparatus 10. Further, when the communication apparatus 10 transmits a TTL packet in which a TTL is set to 3 to a certain IP address on the Internet, the router C 40 transmits a TTL response packet whose source address is a LAN-side address of the router C 40 to the communication apparatus 10. Thus, the communication apparatus 10 is capable of detecting each router as well as obtaining the LAN-side address of each router by receiving the TTL response packet corresponding to the TTL packet. The communication apparatus 10 is capable of obtaining connection order information regarding connection order of the routers which are connected between the communication apparatus 10 and the Internet 1.

The following will describe address space presumption processing executed by the communication apparatus 10. The address space presumption processing described here is processing of presuming a address range within which an address of a terminal connected to a network under a router is capable of being set. The address range within which the address of the terminal is capable of being set corresponds to a range of a host address, and a network address is obtainable from the host address.

When a source address of a TTL response packet is a local address, the communication apparatus 10 transmits an address range presumption packet whose destination address is changed using a TTL value designated by a TTL packet corresponding to the TTL response packet with a source router of the TTL response packet as a target. For example, a TTL value of 1 is used for the router A 20, and a TTL value of 2 is used for the router B 30.

Further, the communication apparatus 10 primarily presumes and stores an address space of the router based on the LAN-side address of the router obtained from the TTL response packet. As a concrete method of primarily presuming an address space, a method of presuming an address space as an address of class C is considered. For example, when the LAN-side address of the router A 20 is 192.168.0.1, an address space of the router A 20 is presumed to range from 192.168.0.1 to 192.168.0.254. It is noted that when the LAN-side address of the obtained router is a private address of class A or class B, the address space of the obtained router is primarily presumed as an address space corresponding to each class. For example, when a private address of the router A 20 is 10.1.0.130, the address space of the router is primarily presumed to range from 10.0.0.1 to 10.255.255.254. Alternatively, the address space of the router may be primarily presumed to range from 10.1.0.1 to 10.1.0.254 (only the lowermost 8 bits are changed) or from 10.1.0.129 to 10.1.0.254 (only the lowermost 7 bits are changed).

When primarily presuming an address space, the communication apparatus 10 primarily presumes and stores an address space of the obtained router so as to include at least the LAN-side address of the obtained router. Then, the communication apparatus 10 (an upper segment determination section) designates addresses in the stored address space as destinations in turn, and transmits the address range presumption packet. At this time, since the LAN-side address of the obtained router is considered to be included in the primarily presumed address space, the communication apparatus 10 does not have to transmit the address range presumption packet to the LAN-side address of the obtained router.

The address range presumption packet is a packet for the communication apparatus 10 to confirm whether or not the address space presumed as the address space of the target router is the address space of the target router. As the address range presumption packet, the UDP packet shown in FIG. 17 or the ICMP packet shown in FIG. 19 is used. The difference between the TTL packet and the address range presumption packet is that a destination address of the TTL packet is a certain address on the Internet while a destination address of the address range presumption packet is a local address which is considered to be within the address space of the target router.

Further, for making it possible to discriminate between the TTL response packet and an ICMP TIME EXCEEDED MESSAGE which is a response for the address range presumption packet, when using the UDP packet as shown in FIG. 17, the communication apparatus 10 transmits as the address range presumption packet a UDP packet in which a port number which is not used in the TTL packet is designated. As a result, a data section of the ICMP TIME EXCEEDED MESSAGE which is the response for the address range presumption packet includes the port number which is designated in the address range presumption packet. Thus, the communication apparatus 10 is capable of discriminating between the TTL response packet and the ICMP TIME EXCEEDED MESSAGE which is the response for the address range presumption packet by referring to the port number. Similarly, when using the ICMP as the address range presumption packet, a value which is not used in the TTL packet is set for a sequence number, and the like. It is noted that a method of presuming an address space of a router using a response for an address range presumption packet will be described later.

When there is a response for an address range presumption packet, the communication apparatus 10 determines whether or not the response is an ICMP TIME EXCEEDED MESSAGE. When the response is not an ICMP TIME EXCEEDED MESSAGE, the communication apparatus 10 determines that a destination address of the address range presumption packet is within the address space of the router. Then, the communication apparatus 10 updates and stores presumption information of the address space of the router based on a result of the determination.

The reason why it is possible to determine that the destination address of the address range presumption packet is outside the address space of the router by receiving the ICMP TIME EXCEEDED MESSAGE as the response for the address range presumption packet will be described. The address range presumption packet is transmitted such that a TTL value which is the same as that in a TTL packet transmitted for obtaining a LAN-side address of a router is designated (e.g. when presuming the address space of the router A 20, 1 is designated as the TTL value). When a packet is transmitted such that an address which is outside the address space of the router is designated, the router attempts to transmit the packet to an upper router. At this time, since an operation of subtraction of the TTL value is executed and the TTL value becomes 0, the router disposes of the address range presumption packet, and transmits an ICMP TIME EXCEEDED MESSAGE. Thus, it is seen that when the ICMP TIME EXCEEDED MESSAGE is received as the response for the address range presumption packet, the destination address of the address range presumption packet is outside the address space of the router.

It is noted that even when there is no response for the address range presumption packet, the communication apparatus 10 may determine that the destination address of the address range presumption packet is within the address space of the target router. When the response is an ICMP TIME EXCEEDED MESSAGE, the communication apparatus 10 determines that the destination address of the address range presumption packet is outside the address space of the router. Then, the communication apparatus 10 updates and stores the presumption information of the LAN-side address space of the router based on a result of the determination. After that, the communication apparatus 10 determines whether or not the address space presumption is terminated. More specifically, the communication apparatus 10 confirms whether or not the address range presumption packets are transmitted and all responses for the address range presumption packets are received. When the address range presumption is not terminated, the communication apparatus 10 (the upper segment determination section) continues the processing. When it is determined that the address range presumption is terminated, the communication apparatus terminates the address space presumption processing, namely, terminates the upper segment analysis processing.

It is noted that when detecting a boundary address between addresses determined to be within the address space and addresses determined to be outside the address space, the communication apparatus 10 may terminate the address space presumption processing. This is because, generally, the address space of the router includes continuous addresses. For example, the case where it is determined for the first time that the destination is outside the address space by 192.168.2.128 when the communication apparatus 10 transmits an address range presumption packet to a destination in order of 192.268.2.2, 192.168.2.3, 192.168.2.4 . . . (it is noted that 192.168.2.1 is an address of the router, and the packet is not transmitted thereto since it is known that 192.168.2.1 is always in the address space) will be describe. In this case, when the address space is continuous, it can be expected that all addresses after 192.168.2.128 are determined to be outside the address space. Thus, at a time when 192.168.2.128 is determined to be outside the address space, the communication apparatus 10 may stop transmitting the address range presumption packet to all addresses in the actually and primarily presumed address space, and may terminate the address space determination processing. At this time, address space information of the router which is stored by the communication apparatus 10 is updated based on a result of the determination.

(Method Using UPnP IGD Specification)

The following will describe a method of obtaining an address of a router using a UPnP IGD specification.

It is noted that processing of presuming a range of an address space after obtaining an address of a router is the same as that in the method using a packet in which a TTL is changed.

In the method using a packet in which a TTL is changed, a router in the home network 2 is detected using a TTL packet in which a TTL is changed and a TTL response packet using an ICMP TIME EXCEEDED MESSAGE. However, a router which does not executes TTL processing, a router which filters an ICMP packet, and the like are commercially available. Thus, a router to which the upper segment analysis processing described in the method using a packet in which a TTL is changed cannot be applied exists. Upper segment analysis processing in the method using a UPnP IGD specification, for solving this problem, will be described.

Figure 22:
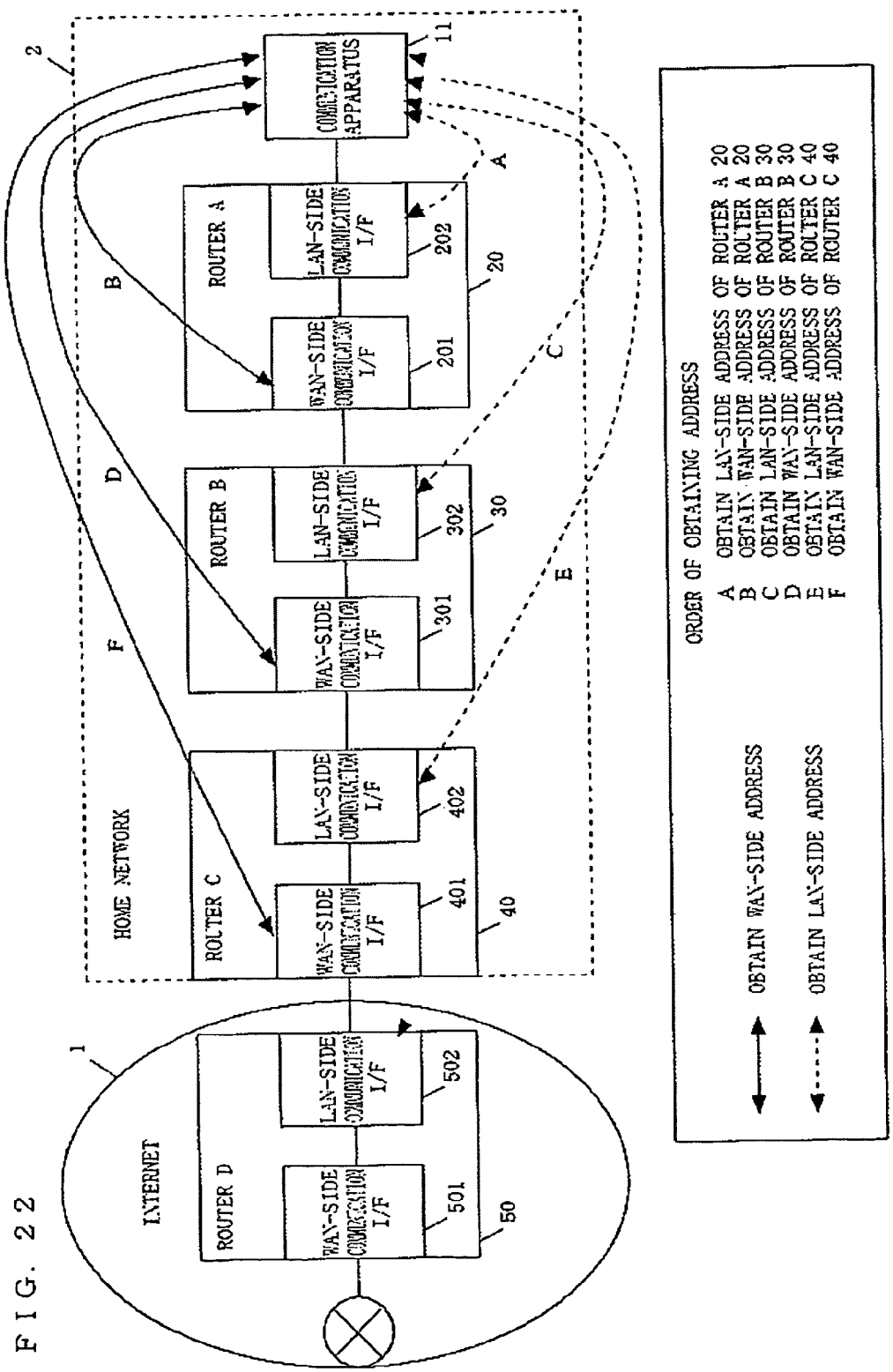
FIG. 22 is a view showing an example of a configuration of the home network 2 in which upper segment analysis processing using an IGD specification is used according to the embodiment of the present invention.

FIG. 22 is a view showing an example of a configuration of the home network 2 in which upper segment analysis processing using a UPnP IGD specification is used. As shown in FIG. 22, the home network 2 is different in including a communication apparatus 11 in place of the communication apparatus 10. The communication apparatus 11 is a communication apparatus which executes the upper segment analysis processing using an IGD specification. The communication apparatus 11 is different from the communication apparatus 10 in obtaining WAN-side addresses of the router A 20, the router B 30, and the router C 40 in addition to LAN-side addresses of the router A 20, the router B 30, and the router C 40. It is noted that the communication apparatus 11 corresponds to the communication apparatuses 4a to 4c and 5a to 5c when executing the upper segment analysis processing using the IGD specification.

An operation of the upper segment analysis processing of the communication apparatus 11 will be described. The communication apparatus 11 obtains a LAN-side address of a router to which the communication apparatus 11 is connected using a UPnP IGD (Internet Gateway Device) specification, and then, further obtains WAN-side address of the router. Then, the communication apparatus 11 obtains a LAN-side address of an upper router while presuming a range of an address space of the upper router. In the case as shown in FIG. 21, the order of the addresses obtained by the communication apparatus 11 is A→B→C→D→E→F.

Figure 23:
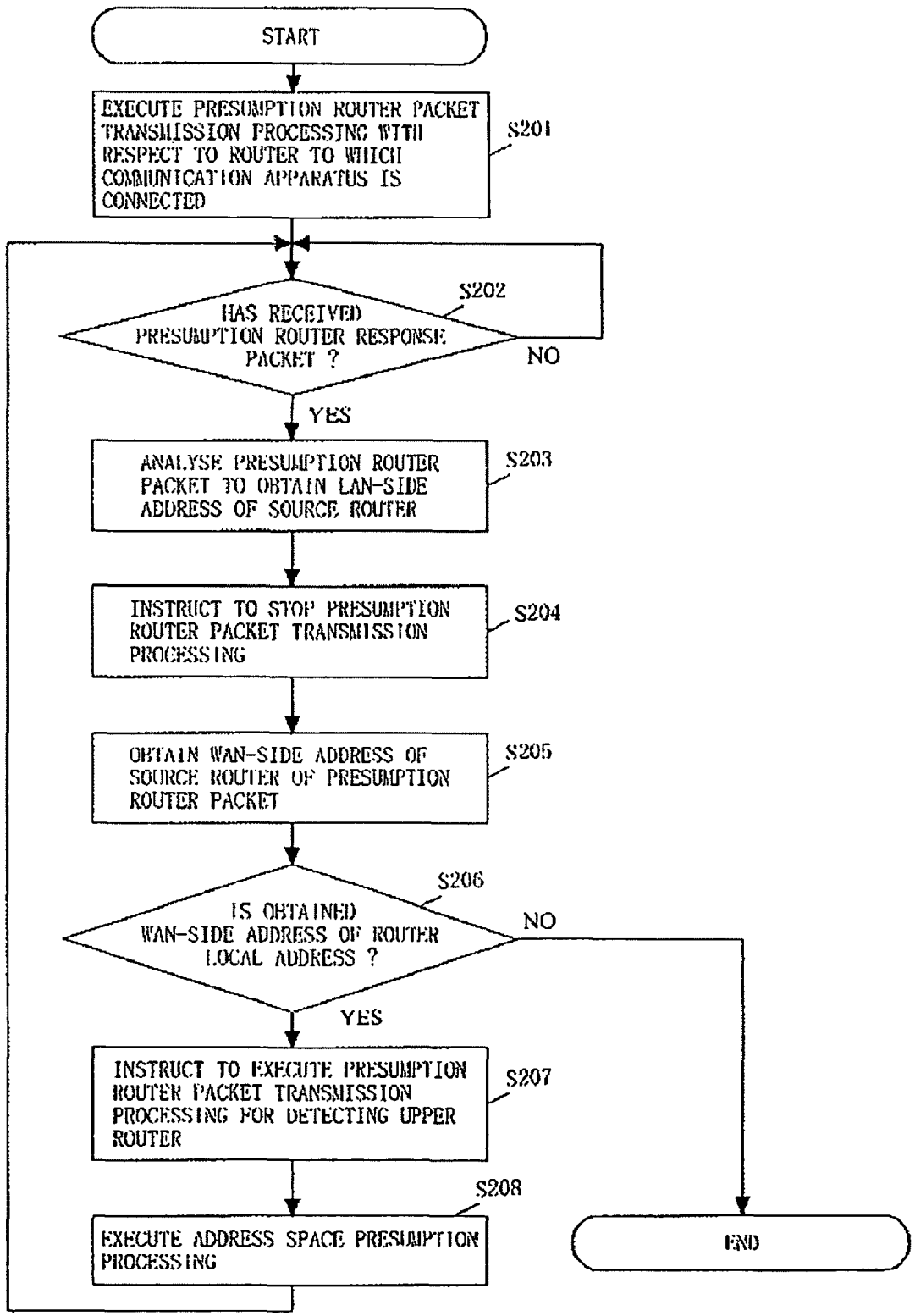
FIG. 23 is a flow chart showing an example of the upper segment analysis processing using the IGD specification according to the embodiment of the present invention.

Using FIG. 23, address space presumption processing executed by the communication apparatus 11 will be described. FIG. 23 is a flow chart showing an example of the upper segment analysis processing executed by the communication apparatus 11. Referring to FIG. 23, the communication apparatus 11 transmits, by multicast, a packet for router discovery (hereinafter, referred to as a presumption router packet) using an "M-Search" which is a discovery message of UPnP to the router A 20 to which the communication apparatus 11 is connected (a step S201). The communication apparatus 11 determines whether or not the communication apparatus 11 has received a response packet (hereinafter, referred to as a presumption router response packet) for the transmitted presumption router packet (a step S202). FIG. 24 shows an example of a data section of the presumption router packet. FIG. 25 shows an example of a data section of the presumption router response packet.

When the communication apparatus 11 has received the presumption router response packet, the communication apparatus 11 analyses the presumption router response packet, and obtains a LAN-side address of a source router (a step S203). It is noted that since the communication apparatus 11 uses UPnP, the communication apparatus 11 obtains a device description and a service description from information included in the presumption router response packet. These information are used as information for action transmission. Then, the communication apparatus 11 stops transmission processing of the presumption router packet (a step S204). The communication apparatus 11 obtains a WAN-side address of the source router of the presumption router response packet (a step S205).

A procedure of obtaining the WAN-side address of the router using a UPnP IGD specification will be described. The communication apparatus 11 transmits a Get External IP Address action request message to the LAN-side address of the source router of the presumption router response packet. FIG. 26 is a view showing an example of the Get External IP Address action request message. The router which has received the Get External IP Address action request message transmits a response to the communication apparatus 11, whereby the communication apparatus 11 obtains a WAN-side address of the router. FIG. 27 is a view showing an example of a Get External IP Address action response message. As shown in FIG. 27, the WAN-side address of the router is set at a portion interposed between <New External IP Address> tags. Thus, the communication apparatus 11 can obtain the WAN-side address of the router by taking out a value between the <New External IP Address> tags. It is noted that a Web-based user interface is generally mounted in the router. Thus, the communication apparatus 11 may obtain the WAN-side address of the source router of the presumption router response packet using the Web-based user interface. More specifically, the communication apparatus 11 can obtain the WAN-side address of the source router of the presumption router response packet by transmitting an http message to the source router of the presumption router response packet, and receiving its response.

The communication apparatus 11 confirms whether or not the WAN-side address of the source router of the presumption router response packet is a local address (a step S206). When the obtained WAN-side address is a global address, the communication apparatus 11 determines that a router on the upper side of the source router of the presumption router response packet is a router on the Internet 1. In other words, the communication apparatus 11 presumes that detection of all routers in the home network 2 has been completed, and terminates the processing. On the other hand, when the obtained WAN-side address is a local address, the communication apparatus 11 determines that a router which belongs to the home network 2 exists on the upper side of the source router of the presumption router response packet. Then, the communication apparatus 11 executes transmission processing of a presumption router packet using the WAN-side address information of the router again (a step S207). The transmission processing of the presumption router packet will be described later.

Then, the communication apparatus 11 executes address space presumption processing using information (the LAN-side address, the WAN-side address, and the like) of the source router of the presumption router response packet (a step S208).

This address space presumption processing is slightly different from that in the case of using a packet in which a TTL is changed in presuming the address space of the upper router based on the notified WAN-side address. For example, in FIG. 22, when the communication apparatus 11 obtains the WAN-side address of the router B 30, the address space presumption processing (the step S207) is started. More specifically, the communication apparatus 11 (the upper segment determination section) primarily presumes an address space of the router C 40 using the WAN-side address of the router B 30, and stores information of the presumed address space. Then, the communication apparatus 11 (the upper segment determination section) executes address space presumption using the above address range presumption packet to update the address space information. The difference with the method using a packet in which a TTL is changed is only that an address always included in the address space is not a LAN-side address of a presumption target router (the LAN-side address of the router C 40), and is a WAN-side address of a lower router (the WAN-side address of the router B 30).

When the communication apparatus 11 obtains the WAN-side address of the router (the router A 20) connected directly to the communication apparatus 11, the communication apparatus 11 presumes and stores an address space of the router B 30 using the WAN-side address of the router A 20 as described above. In addition, the communication apparatus 11 presumes and stores LAN-side address information of the router A 20 using an IP address and netmask information of the communication apparatus 11.

Then, the communication apparatus 11 starts the presumption router packet transmission processing again, and returns to the step S202 for receiving a presumption router response packet.

By using the flow chart shown in FIG. 23, the communication apparatus 11 can confirm the existence of the router on the upper side of the router connected to the communication apparatus 11. Thus, the communication apparatus 11 is capable of storing connection order information of the routers in the home network 2.

In the above description, as the address space presumption processing, the address space presumption processing using the address range presumption packet is executed. Alternatively, similarly as the method using a packet in which a TTL is changed, the address space presumption processing using the address range presumption packet may not executed, and the upper segment analysis processing may be completed using primarily presumed address space information.

(Presumption Router Packet Transmission Processing)

In the transmission processing of the presumption router packet using UPnP, the communication apparatus 11 is capable of transmitting an M-Search to the LAN-side address of the presumed upper router by unicast (although an M-Search is to be transmitted only by multicast according to the standards of the UPnP Forum, most routers are capable of receiving an M-Search transmitted by unicast).

FIG. 28 shows an example of a LAN-side address of an upper router which is presumed as a destination of the presumption router packet by the communication apparatus 11. Generally, when a router is used in a state at factory shipment, a local address of class C is used as a LAN-side address of the router. In this case, the low 8-bit value of the local address is 1 or 254. Thus, when presuming the LAN-side address of the upper router, the communication apparatus 11 preferentially presumes an address obtained by replacing the low 8 bits of the WAN-side address of the router with 1 or 254 as the LAN-side address of the upper router. By so presuming, the communication apparatus 11 becomes capable of detecting the upper router fast. Further, when the user changes the LAN-side address of the router, the user often sets the low 8-bit value of the LAN-side address to a certain value, such as 64 or 128. Thus, the communication apparatus 11 preferentially presumes an address obtained by setting the low 8-bit value of the LAN-side address to a certain value which is often set at by the user as the address of the upper router.

In principle, the communication apparatus 11 is capable of creating a great number of presumption router packets in which all presumable addresses are set as destinations as shown in FIG. 28, and transmitting the presumption router packets at one time. However, when a great number of presumption router packets are transmitted at one time, the network may become congested, which has an adverse effect on another apparatus. Further, it is considered that the transmitted presumption router packets are disposed of, which has an adverse effect on obtaining the LAN-side address of the router. For preventing such effects, the communication apparatus 11 controls so as to transmit presumption router packets a number of which is equal to or smaller than a specified number for a certain time period. Further, the presumption router packet is transmitted so as to designate only a router to transmit a response for the packet as shown in FIG. 24.

In the example of FIG. 24, by setting "urn:schemas-upnp-org:device:InternetGatewayDevice:1" as ST (Search Target), only a router transmits a response. Thus, even when the communication apparatus 11 transmits a presumption router packet to a plurality of addresses, the communication apparatus 11 does not receive responses from addresses other than routers. On the other hand, the communication apparatus 11 receives a presumption router response packet as shown in FIG. 25 for a presumption router packet in which an address of a router is designated. The communication apparatus 11 can obtain the LAN-side address of the router by referring to a source address of an IP header of the presumption router response packet.

As described above, the communication apparatus 11 obtains the LAN-side address of the router connected to the communication apparatus 11, and then obtains the WAN-side address of the router. Then, the communication apparatus 11 executes the address space presumption processing of the upper router based on the obtained WAN-side address. Further, the communication apparatus 11 obtains the LAN-side address of the upper router from the WAN-side address of the router connected to the communication apparatus 11. By repeating this operation, the communication apparatus 11 obtains addresses of all routers in the home network 2 and connection information of the routers, and executes the LAN-side address space presumption processing of the routers in the home network 2. Thus, the communication apparatus 11 does not need to perform manipulation of a TTL included in the TTL packet, and reception processing of an ICMP TIME EXCEEDED MESSAGE. Further, the communication apparatus 11 is usable with respect to a commercially available router which does not execute TTL processing, and a commercially available router which filters an ICMP packet.

In the flow chart shown in FIG. 23, the communication apparatus 11 transmits an M-Search which is a discovery message of a UPnP IGD specification when transmitting a presumption router packet. However, the communication apparatus 11 may create a presumption router packet using a Web-based user interface generally mounted in a router. For example, by transmitting an appropriate http message to an address of a LAN-side communication I/F of a default GW (GateWay), and receiving its response, the communication apparatus 11 can confirm that a destination of the http message is a router. In this case, when the communication apparatus 11 obtains a LAN-side address of the router connected to the communication apparatus 11, the communication apparatus 11 executes the above processing instead of the steps S201 to S204 of the flow chart shown in FIG. 23.

Alternatively, the address space presumption processing may be executed after detection of all of the routers in the home network 2 is completed.

Still alternatively, the presumption router packet may have a function of an address range presumption packet, and the communication apparatus 11 may concurrently execute router discovery processing and the address space presumption processing. In this case, a TTL value of the presumption router packet is set appropriately depending on a number of routers existing between the upper router and the communication apparatus 11. When the communication apparatus 11 receives an ICMP TIME EXCEEDED MESSAGE for a presumption router packet, the communication apparatus 11 (the upper segment determination section) may determine that a destination address of the presumption router packet is outside an address space of the upper router.

Further, in the method using a UPnP IGD specification, the address space presumption processing is executed by a method which is the same as the method using a packet in which TTL is changed. However, since the address space presumption processing uses an ICMP TIME EXCEEDED MESSAGE, the communication apparatus 11 cannot execute the address space presumption processing by the method which is the same as the method using a packet in which a TTL is changed with respect to a router which filters an ICMP message. In this case, the communication apparatus 11 may presume that an address space of the router which filters an ICMP message is an address space of class C. Alternatively, the communication apparatus 11 may read out the address space of the router which filters an ICMP message using protocols of an http message, SNMP, and the like.

The above is an outline of the upper segment analysis processing executed by the communication apparatus having the relay function and the communication apparatus not having the relay function.

In the present embodiment, the case where the communication apparatuses 4a to 4c each having the relay function and the communication apparatuses 5a to 5c each not having the relay function automatically connect a communication path has been described. However, only when the user performs setting of connection permission of a communication path with respect to a communication apparatus through the user I/O, connection of the communication path may be performed. Using FIGS. 29 and 30, details will be described.

Figure 29:
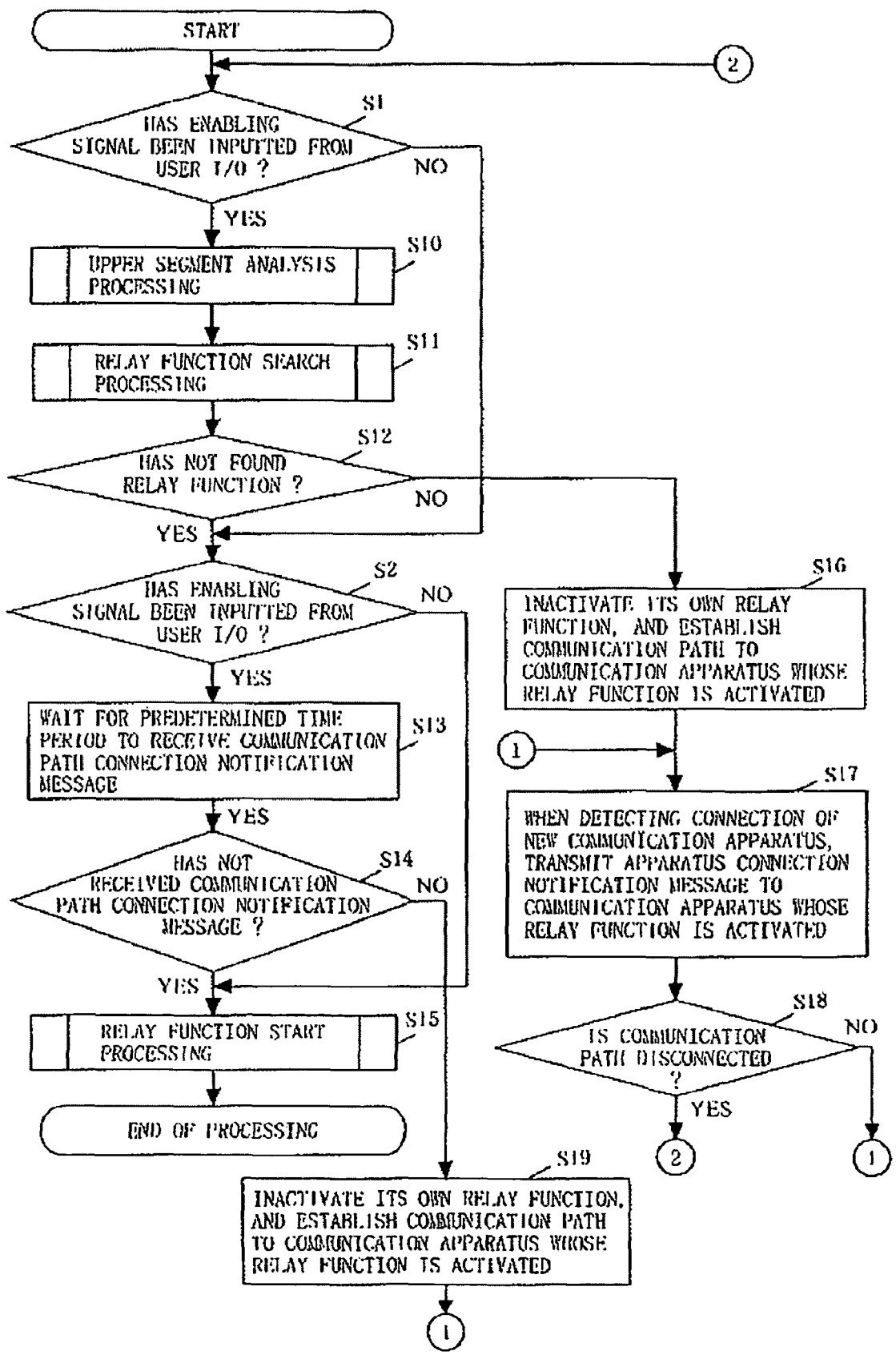
FIG. 29 is a flow chart showing an example of operations of the communication apparatuses 4a to 4c each having the relay function when confirmation of connection permission by the user is performed according to the embodiment of the present invention.

FIG. 29 is a flow chart showing an example of operations of the communication apparatuses 4a to 4c each having the relay function when confirming connection permission by the user. When the communication apparatuses 4a to 4c are connected to the home network 2, the communication apparatuses 4a to 4c confirm whether or not communication with a communication apparatus connected to an upper router is permitted by the user (a step S1). In other words, the communication apparatuses 4a to 4c confirm whether or not an enabling signal for the communication with the communication apparatus connected to the upper router has been inputted from the user I/O. When the communication with the communication apparatus connected to the upper router is permitted, the communication apparatuses 4a to 4c execute processing which is the same as in the "Procedure Until Start of Relay Function" shown in FIG. 5.

On the other hand, when the communication with the communication apparatus connected to the upper router is not permitted, the communication apparatuses 4a to 4c do not execute upper segment analysis processing (a step S10), and relay function search processing (a step S11) with respect to the upper router. By not executing the upper segment analysis processing and the relay function search processing for the upper router, a communication path to a communication apparatus which has a relay function and is connected to the upper router is not set.

Next, the communication apparatuses 4a to 4c confirm whether or not communication with a communication apparatus connected to a lower router is permitted by the user (a step S2). In other words, the communication apparatuses 4a to 4c confirm whether or not an enabling signal for the communication with the communication apparatus connected to the lower router has been inputted from the user I/O. When the communication with the communication apparatus connected to the lower router is permitted, the communication apparatuses 4a to 4c execute processing which is the same as in the "Procedure Until Start of Relay Function" shown in FIG. 5.

On the other hand, when the communication with the communication apparatus connected to the lower router is not permitted, the communication apparatuses 4a to 4c do not execute reception processing (steps S13 and S14) of a connection notification message from a "communication apparatus whose relay function is activated" and which is connected to the lower router. Thus, a communication path is not connected to the "communication apparatus whose relay function is activated" and which is connected to the lower router.

The following will describe an operation after start of the relay function.

Even after the start of the relay function, whether or not the communication with the communication apparatus connected to the upper router is permitted by the user is confirmed. When the communication is not permitted, the upper segment analysis processing and the transmission processing of the communication path connection notification message are not executed. Thus, a communication path is not connected to the communication apparatus connected to the upper router.

Further, whether or not the communication with the communication apparatus connected to the lower router is permitted by the user is confirmed. When the communication is not permitted, if a communication path connection request message except for communication path connection request messages transmitted as responses for connection notifications transmitted by the communication apparatuses 4a to 4c is received, the communication apparatuses 4a to 4c do not transmit a response. Thus, a communication path is not connected to the communication apparatus connected to the lower router.

Figure 30:
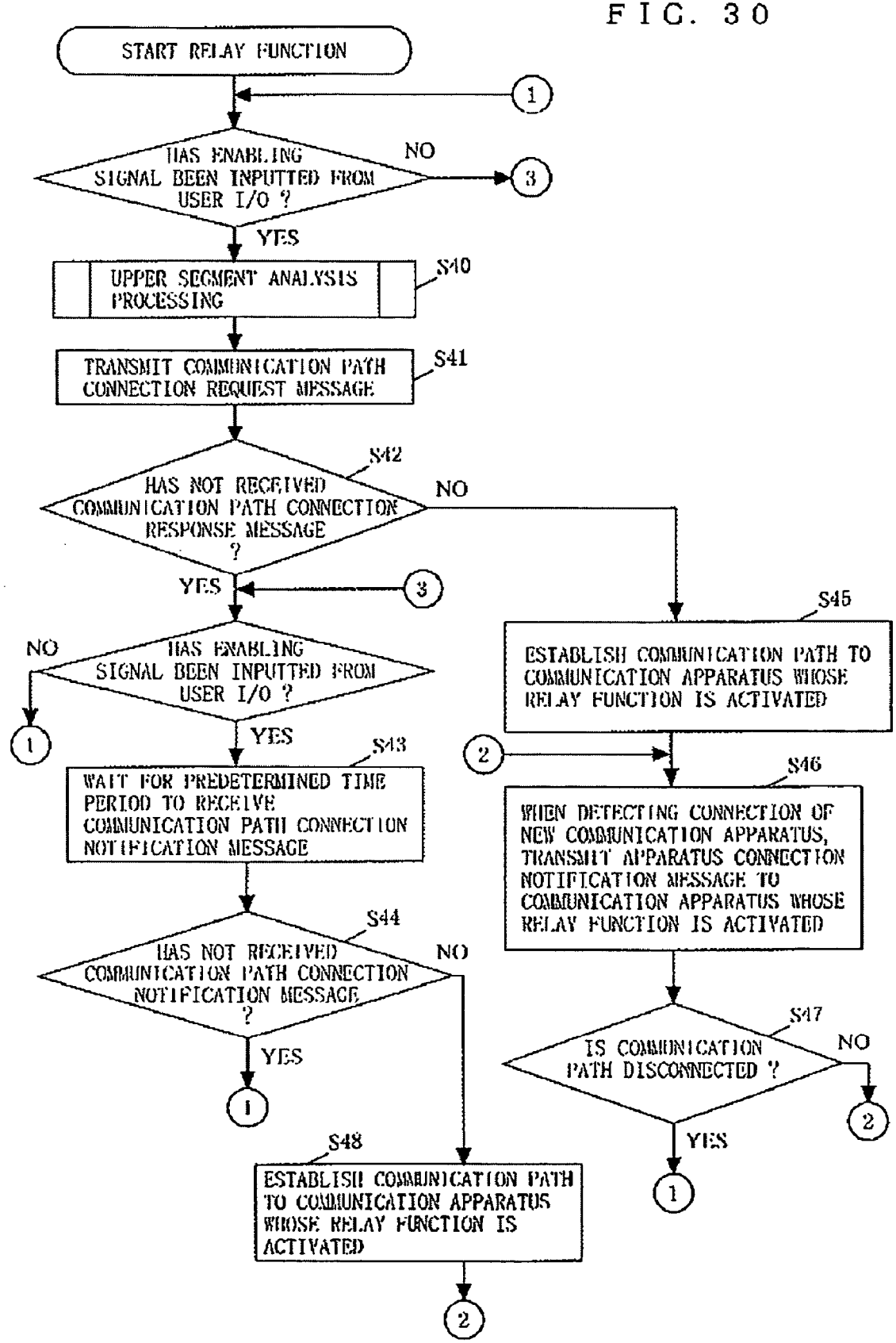
FIG. 30 is a flow chart showing an example of operations of the communication apparatuses 5a to 5c each not having the relay function when confirmation of connection permission by the user is performed according to the embodiment of the present invention.
Figure 31:
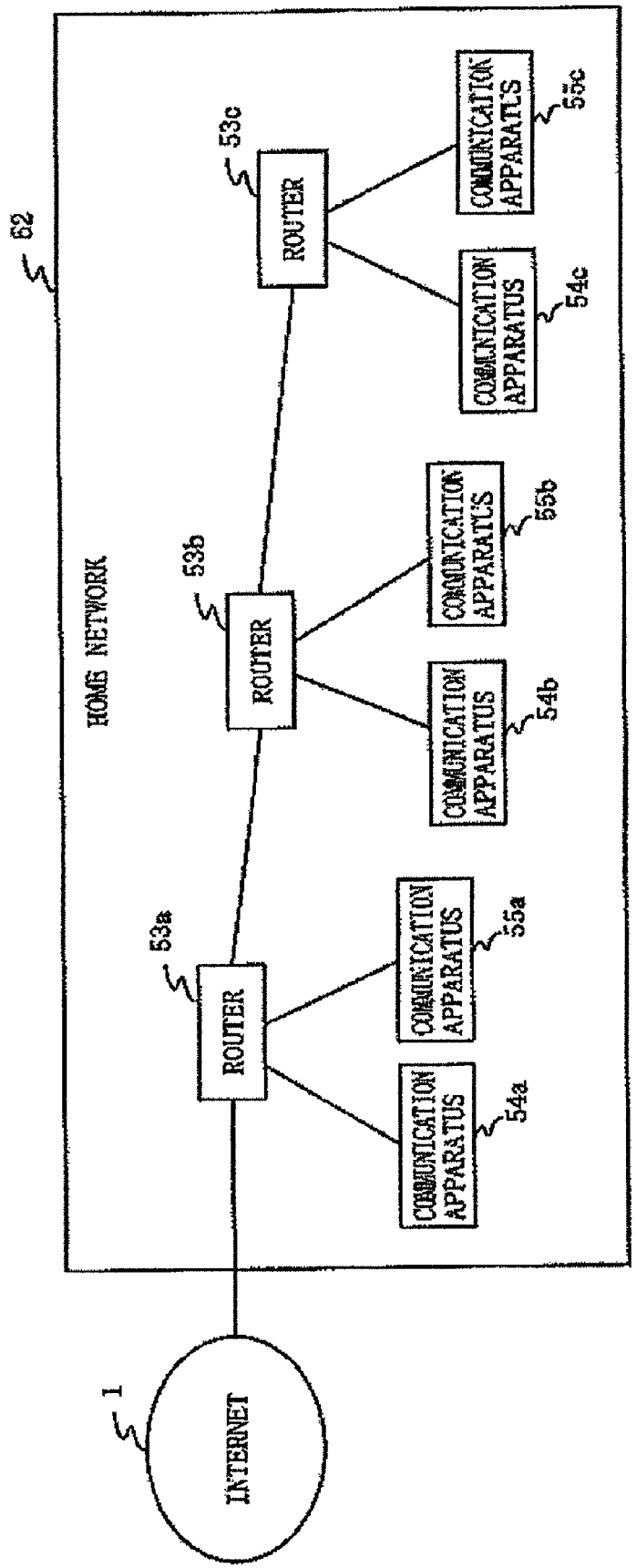
FIG. 31 is a view showing an example of a configuration of a home network 52 including a plurality of conventional routers.

The following will describe the communication apparatuses 5a to 5c each not having the relay function. FIG. 30 is a flow chart showing an example of operations of the communication apparatuses 5a to 5c each not having the relay function when confirming connection permission by the user. Referring to FIG. 30, similarly as in the case of the communication apparatus having the relay function, the communication apparatuses 5a to 5c confirm whether or not communication with a communication apparatus connected to an upper router is permitted by the user (a step S5). When the communication is not permitted, the communication apparatuses 5a to 5c do not execute the upper segment analysis processing (a step S40) shown in FIG. 10, and transmission processing (a step S41) of a communication path connection request message to a "communication apparatus whose relay function is activated" and which is connected to the upper router. Thus, a communication path is not connected to the "communication apparatus whose relay function is activated" and which is connected to the upper router.

Further, the communication apparatuses 5a to 5c confirm whether or not communication with a communication apparatus connected to a lower router is permitted by the user. When the communication is not permitted, if the communication apparatuses 5a to 5c receive a communication path connection notification message, the communication apparatuses 5a to 5c do not transmit a response. Thus, a communication path is not connected to a "communication apparatus whose relay function is activated" and which is connected to the lower router.

By such processing of confirming whether or not connection permission is set by the user, which is executed by the communication apparatuses 4a to 4c each having the relay function and the communication apparatuses 5a to 5c each not having the relay function, in the case where a local network in a condominium, and the like is shared with other people, a communication path can be prevented from being accidentally set to an other person's communication apparatus connected to a router other than a router connected to the communication apparatus, and hence security can be enhanced.

It is noted in the example of the processing flow of the present embodiment, when communication with a communication apparatus connected to either the upper router or the lower router is not permitted in the communication apparatuses 4a to 4c each having the relay function and the communication apparatuses 5a to 5c each not having the relay function, a communication path for message relay is not connected even between the communication apparatuses 4a to 4c which have the relay functions and are connected to the same router. However, regarding communication in the same router, direct communication between communication apparatuses is possible. Thus, a communication path for relay does not need to be connected, and no problem arises.

Further, as a method for enhancing security, the method in which the user permits communication with the communication apparatus connected to the upper router or the lower router has been described. However, the same effect can be obtained even by using a method in which identification information of a communication apparatus to be permitted to be connected is registered in advance, a method of certifying connection from a communication apparatus having shared information, and the like. Similarly, a method of demanding confirmation from the user every time the communication apparatuses 4a to 4c and 5a to 5c execute processing of connecting a new communication path may be used.

In the present embodiment, the operations of the communication apparatus having the relay function and the communication apparatus not having the relay function have been described. However, software for executing operations of these communication apparatuses may be created, and recorded in a storage medium such as a CD, a DVD, a ROM, a flash ROM, and the like. By creating such a storage medium, it is possible to add functions of the "communication apparatus having the relay function" and the "communication apparatus not having the relay function", which have been described in the present embodiment, according to need by installing the software from the storage medium into an apparatus, such as a PC, a high-functional digital appliance, and the like, which has a function to execute software.

As described above, the communication apparatus having the relay function in the present embodiment is connected to a home network including one or more routers which are connected in series, and establishes a communication path to another communication apparatus which is connected to the home network. The communication apparatus relays a message using the established communication path to allow communication to be performed between the communication apparatuses. Further, the communication apparatus in the present embodiment is connected to a home network including one or more routers which are connected in series, and establishes a communication path to another communication apparatus which has a relay function and is connected to the home network. The communication apparatus allows communication between the communication apparatuses to be performed through the established communication path using the other communication apparatus having the relay function.

INDUSTRIAL APPLICABILITY

The communication apparatus according to the present invention is useful as a communication apparatus connected to a home network, and the like, and the like.

The invention claimed is:

1. A communication apparatus connected to a local network connected to an external network in which local network one or more routers are connected in series between the communication apparatus in the local network and the external network, the communication apparatus connecting a communication path to another communication apparatus in the local network, the communication apparatus having a relay function to relay a communication message from said another communication apparatus, the communication apparatus comprising:

an upper segment determination section for obtaining and storing address range information which indicates an address range within which an address is capable of being set, the address being of another communication apparatus under an upper router which is connected in the local network and connected on an external network side of a router to which the communication apparatus is connected;

a terminal communication path holding section for connecting and holding a communication path to another communication apparatus in the local network; and a message relay section for relaying a communication message from said another communication apparatus, wherein when the terminal communication path holding section receives a first request message requesting to establish the communication path from said another communication apparatus, the terminal communication path holding section stores source address information of the received first request message, transmits a response message to the stored source address information, and establishes the communication path to said another communication apparatus, when the terminal communication path holding section does not receive the first request message from said another communication apparatus, the terminal communication path holding section presumes address information of another communication apparatus under the upper router using the address range information stored by the upper segment determination section, transmits a second request message requesting to establish another communication path to the presumed address information, and receives a second response message to establish said another communication path to said another communication apparatus under the upper router and to store address information of said another communication apparatus to which said another communication path has been established, and the message relay section has a relay function to receive a communication message from said another communication apparatus, to take out destination information which is described in the received communication message and designated by said another communication apparatus, to obtain address information corresponding to the destination information from the address information stored by the terminal communication path holding section, and to transmit the received communication message to the obtained address information.

2. The communication apparatus according to claim 1, wherein the upper segment determination section obtains LAN-side address information or LAN-side address information and WAN-side address information of one or more routers among routers located between the router to which the communication apparatus is connected and the external network, presumes an address range within which an address of another communication apparatus which is connected to a first network to which the obtained address information belongs is capable of being set, and stores the presumed address range as the address range information.

3. The communication apparatus according to claim 1, further comprising:

a relay function search section for searching for said another communication apparatus which exists in the local network and has a relay function; and a search response section for transmitting a response for a search message which is received from said another communication apparatus in the local network, wherein the relay function search section obtains an address which can be set to said another communication apparatus having a relay function using the address information stored by the terminal communication path holding section, transmits the search message to the address, and receives a response message from said another communication apparatus having the relay function, thereby finding said another communication apparatus having the relay function, only when the relay function search section does not find said another communication apparatus having the relay function, the relay function search section activates the terminal communication path holding section and the message relay section, and the search response section responds to the search message which is received from said another communication apparatus in the local network, and when the relay function search section finds said another communication apparatus having the relay function, the relay function search section inactivates the terminal communication path holding section and the message relay section, and the search response section does not respond to the search message which is received from said another communication apparatus in the local network.

4. The communication apparatus according to claim 3, further comprising a server communication path holding section for connecting and holding the communication path to said another communication apparatus having the relay function, wherein when the relay function search section finds another communication apparatus having the relay function, the server communication path holding section transmits the first request message requesting to establish the communication path to said another communication apparatus having the relay function, and receives the response message to establish the communication path to said another communication apparatus having the relay function, and when the relay function search section does not find another communication apparatus having the relay function, if the server communication path holding section receives the first request message requesting to establish the communication path from another communication apparatus having the relay function, the server communication path holding section transmits the response message to a source of the received first request message to establish the communication path to said another communication apparatus having the relay function.

5. The communication apparatus according to claim 3, wherein when the server communication path holding section detects an abnormality of communication with said another communication apparatus having the relay function, the relay function search section re-executes a search for another communication apparatus having the relay function, and activates the server communication path holding section, the message relay section, and the search response section in accordance with a result of the search.

6. The communication apparatus according to claim 4, wherein when the relay function search section does not find another communication apparatus having the relay function, the server communication path holding section monitors whether or not the sever communication path holding section receives the first request message requesting to establish the communication path from another communication apparatus having the relay function for a predetermined time period, and when the server communication path holding section does not receive the first request message, the server communication path holding section activates the terminal communication path holding section and the message relay section, and the search response section responds to another search message which is received from another communication apparatus in the local network.

7. The communication apparatus according to claim 1, wherein when the terminal communication path holding section and the message relay section are activated, an address which matches an address within a predetermined range is selected from addresses which are not currently used as a host address in a subnetwork, and is set to the communication apparatus.

8. The communication apparatus according to claim 1, wherein when the terminal communication path holding section receives address information of another communication apparatus to which another communication path has not been connected yet from said another communication apparatus to which the communication path has been established through the communication path, the terminal communication path holding section transmits a second request message requesting to establish said another communication path based on the received address information.

9. The communication apparatus according to claim 1, further comprising input means for a user to input a signal to the communication apparatus, wherein the upper segment determination section determines whether or not to obtain address range information under the upper router in accordance with the signal from the input means, and the terminal communication path holding section determines whether or not to transmit the second request message requesting to establish the communication path to another communication apparatus under the upper router in accordance with the signal from the input means.

10. The communication apparatus according to claim 1, further comprising input means for a user to input a signal to the communication apparatus, wherein the terminal communication path holding section determines, in accordance with the signal from the input means, whether or not to transmit the response message when the terminal communication path holding section receives the first request message requesting to establish the communication path from said another communication apparatus.

11. A communication apparatus connected to a local network connected to an external network in which local network one or more routers are connected in series between a communication apparatus in the local network and the external network, the communication apparatus connecting a communication path to another communication apparatus in the local network which has a relay function, the communication apparatus performing message communication with another communication apparatus via said another communication apparatus having the relay function, the communication apparatus comprising:

an upper segment determination section for obtaining and storing address range information which indicates an address range within which an address is capable of being set, the address being of another communication apparatus under an upper router which is connected in the local network and connected on an external network side of a router to which the communication apparatus is connected; and a server communication path holding section for connecting the communication path to said another communication apparatus having the relay function, wherein the server communication path holding section presumes address information of said another communication apparatus having the relay function based on the address range information stored by the upper segment determination section, transmits a first request message requesting to establish the communication path to the presumed address information, and receives a response message from said another communication apparatus having the relay function to establish the communication path, and when the server communication path holding section receives a second request message requesting to establish another communication path from said another communication apparatus having the relay function, the server communication path holding section transmits a second response message to a source address of the second request message to establish said another communication path to said another communication apparatus having the relay function.

12. The communication apparatus according to claim 11, wherein the server communication path holding section transmits address information of another communication apparatus to which said another communication apparatus having the relay function has not connected another communication path yet to said another communication apparatus having the relay function through the communication path which is established to said another communication apparatus having the relay function.

13. The communication apparatus according to claim 11, wherein when the server communication path holding section detects an abnormality of communication with said another communication apparatus having the relay function, the upper segment determination section re-executes processing of obtaining and storing the address range information, and the server communication path holding section re-executes processing of establishing the communication path to said another communication apparatus having the relay function.

14. The communication apparatus according to claim 11, further comprising input means for a user to input a signal to the communication apparatus, wherein
the upper segment determination section determines whether or not to obtain address range information under the upper router in accordance with the signal from the input means, and
the server communication path holding section determines whether or not to transmit the first request message requesting to establish the communication path to another communication apparatus under the upper router in accordance with the signal from the input means.

15. The communication apparatus according to claim 11, further comprising input means for a user to input a signal to the communication apparatus, wherein
the server communication path holding section determines, in accordance with the signal from the input means, whether or not to transmit the response message when the server communication path holding section receives the second request message requesting to establish the communication path from said another communication apparatus having the relay function.

16. A method executed by a communication apparatus connected to a local network connected to an external network in which local network one or more routers are connected in series between a communication apparatus in the local network and the external network, the communication apparatus connecting a communication path to another communication apparatus in the local network, the communication apparatus having a relay function to relay a communication message from said another communication apparatus, the method comprising:
an upper segment determination step of obtaining and storing address range information which indicates an address range within which an address is capable of being set, the address being of another communication apparatus under an upper router which is connected in the local network and connected on an external network side of a router to which the communication apparatus is connected;
a terminal communication path holding step of connecting and holding the communication path to another communication apparatus in the local network; and
a message relay step of relaying a communication message from said another communication apparatus, wherein
when a first request message requesting to establish a communication path is received from said another communication apparatus; at the terminal communication path holding step, source address information of the received first request message is stored, a response message is transmitted to the stored source address information, and the communication path is established to said another communication apparatus,
when the first request message is not received from said another communication apparatus, at the terminal communication path holding step, address information of another communication apparatus under the upper router is presumed using the address range information stored by the upper segment determination step, a second request message requesting to establish another communication path is transmitted to the presumed address information, and a response message is received to establish said another communication path to said another communication apparatus under the upper router and to store address information of said another communication apparatus to which the communication path has been established, and
the message relay step has a relay function to receive a communication message from said another communication apparatus, to take out destination information which is described in the communication message and designated by said another communication apparatus, to obtain address information corresponding to the destination information from the address information stored by the terminal communication path holding step, and to transmit the received communication message to the obtained address information.

17. A method executed by a communication apparatus connected to a local network connected to an external network in which local network one or more routers are connected in series between a communication apparatus in the local network and the external network, the communication apparatus connecting a communication path to another communication apparatus in the local network which has a relay function, the communication apparatus performing message communication with another communication apparatus via said another communication apparatus having the relay function, the method comprising:
an upper segment determination step of obtaining and storing address range information which indicates an address range within which an address is capable of being set, the address being of another communication apparatus under an upper router which is connected in the local network and connected on an external network side of a router to which the communication apparatus is connected; and
a server communication path holding step of connecting the communication path to said another communication apparatus having the relay function, wherein
at the server communication path holding step, address information of said another communication apparatus having the relay function is presumed based on the address range information stored by the upper segment determination step, a first request message requesting to establish the communication path is transmitted to the presumed address information, a response message is received from said another communication apparatus having the relay function to establish the communication path, and
when a second request message requesting to establish another communication path is received from said another communication apparatus having the relay function, at the server communication path holding step, a second response message is transmitted to a source address, of the second request message to establish said another communication path to said another communication apparatus having the relay function.

18. A storage medium storing software containing instruction which, when executed by a computer, performs a method comprising:
- an upper segment determination step of obtaining and storing address range information which indicates an address range within which an address is capable of being set, the address being of another communication apparatus under an upper router which is connected in the local network and connected on an external network side of a router to which the communication apparatus is connected;
- a terminal communication path holding step of connecting and holding the communication path to another communication apparatus in the local network; and
- a message relay step of relaying a communication message from said another communication apparatus, wherein
- when a first request message requesting to establish a communication path is received from said another communication apparatus at the terminal communication path holding step, source address information of the received first request message is stored, a response message is transmitted to the stored source address information, and the communication path is established to said another communication apparatus,
- when the first request message is not received from said another communication apparatus, at the terminal communication path holding step, address information of another communication apparatus under the upper router is presumed using the address range information stored by the upper segment determination step, a second request message requesting to establish another communication path is transmitted to the presumed address information, and a second response message is received to establish said another communication path to said another communication apparatus under the upper router and to store address information of said another communication apparatus to which the communication path has been established, and
- the message relay step has a relay function to receive a communication message from said another communication apparatus, to take out destination information which is described in the communication message and designated by said another communication apparatus, to obtain address information corresponding to the destination information from the address information stored by the terminal communication path holding step, and to transmit the received communication message to the obtained address information.

19. A storage medium storing software containing instructions which, when executed by a computer, performs a method comprising:
- an upper segment determination step of obtaining and storing address range information which indicates an address range within which an address is capable of being set, the address being of another communication apparatus under an upper router which is connected in the local network and connected on an external network side of a router to which the communication apparatus is connected; and
- a server communication path holding step of connecting the communication path to said another communication apparatus having the relay function, wherein
- at the server communication path holding step, address information of said another communication apparatus having the relay function is presumed based on the address range information stored by the upper segment determination step, a first request message requesting to establish the communication path is transmitted to the presumed address information, a response message is received from said another communication apparatus having the relay function to establish the communication path, and
- when a second request message requesting to establish another communication path is received from said another communication apparatus having the relay function, at the server communication path holding step, a second response message is transmitted to a source address of the second request message to establish said another communication path to said another communication apparatus having the relay function.

* * * * *